(12) United States Patent
Taylor et al.

(10) Patent No.: US 10,229,453 B2
(45) Date of Patent: Mar. 12, 2019

(54) METHOD AND SYSTEM FOR LOW LATENCY BASKET CALCULATION

(75) Inventors: David E. Taylor, St. Louis, MO (US); Naveen Singla, St. Louis, MO (US); Benjamin C. Brodie, Kirkwood, MO (US); Nathaniel Sutton McVicar, St. Louis, MO (US); Justin Ryan Thiel, Glen Carbon, IL (US); Ronald S. Indeck, St. Louis, MO (US)

(73) Assignee: IP RESERVOIR, LLC, St. Louis, MO (US)

( * ) Notice: Subject to any disclaimer, the term of this patent is extended or adjusted under 35 U.S.C. 154(b) by 470 days.

(21) Appl. No.: 12/013,302

(22) Filed: Jan. 11, 2008

(65) Prior Publication Data

US 2009/0182683 A1  Jul. 16, 2009

(51) Int. Cl.
*G06Q 40/00* (2012.01)
*G06Q 40/06* (2012.01)

(52) U.S. Cl.
CPC ............ *G06Q 40/00* (2013.01); *G06Q 40/06* (2013.01)

(58) Field of Classification Search
USPC .................. 705/35, 36 R, 36 T, 37
See application file for complete search history.

(56) References Cited

U.S. PATENT DOCUMENTS

| | | |
|---|---|---|
| 2,046,381 A | 7/1936 | Hicks et al. |
| 3,082,402 A | 3/1963 | Scantlin |
| 3,296,597 A | 1/1967 | Scantlin et al. |
| 3,573,747 A | 4/1971 | Adams et al. |
| 3,581,072 A | 5/1971 | Nymeyer |
| 4,044,334 A | 8/1977 | Bachman et al. |
| 4,300,193 A | 11/1981 | Bradley et al. |
| 4,412,287 A | 10/1983 | Braddock, III |
| 4,674,044 A | 6/1987 | Kalmus et al. |
| 4,903,201 A | 2/1990 | Wagner |
| 5,023,910 A | 6/1991 | Thomson |
| 5,038,284 A | 8/1991 | Kramer |
| 5,050,075 A | 9/1991 | Herman et al. |
| 5,077,665 A | 12/1991 | Silverman et al. |
| 5,101,353 A | 3/1992 | Lupien et al. |
| 5,126,936 A | 6/1992 | Champion et al. |

(Continued)

FOREIGN PATENT DOCUMENTS

| | | |
|---|---|---|
| EP | 0573991 | 12/1993 |
| EP | 0851358 A | 7/1998 |

(Continued)

OTHER PUBLICATIONS

Office Action for U.S. Appl. No. 11/760,211 dated Nov. 2, 2009.
(Continued)

*Primary Examiner* — Gregory A Pollock
(74) *Attorney, Agent, or Firm* — Thompson Coburn LLP

(57) ABSTRACT

A basket calculation engine is deployed to receive a stream of data and accelerate the computation of basket values based on that data. In a preferred embodiment, the basket calculation engine is used to process financial market data to compute the net asset values (NAVs) of financial instrument baskets. The basket calculation engine can be deployed on a coprocessor and can also be realized via a pipeline, the pipeline preferably comprising a basket association lookup module and a basket value updating module. The coprocessor is preferably a reconfigurable logic device such as a field programmable gate array (FPGA).

103 Claims, 14 Drawing Sheets

(56) References Cited

U.S. PATENT DOCUMENTS

| | | |
|---|---|---|
| 5,161,103 A | 11/1992 | Kosaka et al. |
| 5,243,655 A | 9/1993 | Wang |
| 5,249,292 A | 9/1993 | Chiappa |
| 5,258,908 A | 11/1993 | Hartheimer et al. |
| 5,267,148 A | 11/1993 | Kosaka et al. |
| 5,270,922 A | 12/1993 | Higgins |
| 5,297,032 A | 3/1994 | Trojan et al. |
| 5,313,560 A | 5/1994 | Maruoka et al. |
| 5,315,634 A | 5/1994 | Tanaka et al. |
| 5,319,776 A | 6/1994 | Hile et al. |
| 5,371,794 A | 12/1994 | Diffie et al. |
| 5,375,055 A | 12/1994 | Togher et al. |
| 5,404,488 A | 4/1995 | Kerrigan et al. |
| 5,418,951 A | 5/1995 | Damashek |
| 5,421,028 A | 5/1995 | Swanson |
| 5,461,712 A | 10/1995 | Chelstowski et al. |
| 5,481,735 A | 1/1996 | Mortensen et al. |
| 5,497,317 A | 3/1996 | Hawkins et al. |
| 5,497,488 A | 3/1996 | Akizawa et al. |
| 5,500,793 A | 3/1996 | Deming, Jr. et al. |
| 5,651,125 A | 7/1997 | Witt et al. |
| 5,684,980 A | 11/1997 | Casselman |
| 5,701,464 A | 12/1997 | Aucsmith |
| 5,781,921 A | 7/1998 | Nichols |
| 5,802,290 A | 9/1998 | Casselman |
| 5,805,832 A | 9/1998 | Brown et al. |
| 5,809,483 A | 9/1998 | Broka et al. |
| 5,813,000 A | 9/1998 | Furlani |
| 5,826,075 A | 10/1998 | Bealkowski et al. |
| 5,845,266 A | 12/1998 | Lupien et al. |
| 5,857,176 A | 1/1999 | Ginsberg |
| 5,864,738 A | 1/1999 | Kessler et al. |
| 5,870,730 A | 2/1999 | Furuya et al. |
| 5,873,071 A | 2/1999 | Ferstenberg et al. |
| 5,884,286 A | 3/1999 | Daughtery, III |
| 5,905,974 A | 5/1999 | Fraser et al. |
| 5,913,211 A | 6/1999 | Nitta |
| 5,950,196 A | 9/1999 | Pyreddy et al. |
| 5,963,923 A | 10/1999 | Garber |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,016,483 A | 1/2000 | Rickard et al. |
| 6,023,755 A | 2/2000 | Casselman |
| 6,023,760 A | 2/2000 | Karttunen |
| 6,028,939 A | 2/2000 | Yin |
| 6,044,407 A | 3/2000 | Jones et al. |
| 6,061,662 A | 5/2000 | Makivic |
| 6,067,569 A | 5/2000 | Khaki et al. |
| 6,073,160 A | 6/2000 | Grantham et al. |
| 6,105,067 A | 8/2000 | Batra |
| 6,134,551 A | 10/2000 | Aucsmith |
| 6,138,176 A | 10/2000 | McDonald et al. |
| RE36,946 E | 11/2000 | Diffie et al. |
| 6,147,890 A | 11/2000 | Kawana et al. |
| 6,147,976 A | 11/2000 | Shand et al. |
| 6,169,969 B1 | 1/2001 | Cohen |
| 6,173,270 B1 | 1/2001 | Cristofich et al. |
| 6,173,276 B1 | 1/2001 | Kant et al. |
| 6,175,874 B1 | 1/2001 | Imai et al. |
| 6,178,494 B1 | 1/2001 | Casselman |
| 6,195,024 B1 | 2/2001 | Fallon |
| 6,226,676 B1 | 5/2001 | Crump et al. |
| 6,236,980 B1 | 5/2001 | Reese |
| 6,243,753 B1 | 6/2001 | Machin et al. |
| 6,263,321 B1 | 7/2001 | Daughtery, III |
| 6,272,616 B1 | 8/2001 | Fernando et al. |
| 6,278,982 B1 | 8/2001 | Korhammer et al. |
| 6,279,113 B1 | 8/2001 | Vaidya |
| 6,289,440 B1 | 9/2001 | Casselman |
| 6,295,530 B1 | 9/2001 | Ritchie et al. |
| 6,304,858 B1 | 10/2001 | Mosler et al. |
| 6,309,424 B1 | 10/2001 | Fallon |
| 6,317,728 B1 | 11/2001 | Kane |
| 6,317,795 B1 | 11/2001 | Malkin et al. |
| 6,336,150 B1 | 1/2002 | Ellis et al. |
| 6,339,819 B1 | 1/2002 | Huppenthal et al. |
| 6,370,645 B1 | 4/2002 | Lee et al. |
| 6,377,942 B1 | 4/2002 | Hinsley et al. |
| 6,381,242 B1 | 4/2002 | Maher, III et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,415,269 B1 | 7/2002 | Dinwoodie |
| 6,418,419 B1 | 7/2002 | Nieboer et al. |
| 6,430,272 B1 | 8/2002 | Maruyama et al. |
| 6,456,982 B1 | 9/2002 | Pilipovic |
| 6,463,474 B1 | 10/2002 | Fuh et al. |
| 6,484,209 B1 | 11/2002 | Momirov |
| 6,499,107 B1 | 12/2002 | Gleichauf et al. |
| 6,546,375 B1 | 4/2003 | Pang et al. |
| 6,578,147 B1 | 6/2003 | Shanklin et al. |
| 6,581,098 B1 | 6/2003 | Kumpf |
| 6,594,643 B1 | 7/2003 | Freeny, Jr. |
| 6,597,812 B1 | 7/2003 | Fallon et al. |
| 6,601,104 B1 | 7/2003 | Fallon |
| 6,604,158 B1 | 8/2003 | Fallon |
| 6,624,761 B2 | 9/2003 | Fallon |
| 6,625,150 B1 | 9/2003 | Yu |
| 6,691,301 B2 | 2/2004 | Bowen |
| 6,704,816 B1 | 3/2004 | Burke |
| 6,710,702 B1 | 3/2004 | Averbuch et al. |
| 6,711,558 B1 | 3/2004 | Indeck et al. |
| 6,765,918 B1 | 7/2004 | Dixon et al. |
| 6,766,304 B2 | 7/2004 | Kemp, II et al. |
| 6,772,132 B1 | 8/2004 | Kemp, II et al. |
| 6,772,136 B2 | 8/2004 | Kant et al. |
| 6,772,345 B1 | 8/2004 | Shetty |
| 6,778,968 B1 | 8/2004 | Gulati |
| 6,785,677 B1 | 8/2004 | Fritchman |
| 6,804,667 B1 | 10/2004 | Martin |
| 6,807,156 B1 | 10/2004 | Veres et al. |
| 6,839,686 B1 | 1/2005 | Galant |
| 6,850,906 B1 | 2/2005 | Chadha et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,931,545 B1 | 8/2005 | Ta et al. |
| 6,944,168 B2 | 9/2005 | Paatela et al. |
| 6,978,223 B2 | 12/2005 | Milliken |
| 6,981,054 B1 | 12/2005 | Krishna |
| 7,003,488 B2 | 2/2006 | Dunne et al. |
| 7,019,674 B2 | 3/2006 | Cadambi et al. |
| 7,024,384 B2 | 4/2006 | Daughtery, III |
| 7,058,735 B2 | 6/2006 | Spencer |
| 7,065,475 B1 | 6/2006 | Brundobler |
| 7,089,206 B2 | 8/2006 | Martin |
| 7,093,023 B2 | 8/2006 | Lockwood et al. |
| 7,099,838 B1 | 8/2006 | Gastineau et al. |
| 7,103,569 B1 | 9/2006 | Groveman et al. |
| 7,124,106 B1 | 10/2006 | Stallaert et al. |
| 7,127,424 B2 | 10/2006 | Kemp, II et al. |
| 7,130,913 B2 | 10/2006 | Fallon |
| 7,139,743 B2 | 11/2006 | Indeck et al. |
| 7,149,715 B2 | 12/2006 | Browne et al. |
| 7,161,506 B2 | 1/2007 | Fallon |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,212,998 B1 | 5/2007 | Muller et al. |
| 7,222,114 B1 | 5/2007 | Chan et al. |
| 7,224,185 B2 | 5/2007 | Campbell et al. |
| 7,228,289 B2 | 6/2007 | Brumfield et al. |
| 7,249,118 B2 | 7/2007 | Sandler et al. |
| 7,251,629 B1 | 7/2007 | Marynowski et al. |
| 7,277,887 B1 | 10/2007 | Burrows et al. |
| 7,305,383 B1 | 12/2007 | Kubesh et al. |
| 7,321,937 B2 | 1/2008 | Fallon |
| 7,356,498 B2 | 4/2008 | Kaminsky et al. |
| 7,363,277 B1 | 4/2008 | Dutta et al. |
| 7,378,992 B2 | 5/2008 | Fallon |
| 7,386,046 B2 | 6/2008 | Fallon et al. |

(56) References Cited

U.S. PATENT DOCUMENTS

| | | |
|---|---|---|
| 7,406,444 B2 | 7/2008 | Eng et al. |
| 7,417,568 B2 | 8/2008 | Fallon et al. |
| 7,454,418 B1 | 11/2008 | Wang |
| 7,461,064 B2 | 12/2008 | Fontoura et al. |
| 7,539,845 B1 | 5/2009 | Wentzlaff et al. |
| 7,558,753 B2 | 7/2009 | Neubert et al. |
| 7,565,525 B2 | 7/2009 | Vorbach et al. |
| 7,603,303 B1 | 10/2009 | Kraus et al. |
| 7,636,703 B2 | 12/2009 | Taylor |
| 7,660,761 B2 | 2/2010 | Zhou et al. |
| 7,660,793 B2 | 2/2010 | Indeck et al. |
| 7,668,849 B1 | 2/2010 | Narancic et al. |
| 7,714,747 B2 | 5/2010 | Fallon |
| 7,761,459 B1 | 7/2010 | Zhang et al. |
| 7,788,293 B2 | 8/2010 | Pasztor et al. |
| 7,840,482 B2 | 11/2010 | Singla et al. |
| 7,856,545 B2 | 12/2010 | Casselman |
| 7,856,546 B2 | 12/2010 | Casselman et al. |
| 7,908,213 B2 | 3/2011 | Monroe et al. |
| 7,908,259 B2 | 3/2011 | Branscome et al. |
| 7,917,299 B2 | 3/2011 | Buhler et al. |
| 7,921,046 B2 | 4/2011 | Parsons et al. |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 7,991,667 B2 | 8/2011 | Kraus et al. |
| 8,015,099 B2 | 9/2011 | Reid |
| 8,024,253 B2 | 9/2011 | Peterify et al. |
| 8,027,893 B1 | 9/2011 | Burrows et al. |
| 8,032,440 B1 | 10/2011 | Hait |
| 8,046,283 B2 | 10/2011 | Burns et al. |
| 8,069,102 B2 | 11/2011 | Indeck et al. |
| 8,073,763 B1 | 12/2011 | Merrin et al. |
| 8,095,508 B2 | 1/2012 | Chamberlain et al. |
| 8,131,697 B2 | 3/2012 | Indeck et al. |
| 8,140,416 B2 | 3/2012 | Borkovec et al. |
| 8,156,101 B2 | 4/2012 | Indeck et al. |
| 8,374,986 B2 | 2/2013 | Indeck et al. |
| 8,407,122 B2 | 3/2013 | Parsons et al. |
| 8,458,081 B2 | 6/2013 | Parsons et al. |
| 8,478,680 B2 | 7/2013 | Parsons et al. |
| 8,515,682 B2 | 8/2013 | Buhler et al. |
| 8,549,024 B2 | 10/2013 | Indeck et al. |
| 8,595,104 B2 | 11/2013 | Parsons et al. |
| 8,600,856 B2 | 12/2013 | Parsons et al. |
| 8,620,881 B2 | 12/2013 | Chamberlain et al. |
| 8,626,624 B2 | 1/2014 | Parsons et al. |
| 8,655,764 B2 | 2/2014 | Parsons et al. |
| 8,660,925 B2 | 2/2014 | Borkovec et al. |
| 8,751,452 B2 | 6/2014 | Chamberlain et al. |
| 8,762,249 B2 | 6/2014 | Taylor et al. |
| 8,768,805 B2 | 7/2014 | Taylor et al. |
| 8,768,888 B2 | 7/2014 | Chamberlain et al. |
| 9,020,928 B2 | 4/2015 | Indeck et al. |
| 9,047,243 B2 | 6/2015 | Taylor et al. |
| 2001/0003193 A1 | 6/2001 | Woodring et al. |
| 2001/0013048 A1 | 8/2001 | Imbert de Tremiolles et al. |
| 2001/0042040 A1 | 11/2001 | Keith |
| 2001/0047473 A1 | 11/2001 | Fallon |
| 2001/0052038 A1 | 12/2001 | Fallon et al. |
| 2001/0056547 A1 | 12/2001 | Dixon |
| 2002/0010825 A1 | 1/2002 | Wilson |
| 2002/0019812 A1 | 2/2002 | Board et al. |
| 2002/0023010 A1 | 2/2002 | Rittmaster et al. |
| 2002/0038276 A1 | 3/2002 | Buhannic et al. |
| 2002/0049841 A1 | 4/2002 | Johnson et al. |
| 2002/0069375 A1 | 6/2002 | Bowen |
| 2002/0072893 A1 | 6/2002 | Wilson |
| 2002/0080871 A1 | 6/2002 | Fallon et al. |
| 2002/0082967 A1 | 6/2002 | Kaminsky et al. |
| 2002/0091826 A1 | 7/2002 | Comeau et al. |
| 2002/0100029 A1 | 7/2002 | Bowen |
| 2002/0101425 A1 | 8/2002 | Hamid |
| 2002/0105911 A1 | 8/2002 | Pruthi et al. |
| 2002/0129140 A1 | 9/2002 | Peled et al. |
| 2002/0138376 A1 | 9/2002 | Hinkle |
| 2002/0143521 A1 | 10/2002 | Call |
| 2002/0147670 A1 | 10/2002 | Lange |
| 2002/0156998 A1 | 10/2002 | Casselman |
| 2002/0162025 A1 | 10/2002 | Sutton et al. |
| 2002/0166063 A1 | 11/2002 | Lachman et al. |
| 2002/0180742 A1 | 12/2002 | Hamid |
| 2002/0199173 A1 | 12/2002 | Bowen |
| 2003/0009411 A1 | 1/2003 | Ram et al. |
| 2003/0009693 A1 | 1/2003 | Brock et al. |
| 2003/0014662 A1 | 1/2003 | Gupta et al. |
| 2003/0018630 A1 | 1/2003 | Indeck et al. |
| 2003/0023653 A1 | 1/2003 | Dunlop et al. |
| 2003/0023876 A1 | 1/2003 | Bardsley et al. |
| 2003/0028408 A1 | 2/2003 | RuDusky |
| 2003/0028690 A1 | 2/2003 | Appleby-Alis et al. |
| 2003/0028864 A1 | 2/2003 | Bowen |
| 2003/0033234 A1 | 2/2003 | RuDusky |
| 2003/0033240 A1 | 2/2003 | Balson et al. |
| 2003/0033450 A1 | 2/2003 | Appleby-Alis |
| 2003/0033514 A1 | 2/2003 | Appleby-Allis et al. |
| 2003/0033588 A1 | 2/2003 | Alexander |
| 2003/0033594 A1 | 2/2003 | Bowen |
| 2003/0035547 A1 | 2/2003 | Newton |
| 2003/0037037 A1 | 2/2003 | Adams et al. |
| 2003/0037321 A1 | 2/2003 | Bowen |
| 2003/0041129 A1 | 2/2003 | Appleby-Allis |
| 2003/0043805 A1 | 3/2003 | Graham et al. |
| 2003/0046668 A1 | 3/2003 | Bowen |
| 2003/0051043 A1 | 3/2003 | Wyschogrod et al. |
| 2003/0055658 A1 | 3/2003 | RuDusky |
| 2003/0055769 A1 | 3/2003 | Rudusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0061409 A1 | 3/2003 | RuDusky |
| 2003/0065607 A1 | 4/2003 | Satchwell |
| 2003/0065943 A1 | 4/2003 | Geis et al. |
| 2003/0074177 A1 | 4/2003 | Bowen |
| 2003/0074582 A1 | 4/2003 | Patel et al. |
| 2003/0078865 A1 | 4/2003 | Lee |
| 2003/0079060 A1 | 4/2003 | Dunlop |
| 2003/0093343 A1 | 5/2003 | Huttenlocher et al. |
| 2003/0093347 A1 | 5/2003 | Gray |
| 2003/0105620 A1 | 6/2003 | Bowen |
| 2003/0105721 A1 | 6/2003 | Ginter et al. |
| 2003/0110229 A1 | 6/2003 | Kulig et al. |
| 2003/0117971 A1 | 6/2003 | Aubury |
| 2003/0120460 A1 | 6/2003 | Aubury |
| 2003/0121010 A1 | 6/2003 | Aubury |
| 2003/0126065 A1 | 7/2003 | Eng et al. |
| 2003/0140337 A1 | 7/2003 | Aubury |
| 2003/0154368 A1 | 8/2003 | Stevens et al. |
| 2003/0177253 A1 | 9/2003 | Schuehler et al. |
| 2003/0184593 A1 | 10/2003 | Dunlop |
| 2003/0187662 A1 | 10/2003 | Wilson |
| 2003/0191876 A1 | 10/2003 | Fallon |
| 2003/0208430 A1 | 11/2003 | Gershon |
| 2003/0221013 A1 | 11/2003 | Lockwood et al. |
| 2003/0233302 A1 | 12/2003 | Weber et al. |
| 2004/0000928 A1 | 1/2004 | Cheng et al. |
| 2004/0015502 A1 | 1/2004 | Alexander et al. |
| 2004/0015633 A1 | 1/2004 | Smith |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0059666 A1 | 3/2004 | Waelbroeck et al. |
| 2004/0062245 A1 | 4/2004 | Sharp et al. |
| 2004/0100977 A1 | 5/2004 | Suzuki et al. |
| 2004/0170070 A1 | 9/2004 | Rapp et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0196905 A1 | 10/2004 | Yamane et al. |
| 2004/0199448 A1 | 10/2004 | Chalermkraivuth et al. |
| 2004/0199452 A1 | 10/2004 | Johnston et al. |
| 2004/0205149 A1 | 10/2004 | Dillon et al. |
| 2005/0005145 A1 | 1/2005 | Teixeira |

(56) References Cited

U.S. PATENT DOCUMENTS

| | | |
|---|---|---|
| 2005/0027634 A1 | 2/2005 | Gershon |
| 2005/0080649 A1 | 4/2005 | Alvarez et al. |
| 2005/0086520 A1 | 4/2005 | Dharmapurikar et al. |
| 2005/0091142 A1 | 4/2005 | Renton et al. |
| 2005/0097027 A1 | 5/2005 | Kavanaugh |
| 2005/0131790 A1 | 6/2005 | Benzschawel et al. |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0195832 A1 | 9/2005 | Dharmapurikar et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0228735 A1 | 10/2005 | Duquette |
| 2005/0240510 A1 | 10/2005 | Schweickert et al. |
| 2005/0243824 A1 | 11/2005 | Abbazia et al. |
| 2005/0267836 A1 | 12/2005 | Crosthwaite et al. |
| 2005/0283423 A1 | 12/2005 | Moser et al. |
| 2005/0283743 A1 | 12/2005 | Mulholland et al. |
| 2006/0020536 A1 | 1/2006 | Renton et al. |
| 2006/0026090 A1 | 2/2006 | Balabon |
| 2006/0031154 A1 | 2/2006 | Noviello et al. |
| 2006/0031156 A1 | 2/2006 | Noviello et al. |
| 2006/0053295 A1 | 3/2006 | Madhusudan et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0143099 A1 | 6/2006 | Partlow et al. |
| 2006/0215691 A1 | 9/2006 | Kobayashi et al. |
| 2006/0259407 A1 | 11/2006 | Rosenthal et al. |
| 2006/0259417 A1 | 11/2006 | Manjnowski et al. |
| 2006/0282281 A1 | 12/2006 | Egetoft |
| 2006/0282369 A1 | 12/2006 | White |
| 2006/0294059 A1 | 12/2006 | Chamberlain et al. |
| 2007/0025351 A1 | 2/2007 | Cohen |
| 2007/0061231 A1 | 3/2007 | Kim-E |
| 2007/0061241 A1 | 3/2007 | Jovanovic et al. |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0118453 A1 | 5/2007 | Bauerschmidt et al. |
| 2007/0118457 A1 | 5/2007 | Peterify et al. |
| 2007/0118500 A1 | 5/2007 | Indeck et al. |
| 2007/0130140 A1 | 6/2007 | Cytron et al. |
| 2007/0156574 A1 | 7/2007 | Marynowski et al. |
| 2007/0174841 A1 | 7/2007 | Chamberlain et al. |
| 2007/0179935 A1 | 8/2007 | Lee et al. |
| 2007/0208657 A1 | 9/2007 | Petrino |
| 2007/0237327 A1 | 10/2007 | Taylor et al. |
| 2007/0260602 A1 | 11/2007 | Taylor |
| 2007/0277036 A1 | 11/2007 | Chamberlain et al. |
| 2007/0294157 A1 | 12/2007 | Singla et al. |
| 2007/0294162 A1 | 12/2007 | Borkovec |
| 2008/0077793 A1 | 3/2008 | Tan et al. |
| 2008/0082502 A1 | 4/2008 | Gupta |
| 2008/0086274 A1 | 4/2008 | Chamberlain et al. |
| 2008/0097893 A1 | 4/2008 | Walsky et al. |
| 2008/0109413 A1 | 5/2008 | Indeck et al. |
| 2008/0114724 A1 | 5/2008 | Indeck et al. |
| 2008/0114725 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2008/0162378 A1 | 7/2008 | Levine et al. |
| 2008/0175239 A1 | 7/2008 | Sistanizadeh et al. |
| 2008/0243675 A1 | 10/2008 | Parsons et al. |
| 2008/0275805 A1 | 11/2008 | Hecht |
| 2009/0076981 A1 | 3/2009 | Schonberg |
| 2009/0259598 A1 | 10/2009 | Stevens et al. |
| 2009/0271330 A1 | 10/2009 | Hamati et al. |
| 2009/0287628 A1 | 11/2009 | Indeck et al. |
| 2010/0005036 A1 | 1/2010 | Kraus et al. |
| 2010/0094858 A1 | 4/2010 | Indeck et al. |
| 2010/0106976 A1 | 4/2010 | Aciicmez et al. |
| 2010/0198850 A1 | 8/2010 | Cytron et al. |
| 2010/0287294 A1 | 11/2010 | Battyani et al. |
| 2011/0010287 A1 | 1/2011 | Mittal et al. |
| 2011/0040701 A1 | 2/2011 | Singla et al. |
| 2011/0066832 A1 | 3/2011 | Casselman et al. |
| 2011/0125960 A1 | 5/2011 | Casselman |
| 2011/0145130 A1 | 6/2011 | Glodjo et al. |
| 2011/0178911 A1 | 7/2011 | Parsons et al. |
| 2011/0178912 A1 | 7/2011 | Parsons et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179050 A1 | 7/2011 | Parsons et al. |
| 2011/0184844 A1 | 7/2011 | Parsons et al. |
| 2011/0199243 A1 | 8/2011 | Fallon et al. |
| 2011/0246353 A1 | 10/2011 | Kraus et al. |
| 2011/0295967 A1 | 12/2011 | Wang et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0109849 A1 | 5/2012 | Chamberlain et al. |
| 2012/0110316 A1 | 5/2012 | Chamberlain et al. |
| 2012/0116998 A1 | 5/2012 | Indeck et al. |
| 2012/0130922 A1 | 5/2012 | Indeck et al. |
| 2012/0179590 A1 | 7/2012 | Borkovec et al. |
| 2012/0246052 A1 | 9/2012 | Taylor et al. |
| 2013/0086096 A1 | 4/2013 | Indeck et al. |
| 2013/0151458 A1 | 6/2013 | Indeck et al. |
| 2013/0159449 A1 | 6/2013 | Taylor et al. |
| 2013/0262287 A1 | 10/2013 | Parsons et al. |
| 2013/0290163 A1 | 10/2013 | Parsons et al. |
| 2014/0025656 A1 | 1/2014 | Indeck et al. |
| 2014/0040109 A1 | 2/2014 | Parsons et al. |
| 2014/0067830 A1 | 3/2014 | Buhler et al. |
| 2014/0089163 A1 | 3/2014 | Parsons et al. |
| 2014/0164215 A1 | 6/2014 | Parsons et al. |
| 2014/0180903 A1 | 6/2014 | Parsons et al. |
| 2014/0180904 A1 | 6/2014 | Parsons et al. |
| 2014/0180905 A1 | 6/2014 | Parsons et al. |
| 2014/0181133 A1 | 6/2014 | Parsons et al. |
| 2016/0070583 A1 | 3/2016 | Chamberlain et al. |

FOREIGN PATENT DOCUMENTS

| | | |
|---|---|---|
| JP | 09145544 A | 6/1997 |
| JP | 09-269901 A | 10/1997 |
| JP | 11-259559 A | 9/1999 |
| JP | 11282912 | 10/1999 |
| JP | 2000357176 | 12/2000 |
| JP | 2001283000 A | 10/2001 |
| JP | 2002117232 A | 4/2002 |
| JP | 2002269343 A | 9/2002 |
| JP | 2002352070 A | 12/2002 |
| JP | 2003-036360 A | 2/2003 |
| JP | 2003256660 A | 9/2003 |
| JP | 2006059203 A | 3/2006 |
| JP | 2006293852 A | 10/2006 |
| WO | 199010910 | 9/1990 |
| WO | 199409443 A1 | 4/1994 |
| WO | 199737735 | 10/1997 |
| WO | 2000041136 A1 | 7/2000 |
| WO | 2001022425 A | 3/2001 |
| WO | 0135216 A2 | 5/2001 |
| WO | 2001039577 | 6/2001 |
| WO | 200172106 A2 | 10/2001 |
| WO | 2001080082 A2 | 10/2001 |
| WO | 2001080558 | 10/2001 |
| WO | 0190890 A1 | 11/2001 |
| WO | 2002061525 | 8/2002 |

(56) References Cited

FOREIGN PATENT DOCUMENTS

| | | |
|---|---|---|
| WO | 2003100650 | 4/2003 |
| WO | 2003036845 | 5/2003 |
| WO | 2003100662 | 12/2003 |
| WO | 2004017604 | 2/2004 |
| WO | 2005017708 | 2/2005 |
| WO | 2005026925 | 3/2005 |
| WO | 2005048134 A | 5/2005 |
| WO | 2006023948 | 3/2006 |
| WO | 2006096324 | 9/2006 |
| WO | 2007/016078 A2 | 2/2007 |
| WO | 2007064685 | 6/2007 |
| WO | 2007/074903 A1 | 7/2007 |
| WO | 2007087507 | 8/2007 |
| WO | 2007/127336 A2 | 11/2007 |
| WO | 2007/149378 A2 | 12/2007 |
| WO | 2008022036 | 2/2008 |
| WO | 2008/036197 A2 | 3/2008 |
| WO | 2008063973 | 5/2008 |
| WO | 2008063974 | 5/2008 |
| WO | 2009140363 A1 | 11/2009 |
| WO | 2010077829 | 7/2010 |

OTHER PUBLICATIONS

Amanuma et al., "A FPGA Architecture for High Speed Computation", Proceedings of 60th Convention Architecture, Software Science, Engineering, Mar. 14, 2000, pp. 1-163-1-164, Information Processing Society, Japan.
Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.
Braun et al., "Protocol Wrappers for Layered Network Packet Processing in Reconfigurable Hardware", IEEE Micro, Jan.-Feb. 2002, pp. 66-74.
Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.
English Translation of Office Action for JP Application 2004-508044 dated Feb. 9, 2010.
Google Search Results Page For "field programmable gate array financial calculation stock market" over dates of Jan. 1, 1990-May 21, 2002, 1 page.
International Preliminary Report on Patentability (Chapter I) for PCT/US2009/030623 dated Jul. 22, 2010.
Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.
Office Action for AU Application 2009200148 dated Nov. 9, 2010.
Office Action for U.S. Appl. No. 11/561,615 dated Jun. 17, 2010.
Office Action for U.S. Appl. No. 11/765,306 dated Mar. 29, 2010.
Sachin Tandon, "A Programmable Architecture for Real-Time Derivative Trading", Master's Thesis, University of Edinburgh, 2003, Published in Google on Jan. 1, 2001.
Seki et al., "High Speed Computation of Shogi With FPGA", Proceedings of 58th Convention Architecture, Software Science, Engineering, Mar. 9, 1999, pp. 1-133-1-134.
Summons to Attend Oral Proceedings for EP Application 03729000.4 dated Mar. 17, 2010.
Written Submissions to EPO for EP Application 03729000.4 dated May 10, 2010.
Yoshitani et al., "Performance Evaluation of Parallel Volume Rendering Machine Re Volver/C40", Study Report of Information Processing Society, Mar. 5, 1999, pp. 79-84, vol. 99, No. 21.
Celko, "Joe Celko's Data & Databases: Concepts in Practice", 1999, pp. 72-74, Morgan Kaufmann Publishers.
Gokhale et al., "Reconfigurable Computing", 2005, pp. 3, 7, 11-15 and 92-93, Springer.
Gokhale et al, "Reconfigurable Computing: Accelerating Computation With Field-Programmable Gate Arrays", 2005, pp. 12-15, Springer.
Motwani et al., "Randomized Algorithms", 1995, pp. 215-216, Cambridge University Press.
Office Action for U.S. Appl. No. 11/938,732 dated Dec. 9, 2011.
Office Action for U.S. Appl. No. 13/076,906 dated Mar. 5, 2012.
Office Action for U.S. Appl. No. 13/076,929 dated Mar. 2, 2012.
Office Action for U.S. Appl. No. 13/076,951 dated Feb. 29, 2012.
Office Action for U.S. Appl. No. 13/077,036 dated Mar. 16, 2012.
Prosecution History for U.S. Appl. No. 11/765,306, now U.S. Pat. No. 7,921,046, filed Jun. 19, 2007.
Russ et al, Non-Intrusive Built-In Self-Test for FPGA and MCM Applications, Aug. 8-10, 1995, IEEE, 480-485.
Shasha et al., "Database Tuning", 2003, pp. 280-284, Morgan Kaufmann Publishers.
Skiena et al., "Programming Challenges: The Programming Contest Training Manual", 2003, pp. 30-31, Springer.
U.S. Appl. No. 13/301,340, filed Nov. 21, 2011 (Indeck et al.).
U.S. Appl. No. 13/301,387, filed Nov. 21, 2011 (Indeck et al.).
U.S. Appl. No. 13/316,332, filed Dec. 9, 2011 (Taylor et al.).
U.S. Appl. No. 61/570,670, filed Dec. 14, 2011 (Taylor et al.).
Ibrahim et al., "Lecture Notes in Computer Science: Database and Expert Systems Applications", 2000, p. 769, vol. 1873, Springer.
Mueller, "Upgrading and Repairing PCs, 15th Anniversary Edition", 2004, pp. 63-66, 188, Que.
Office Action for U.S. Appl. No. 13/077,224 dated May 9, 2012.
Office Action for U.S. Appl. No. 13/301,340 dated May 9, 2012.
Worboys, "GIS: A Computing Perspective", 1995, pp. 245-247, 287, Taylor & Francis Ltd.
Brodie et al., "Dynamic Reconfigurable Computing", in Proc. of 9th Military and Aerospace Programmable Logic Devices International Conference, Sep. 2006.
Forgy, "RETE: A Fast Algorithm for the Many Pattern/Many Object Pattern Matching Problem", Artificial Intelligence, 1982, pp. 17-37, vol. 19.
Gupta et al., "High-Speed Implementations of Rule-Based Systems," ACM Transactions on Computer Systems, May 1989, pp. 119-146, vol. 7, Issue 2.
Gupta et al., "PMM: A Parallel Architecture for Production Systems," Proceedings of the IEEE, Apr. 1992, pp. 693-696, vol. 2.
Tau et al., "Transit Note #114: A First Generation DPGA Implementation", Jan. 1995, 9 pages.
U.S. Appl. No. 61/421,545, filed Dec. 9, 2010 (Taylor et al.).
Amendment with RCE filed for U.S. Appl. No. 11/561,615, dated Jul. 1, 2011.
"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.
"Overview, Field Programmable Port Extender", Jan. 2002 Gigabit Workshop Tutorial, Washington University, St. Louis, MO, Jan. 3-4, 2002, pp. 1-4.
"Payload PlusO Agere System Interface", Agere Systems Product Brief, Jun. 2001, downloaded from Internet, Jan. 2002, pp. 1-6.
"The Field-Programmable Port Extender (FPX)", downloaded from http://www.arl.wustl.edu/arl/ in Mar. 2002.
Aldwairi et al., "Configurable String Matching Hardware for Speeding up Intrusion Detection", SIRARCH Comput. Archit. News, vol. 33, No. 1, pp. 99-107, Mar. 2005.
Arnold et al., "The Splash 2 Processor and Applications", Proceedings 1993 IEEE International Conference on Computer Design: VLSI in Computers and Processors (ICCD '93), Oct. 3, 1993, pp. 482-485, IEEE Computer Society, Cambridge, MA USA.
Baer, "Computer Systems Architecture", 1980, pp. 262-265; Computer Science Press, Potomac, Maryland.
Baeza-Yates et al., "New and Faster Filters for Multiple Approximate String Matching", Random Structures and Algorithms (RSA), Jan. 2002, pp. 23-49, vol. 20, No. 1.
Baker et al., "High-throughput Linked-Pattern Matching for Intrusion Detection Systems", ANCS 2005: Proceedings of the 2005 Symposium on Architecture for Networking and Communications Systems, pp. 193-202, ACM Press, 2005.

(56) References Cited

OTHER PUBLICATIONS

Barone-Adesi et al., "Efficient Analytic Approximation of American Option Values", Journal of Finance, vol. 42, No. 2 (Jun. 1987), pp. 301-320.

Braun et al., "Layered Protocol Wrappers for Internet Packet Processing in Reconfigurable Hardware", Proceedings of Hot Interconnects 9 (HotI-9) Stanford, CA, Aug. 22-24, 2001, pp. 93-98.

Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.

Cho et al., "Deep Packet Filter with Dedicated Logic and Read Only Memories", 12th Annual IEEE Symposium on Field-Programmable Custom Computing Machines, Apr. 2004.

Choi et al., "Design of a Flexible Open Platform for High Performance Active Networks", Allerton Conference, 1999, Champaign, IL.

Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.

Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.

Compton et al., "Configurable Computing: A Survey of Systems and Software", Technical Report, Northwestern University, Dept. of ECE, 1999.

Compton et al., "Reconfigurable Computing: A Survey of Systems and Software", Technical Report, Northwestern University, Dept. of ECE, 1999, presented by Yi-Gang Tai.

Cong et al., "An Optional Technology Mapping Algorithm for Delay Optimization in Lookup-Table Based FPGA Designs", IEEE, 1992, pp. 48-53.

Crosman, "Who Will Cure Your Data Latency?", Storage & Servers, Jun. 20, 2007, URL: http://www.networkcomputing.com/article/printFullArticleSrc.jhtml?article ID=199905630.

Department of Computer Science & Engineering; "Technical Reports"; Publication (http://cse.seas.wustl.edu/Research/Publications.asp); Dec. 17, 2007; pp. 1-26; Washington University in St. Louis.

Ebeling et al., "RaPiD—Reconfigurable Pipelined Datapath", University of Washington, Dept. of Computer Science and Engineering, Sep. 23, 1996, Seattle, WA.

Franklin et al., "An Architecture for Fast Processing of Large Unstructured Data Sets." Proc. of 22nd Intl Conf. on Computer Design, Oct. 2004, pp. 280-287.

Franklin et al., "Assisting Network Intrusion Detection with Reconfigurable Hardware", Symposium on Field-Programmable Custom Computing Machines (FCCM 2002), Apr. 2002, Napa, California.

Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.

Halaas et al., "A Recursive MISD Architecture for Pattern Matching", IEEE Transactions on Very Large Scale Integration, vol. 12, No. 7, pp. 727-734, Jul. 2004.

Harris, "Pete's Blog: Can FPGAs Overcome the FUD?", Low-Latency.com, May 14, 2007, URL: http://www.a-teamgroup.com/article/pete-blog-can-fpgas-overcome-the-fud/.

Hauck et al., "Software Technologies for Reconfigurable Systems", Northwestern University, Dept. of ECE, Technical Report, 1996.

Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.

Hirsch, "Tech Predictions for 2008", Reconfigurable Computing, Jan. 16, 2008, URL: http://fpgacomputing.blogspot.com/2008_01_01_archive.html.

Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.

Hutchings et al., "Assisting Network Intrusion Detection with Reconfigurable Hardware", FCCM 2002: 10th Annual IEEE Symposium on Field-Programmable Custom Computing Machines, 2002.

International Search Report and Written Opinion for PCT/US2009/030623 dated May 5, 2009.

International Search Report for PCT/US2008/065955 dated Aug. 22, 2008.

International Search Report for PCT/US2008/066929 dated Aug. 29, 2008.

Keutzer et al., "A Survey of Programmable Platforms—Network Proc", University of California-Berkeley, pp. 1-29.

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.

Lockwood et al., "Hello, World: A Simple Application for the Field Programmable Port Extender (FPX)", Washington University, Department of Computer Science, Technical Report WUCS-00-12, Jul. 11, 2000.

Lockwood et al., "Parallel FPGA Programming over Backplane Chassis", Washington University, Department of Computer Science, Technical Report WUCS-00-11, Jun. 12, 2000.

Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.

Lockwood, "An Open Platform for Development of Network Processing Modules in Reprogrammable Hardware", IEC DesignCon 2001, Santa Clara, CA, Jan. 2001, Paper WB-19.

Lockwood, "Building Networks with Reprogrammable Hardware", Field Programmable Port Extender: Jan. 2002 Gigabit Workshop Tutorial, Washington University, St. Louis, MO, Jan. 3-4, 2002.

Lockwood, "Evolvable Internet Hardware Platforms", NASA/DoD Workshop on Evolvable Hardware (EHW'01), Long Beach, CA, Jul. 12-14, 2001, pp. 271-279.

Lockwood, "Hardware Laboratory Configuration", Field Programmable Port Extender: Jan. 2002 Gigabit Workshop Tutorial, Washington University, St. Louis, MO, Jan. 3-4, 2002.

Lockwood, "Introduction", Field Programmable Port Extender: Jan. 2002 Gigabit Workshop Tutorial, Washington University, St. Louis, MO, Jan. 3-4, 2002.

Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.

Lockwood, "Protocol Processing on the FPX", Field Programmable Port Extender: Jan. 2002 Gigabit Workshop Tutorial, Washington University, St. Louis, MO, Jan. 3-4, 2002.

Lockwood, "Simulation and Synthesis", Field Programmable Port Extender: Jan. 2002 Gigabit Workshop Tutorial, Washington University, St. Louis, MO, Jan. 3-4, 2002.

Lockwood, "Simulation of the Hello World Application for the Field-Programmable Port Extender (FPX)", Washington University, Applied Research Lab, Spring 2001 Gigabits Kits Workshop.

Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.

Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.

(56) References Cited

OTHER PUBLICATIONS

Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.

Navarro, "A Guided Tour to Approximate String Matching", ACM Computing Surveys, vol. 33, No. 1, Mar. 2001, pp. 31-88.

Nunez et al., "The X-MatchLITE FPGA-Based Data Compressor", Euromicro Conference 1999, Proceedings, Italy, Sep. 8-10, 1999, pp. 126-132, Los Alamitos, CA.

Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.

Ramakrishna et al., "A Performance Study of Hashing Functions for Hardware Applications", Int. Conf. on Computing and Information, May 1994, pp. 1621-1636, vol. 1, No. 1.

Ramakrishna et al., "Efficient Hardware Hashing Functions for High Performance Computers", IEEE Transactions on Computers, Dec. 1997, vol. 46, No. 12.

Ratha et al., "Convolution on Splash 2", Proceedings of IEEE Symposium on FPGAS for Custom Computing Machines, Apr. 19, 1995, pp. 204-213, Los Alamitos, California.

Ratha et al., "FPGA-based coprocessor for text string extraction", IEEE, Sep. 11-13, 2000, pp. 217-221.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Roy, "A bounded search algorithm for segmented channel routing for FPGA's and associated channel architecture issues", IEEE, Nov. 11, 1993, pp. 1695-1705, vol. 12.

Schmerken, "With Hyperfeed Litigation Pending, Exegy Launches Low-Latency Ticker Plant", in Wall Street & Technology Blog, Mar. 20, 2007, pp. 1-2.

Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.

Shah, "Understanding Network Processors", Version 1.0, University of California-Berkeley, Sep. 4, 2001.

Shirazi et al., "Quantitative Analysis of FPGA-based Database Searching", Journal of VLSI Signal Processing Systems for Signal, Image, and Video Technology, May 2001, pp. 85-96, vol. 28, No. 1/2, Kluwer Academic Publishers, Dordrecht, NL.

Sidhu et al., "Fast Regular Expression Matching Using FPGAs", IEEE Symposium on Field Programmable Custom Computing Machines (FCCM 2001), Apr. 2001.

Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.

Sourdis and Pnevmatikatos, "Fast, Large-Scale String Match for a 10Gbps FPGA-based Network Intrusion Detection System", 13th International Conference on Field Programmable Logic and Applications, 2003.

Tan et al., "A High Throughput String Matching Architecture for Intrusion Detection and Prevention", ISCA 2005: 32nd Annual International Symposium on Computer Architecture, pp. 112-122, 2005.

Taylor et al., "Generalized RAD Module Interface Specification of the Field Programmable Port Extender (FPX) Version 2", Washington University, Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St. Louis, MO, Jan. 3-4, 2002.

Taylor et al., "Scalable Packet Classification using Distributed Crossproducting of Field Labels", Proceedings of IEEE Infocom, Mar. 2005, pp. 1-12, vol. 20, No. 1.

Taylor, "Models, Algorithms, and Architectures for Scalable Packet Classification", doctoral thesis, Department of Computer Science and Engineering, Washington University, St. Louis, MO, Aug. 2004, pp. 1-201.

Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.

Web-Pop (Professional Options Package) (www.pmpublishing.com).

Exegy Inc., "Exegy and HyperFeed to Unveil Exelerate TP at SIA Conference", Release Date: Jun. 20, 2006, downloaded from: http://news.thomasnet.com/companystory/488004 on Jun. 19, 2006, 4 pages.

Exegy Inc., "First Exegy Ticker Plant Deployed", Release date: Oct. 17, 2006, downloaded from: http://news.thomasnet.com/companystory/496530 on Jun. 19, 2007, 5 pages.

"DRC, Exegy Announce Joint Development Agreement", Jun. 8, 2007 byline of Jun. 4, 2007, downloaded from: http://www.hpcwire.com/hpc/1595644.html on Jun. 19, 2007, 3 pages.

"ACTIV Financial Announces Hardware Based Market Data Feed Processing Strategy", For Release on Apr. 2, 2007, 2 pages.

"ACTIV Financial Delivers Accelerated Market Data Feed", Apr. 6, 2007 byline of Apr. 2, 2007, downloaded from: http://hpcwire.com/hpc.1346816.html on Jun. 19, 2007, 3 pages.

Feldman, "High Frequency Traders Get Boost From FPGA Acceleration" Jun. 8, 2007, downloaded from: http://www.hpcwire.com/hpc.1600113.html on Jun. 19, 2007, 4 pages.

"Technology Overview", downloaded from the http://www.datasearchsystems.com/tech.htm on Apr. 19, 2004.

West et al., "An FPGA-Based Search Engine for Unstructured Database", Proc. of 2nd Workshop on Application Specific Processors, Dec. 2003, San Diego, CA.

Chamberlain et al., "The Mercury System: Exploiting Truly Fast Hardware for Data Search", Proc. of Workshop on Storage Network Architecture and Parallel I/Os, Sep. 2003, New Orleans, LA.

Chamberlain et al., "The Mercury System: Embedding Computation Into Disk Drives", 7th High Performance Embedded Computing Workshop, Sep. 2003, Boston, MA.

Dharmapurikar, "Fast and Scalable Pattern Matching for Content Filtering", ACM, ANCS 05, 2005, pp. 183-192.

Office Action for U.S. Appl. No. 11/561,615 dated Sep. 28, 2009.

Notice of Allowance for U.S. Appl. No. 10/550,323 dated Aug. 5, 2011.

Notice of Allowance for U.S. Appl. No. 11/561,615 dated Sep. 12, 2011.

"RFC793: Transmission Control Protocol, Darpa Internet Program, Protocol Specification", Sep. 1981.

Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.

Artan et al., "Multi-packet Signature Detection using Prefix Bloom Filters", 2005, IEEE, pp. 1811-1816.

Baboescu et al., "Scalable Packet Classification".

Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.

Chaney et al., "Design of a Gigabit ATM Switch", Washington University, St. Louis.

Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.

(56) References Cited

OTHER PUBLICATIONS

Dharmapurikar et al., "Deep Packet Inspection Using Parallel Bloom Filters," Symposium on High Performance Interconnects (HotI), Stanford, California, 2003, pp. 44-51.
Dharmapurikar et al., "Longest Prefix Matching Using Bloom Filters," SIGCOMM, 2003, pp. 201-212.
Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.
Feldmann, "BLT: Bi-Layer Tracing of HTTP and TCP/IP", AT&T Labs-Research, Florham Park, NJ, USA.
Gupta et al., "Packet Classification on Multiple Fields", Computer Systems Laboratory, Stanford University, Stanford, CA.
Gurtov, "Effect of Delays on TCP Performance", Cellular Systems Development, Sonera Corporation.
International Search Report for PCT/US2002/033286; dated Jan. 22, 2003.
International Search Report for PCT/US2005/030046; dated Sep. 25, 2006.
Jacobson et al., "RFC 1072: TCP Extensions for Long-Delay Paths", Oct. 1988.
Jacobson et al., "tcpdump—dump traffic on a network".
Johnson et al., "Pattern Matching in Reconfigurable Logic for Packet Classification", College of Computing, Georgia Institute of Technology, Atlanta, GA.
Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.
Madhusudan, "Design of a System for Real-Time Worm Detection", Master's Thesis, Washington Univ., Dept. of Computer Science and Engineering, St. Louis, MO, Aug. 2004.
Madhusudan, "Design of a System for Real-Time Worm Detection", Power Point Presentation in Support of Master's Thesis, Washington Univ., Dept. of Computer Science and Engineering, St. Louis, MO, Aug. 2004.
Mao et al., "Cluster-based Online Monitoring System of Web Traffic", Dept. of Computer Science and Technology, Tsinghua Univ., Bejing, 100084 P.R. China.
Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.
Necker et al., "TCP-Stream Reassembly and State Tracking in Hardware", School of Electrical and Computer Engineering, Georgia Institute of Technology, Atlanta, GA.
Prakash et al., "OC-3072 Packet Classification Using BDDs and Pipelined SRAMs", Department of Electrical and Computer Engineering, The University of Texas at Austin.
Roberts, "Internet Still Growing Dramatically Says Internet Founder", Press Release, Caspian Networks, Inc.—Virtual Pressroom.
Schuehler et al., "Architecture for a Hardware Based, TCP/IP Content Scanning System", IEEE Micro, 24(1):62-69, Jan.-Feb. 2004, USA.
Schuehler et al., "TCP-Splitter: A TCP/IP Flow Monitor in Reconfigurable Hardware", Hot Interconnects 10 (HotI-10), Stanford, CA, Aug. 21-23, 2002, pp. 127-131.
Shalunov et al., "Bulk TCP Use and Performance on Internet 2".
Singh et al., "The EarlyBird System for Real-Time Detection on Unknown Worms", Technical report CS2003-0761, Aug. 2003.
Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.
Waldvogel et al., "Scalable High-Speed Prefix Matching".
Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.
Wooster et al., "HTTPDUMP Network HTTP Packet Snooper", Apr. 25, 1996.
Yan et al., "Enhancing Collaborative Spam Detection with Bloom Filters", 2006, IEEE, pp. 414-425.
Dehon, "DPGA-coupled microprocessors: commodity ICs for the early 21st Century", FPGAS for Custom Computing Machines, 1994, Proceedings. IEEE Workshop on Napa Valley, CA, pp. 31-39, Los Alamitos, CA.
Extended European Search Report for EP Application 09700535.9 dated Aug. 23, 2012.
Gokhale et al, "Reconfigurable Computing: Accelerating Computation with Field-Programmable Gate Arrays", Springer, 2005, pp. 1-36.
Office Action for U.S. Appl. No. 13/076,982 dated Nov. 8, 2012.
Office Action for U.S. Appl. No. 13/077,294 dated Dec. 26, 2012.
Office Action for U.S. Appl. No. 13/301,387 dated Jun. 6, 2012.
Response to Office Action for U.S. Appl. No. 13/077,294 dated May 10, 2012.
Response to Office Action for U.S. Appl. No. 13/301,340 dated May 9, 2012.
Response to Office Action for U.S. Appl. No. 13/301,387 dated Jun. 6, 2012.
Adachi, "Yoku Wakaru Kinyu Sakimono Torihiki" (guidance for financial futures trading), Nippon Jitsugyo Publishing, Aug. 30, 1997, pp. 113-115 and pp. 221-227.
Baker et al., "Time and Area Efficient Pattern Matching on FPGAs", ACM, Feb. 22-24, 2004, pp. 223-232.
Batory, "Modeling the Storage Architectures of Commercial Database Systems", ACM Transactions on Database Systems, Dec. 1985, pp. 463-528, vol. 10, issue 4.
Gokhale et al., "Reconfigurable Computing: Accelerating Computation with Field-Programmable Gate Arrays", Springer, 2005, pp. 1-54, 92-96.
Howe, Data Analysis for Database Design Third Edition, 2001, 335 pages, Butterworth-Heinemann.
Office Action for JP Application 2010-542380 dated Jul. 30, 2013.
Prosecution History for U.S. Appl. No. 13/077,294, now U.S. Pat. No. 8,600,856, filed Mar. 31, 2011 (Parsons et al.).
Kunitomo, Database First Edition, Jun. 28, 2008, pp. 174-175, Juse Press, Ltd., Japan.
Office Action for EP Application 09700535.9 dated Nov. 10, 2015.

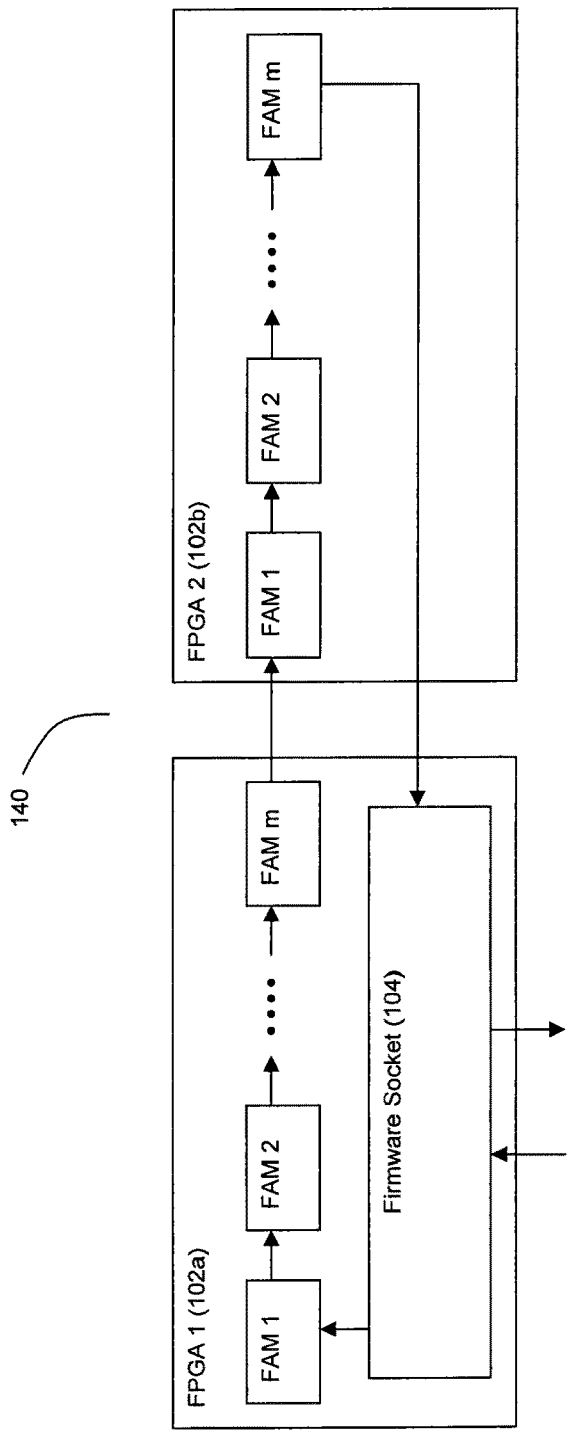
Figure 3
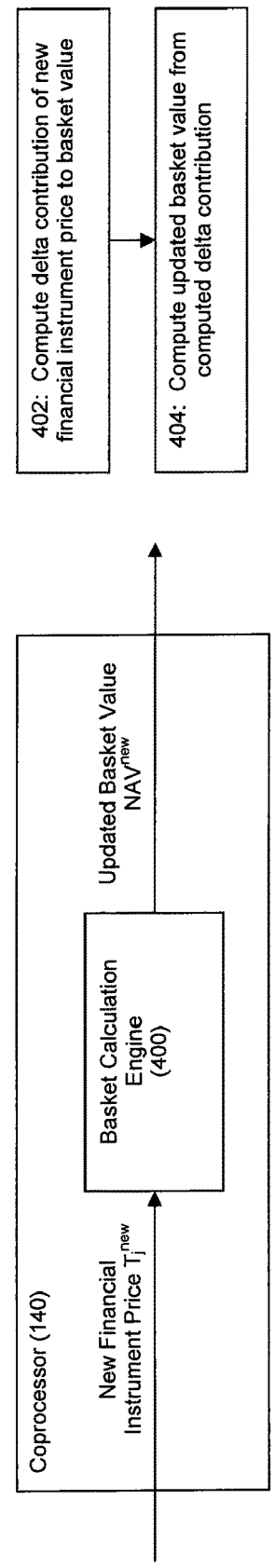
Figure 4(b)
Figure 4(a)

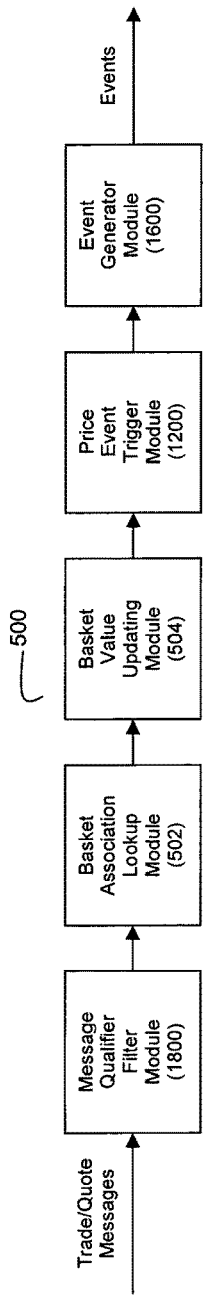
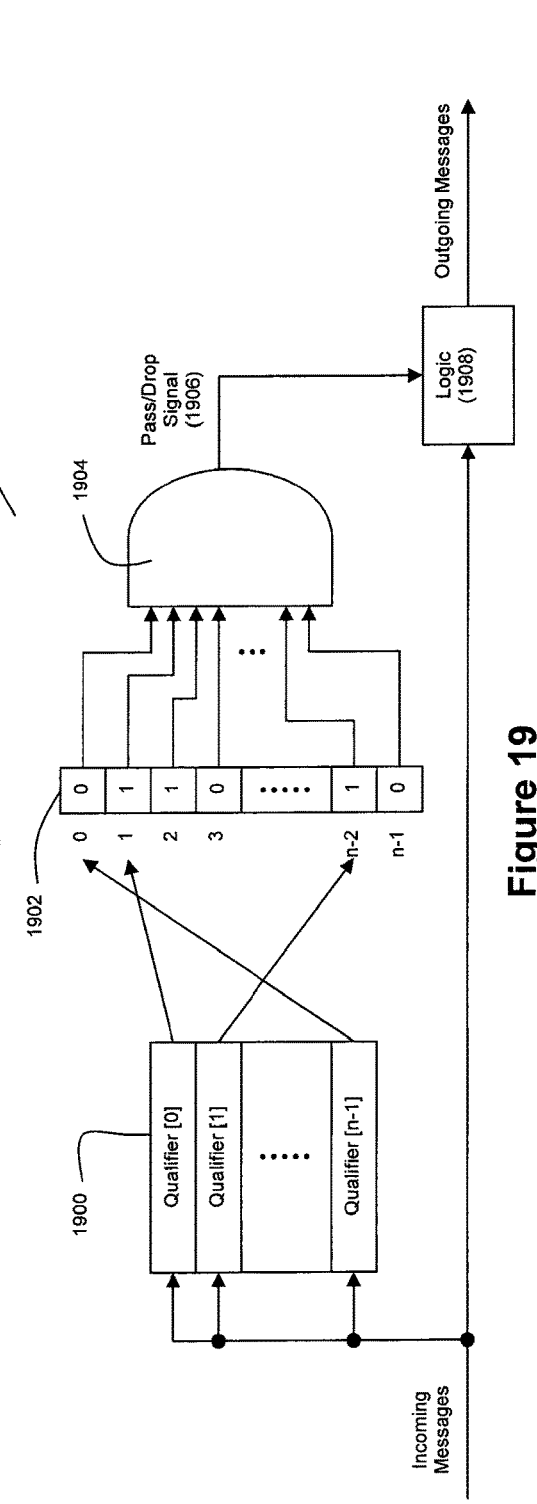
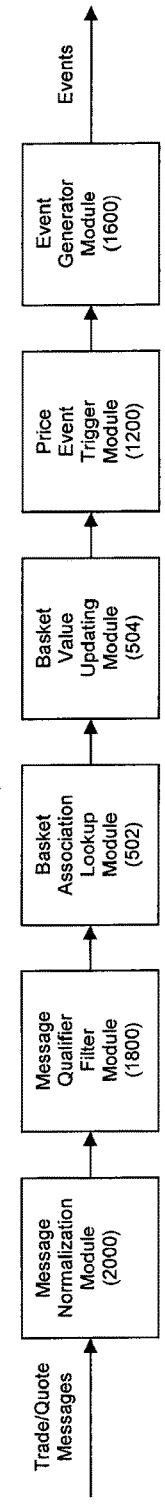
Figure 18
Figure 19
Figure 20

METHOD AND SYSTEM FOR LOW LATENCY BASKET CALCULATION

FIELD OF THE INVENTION

The present invention relates to the field of performing basket calculation operations based on streaming data, particularly streaming financial market data.

TERMINOLOGY

The following paragraphs provide several definitions for various terms used herein. These paragraphs also provide background information relating to these terms.

Financial Instrument: As used herein, a "financial instrument" refers to a contract representing an equity ownership, debt, or credit, typically in relation to a corporate or governmental entity, wherein the contract is saleable. Examples of financial instruments include stocks, bonds, commodities, currency traded on currency markets, etc. but would not include cash or checks in the sense of how those items are used outside the financial trading markets (i.e., the purchase of groceries at a grocery store using cash or check would not be covered by the term "financial instrument" as used herein; similarly, the withdrawal of $100 in cash from an Automatic Teller Machine using a debit card would not be covered by the term "financial instrument" as used herein).

Financial Market Data: As used herein, the term "financial market data" refers to data contained in or derived from a series of messages that individually represent a new offer to buy or sell a financial instrument, an indication of a completed sale of a financial instrument, notifications of corrections to previously-reported sales of a financial instrument, administrative messages related to such transactions, and the like.

Basket: As used herein, the term "basket" refers to a collection comprising a plurality of elements, each element having one or more values. The collection may be assigned one or more Net Values (NVs), wherein a NV is derived from the values of the plurality of elements in the collection. For example, a basket may be a collection of data points from various scientific experiments. Each data point may have associated values such as size, mass, etc. One may derive a size NV by computing a weighted sum of the sizes, a mass NV by computing a weighted sum of the masses, etc. Another example of a basket would be a collection of financial instruments, as explained below.

Financial Instrument Basket: As used herein, the term "financial instrument basket" refers to a basket whose elements comprise financial instruments. The financial instrument basket may be assigned one or more Net Asset Values (NAVs), wherein a NAV is derived from the values of the elements in the basket. Examples of financial instruments that may be included in baskets are securities (stocks), bonds, options, mutual funds, exchange-traded funds, etc. Financial instrument baskets may represent standard indexes, exchange-traded funds (ETFs), mutual funds, personal portfolios, etc. One may derive a last sale NAV by computing a weighted sum of the last sale prices for each of the financial instruments in the basket, a bid NAV by computing a weighted sum of the current best bid prices for each of the financial instruments in the basket, etc.

GPP: As used herein, the term "general-purpose processor" (or GPP) refers to a hardware device having a fixed form and whose functionality is variable, wherein this variable functionality is defined by fetching instructions and executing those instructions, of which a conventional central processing unit (CPU) is a common example. Exemplary embodiments of GPPs include an Intel Xeon processor and an AMD Opteron processor.

Reconfigurable Logic: As used herein, the term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture.

Software: As used herein, the term "software" refers to data processing functionality that is deployed on a GPP or other processing devices, wherein software cannot be used to change or define the form of the device on which it is loaded.

Firmware: As used herein, the term "firmware" refers to data processing functionality that is deployed on reconfigurable logic or other processing devices, wherein firmware may be used to change or define the form of the device on which it is loaded.

Coprocessor: As used herein, the term "coprocessor" refers to a computational engine designed to operate in conjunction with other components in a computational system having a main processor (wherein the main processor itself may comprise multiple processors such as in a multi-core processor architecture). Typically, a coprocessor is optimized to perform a specific set of tasks and is used to offload tasks from a main processor (which is typically a GPP) in order to optimize system performance. The scope of tasks performed by a coprocessor may be fixed or variable, depending on the architecture of the coprocessor. Examples of fixed coprocessor architectures include Graphics Processor Units which perform a broad spectrum of tasks and floating point numeric coprocessors which perform a relatively narrow set of tasks. Examples of reconfigurable coprocessor architectures include reconfigurable logic devices such as Field Programmable Gate Arrays (FPGAs) which may be reconfigured to implement a wide variety of fixed or programmable computational engines. The functionality of a coprocessor may be defined via software and/or firmware.

Hardware Acceleration: As used herein, the term "hardware acceleration" refers to the use of software and/or firmware implemented on a coprocessor for offloading one or more processing tasks from a main processor to decrease processing latency for those tasks relative to the main processor.

Bus: As used herein, the term "bus" refers to a logical bus which encompasses any physical interconnect for which devices and locations are accessed by an address. Examples of buses that could be used in the practice of the present invention include, but are not limited to the PCI family of buses (e.g., PCI-X and PCI-Express) and HyperTransport buses.

Pipelining: As used herein, the terms "pipeline", "pipelined sequence", or "chain" refer to an arrangement of application modules wherein the output of one application module is connected to the input of the next application module in the sequence. This pipelining arrangement allows each application module to independently operate on any data it receives during a given clock cycle and then pass its output to the next downstream application module in the sequence during another clock cycle.

BACKGROUND AND SUMMARY OF THE INVENTION

The ability to closely track the value of financial instrument baskets throughout a trading day as large volumes of events, such as trades and quotes, are constantly occurring is a daunting task. Every trade made on a financial instrument which is part of the portfolio of financial instruments underlying a financial instrument basket will potentially cause a change in that basket's value. The inventors herein believe that conventional techniques used to compute basket values have been unable to keep up with the high volume of events affecting basket values, thereby leading to inaccuracy for financial instrument basket values relative to the current state of the market because, with conventional techniques, the currently computed basket value will not be reflective of current market conditions, but rather market conditions as they existed anywhere from milliseconds to several seconds in the past.

As noted above, financial instrument baskets may represent standard indexes, ETFs, mutual funds, personal portfolios, etc.

An index represents the performance of a group of companies, wherein the group can be decided by various criteria such as market capitalization (e.g., the S&P 500), industry (e.g., the Dow Jones Industrial Average (DJIA)), etc.

A mutual fund is a professionally-managed form of collective investment wherein the buyer pays the fund owner a certain amount of money and in exchange receives shares of the fund.

ETFs are very similar to mutual funds with an important difference being that ETFs can be traded continuously throughout the trading day on an exchange, just like stocks. Therefore, the prices of ETFs fluctuate not only according to the changes in their underlying portfolios, but also due to changes in market supply and demand for the ETFs' shares themselves. Thus, ETFs provide the trading dynamics of stocks as well as the diversity of mutual funds. Additionally, ETFs typically track a well-established market index, trying to replicate the returns of the index.

Personal portfolios are groupings of financial instruments that are defined by an individual for his/her personal investment goals.

A financial instrument basket is defined by its set of underlying financial instruments. The basket definition also specifies a weight for each of the financial instruments within the basket. For example, consider a hypothetical basket denoted by B. Basket B contains M financial instruments with symbols $C_i$, wherein i=1, 2, . . . , M. Further, the weights of each financial instrument i in the basket is denoted by $w_i$, wherein i=1, 2, . . . , M. Associated with a basket is a measure of its monetary value known as its net asset value (NAV). If one assumes that the value at the current instant of each financial instrument i within basket B is $T_i$, wherein i=1, 2, . . . , M, then the NAV of basket B can be computed as:

$$NAV = \frac{1}{d}\sum_{i=1}^{M} w_i T_i \quad (1)$$

wherein d is a divisor that is associated with the basket and discussed in greater detail hereinafter. Thus, equation (1) specifies that a basket's NAV is the weighted sum of the worth of the financial instruments within the baskets, wherein the divisor acts as a normalizing factor.

The value of T represents a price for the financial instrument's shares. The price can be expressed as the last sale/trade price (last), the best offer to buy price (bid), the best offer to sell price (ask), or specific offer prices to buy or sell (limit orders).

The value of w can be defined differently for each basket. For example, with capitalization-weighted indexes (such as the S&P 500), the weight of the financial instrument can be defined as the number of outstanding shares of the financial instrument multiplied by a "free-float" factor, wherein the free-float factor is a number between 0 and 1 that adjusts for the fact that certain shares of the financial instrument are not publicly available for trading. With an equal-weighted index (such as the DJIA), the weight of a financial instrument is set to 1. With ETFs and personal portfolios, the weight of a financial instrument can be set equal to a specified number which reflects the fact that owning many shares for each of the basket's financial instruments amounts to owning one share of that ETF or personal portfolio. Thus, in order to own one share of basket B, one would have to purchase $w_1$ shares of financial instrument $C_1$, $w_2$ shares of financial instrument $C_2$, and so on up to $w_M$ shares of financial instrument $C_M$.

The value of d can also be defined differently for each basket. For an index, the divisor can be set to the current index divisor, which can be either the number of financial instruments in the index (e.g., 500 for the S&P 500) or some other specified value. For ETFs, the divisor can change during the trading day (as the divisor can also do with respect to indexes).

As indicated above, whenever there is a change in worth for one of a basket's underlying financial instruments, then the NAV for that basket should be calculated in accordance with formula (1). However, financial market data messages from exchanges stream into a platform such as a ticker plant at very high rates. For example, the options price reporting authority (OPRA) expects that its message rate in January 2008 will be approximately 800,000 messages/second. Each of these messages may potentially trigger multiple NAV recalculations. Moreover, because the same financial instrument may be a member of several baskets, the inventors herein estimate that, in order to track basket NAV values for all financial market data messages, the number of NAV calculations that will need to be performed every second will be at least on the order of 10 million NAV calculations/second. The inventors herein believe that conventional solutions are unable to keep up with such high update rates due to the serial nature of the conventional solutions, which constrain it to perform only one update at a time (including other tasks that a system may need to perform unrelated to basket calculations).

This shortcoming is problematic because it is highly desirable for financial traders to be able to calculate the basket NAVs extremely fast. An example will illustrate this desirability. As explained above, ETFs are baskets which can be traded like regular stocks on an exchange. The portfolio for an ETF is defined at the beginning of the trading day and remains fixed throughout the trading day barring rare events. Shares of ETFs can be created throughout the trading day by a creation process which works as follows. A buyer gives the owner of a fund the specified portfolio of financial instruments that make up the ETF and a cash payment in an amount equal to the dividend payments on those financial instruments (and possibly a transaction fee). The fund then issues shares of the ETF to the buyer. Shares of ETFs can also be redeemed for the underlying financial instruments in a similar manner: the investor gives the fund owner shares of the ETF (and possibly some cash as a transaction fee), and in return the investor receives the portfolio of financial instruments that make up the ETF and cash equal to the dividend payments on those financial instruments.

During the trading day, the price of the shares of the ETF fluctuates according to supply and demand, and the ETF's NAV changes according to the supply and demand of the financial instruments in the ETF's portfolio. It may well happen that, during the trading day, the trading price of the ETF deviates from its NAV. If the price of the ETF is higher than the NAV, then the ETF is said to be trading "at a premium". If the price of the ETF is lower than the NAV, then the ETF is said to be trading "at a discount". If a financial trader detects a discrepancy between the ETF share price and the ETF NAV, then he/she can exploit that discrepancy to make a profit by way of arbitrage.

In one scenario, assume that the ETF share price, denoted by $T_{ETF}$, is higher than the ETF's NAV. In this case, a trader can execute the following steps:
  Assemble a basket by purchasing the shares of the financial instruments in the ETF's portfolio at a total cost approximately equal to the NAV;
  Create an ETF share by exchanging the assembled basket with the fund owner; and
  Sell the ETF on the exchange at a price approximately equal to $T_{ETF}$.
If the difference between $T_{ETF}$ and the NAV is large enough to offset the transaction costs and other cash payments, then the trader can realize a profit by these actions. Moreover, this profit is realized by riskless arbitrage (assuming these steps could be performed instantaneously).

In another scenario, assume that the ETF share price, denoted by $T_{ETF}$, is lower than the ETF's NAV. In this case, a trader can purchase an ETF share, redeem it for the shares of the financial instruments in the portfolio, and sell those financial instrument shares on the exchange. Once again, if the difference between $T_{ETF}$ and the NAV is large enough to offset the transaction costs and other cash payments, then the trader can realize a profit at virtually no risk.

The crucial element in profiting from such riskless arbitrages for ETFs is detecting the difference between the ETF's share price and the ETF's NAV. The first trader to detect such discrepancies will stand to benefit the most, and the latency in NAV computation becomes important—the computation of the NAV should be performed as quickly as possible to beat competitors in the race toward detecting profit opportunities.

Independently of the ETF scenarios discussed above, another utility of basket NAV calculation is that the NAV provides a measure of how the basket's portfolio is faring. A steadily increasing NAV indicates that investing in more such baskets may be profitable. On the other hand, a decreasing NAV indicates that it may be desirable to sell the basket portfolio in order to avoid loss. This strategy is similar to ones that would be employed when trading in the shares of an individual financial instrument with the basket providing a benefit by mitigating risk through diversification across a portfolio of financial instruments (e.g., if the basket as a whole has an increasing NAV, then investing in that basket will be desirable independently of how any individual financial instrument in the basket is performing).

In an effort to satisfy a need in the art for high volume low latency basket value computations, the inventors herein disclose a technique for computing basket values for a set of baskets based on the data within a high speed data stream as that data streams through a processor.

According to one aspect of a preferred embodiment of the present invention, the inventors disclose a technique for computing basket values wherein a coprocessor is used to perform the basket calculations. By offloading the computational burden of the basket calculations to a coprocessor, the main processor for a system can be freed to perform different tasks. The coprocessor preferably hardware accelerates the basket calculations using reconfigurable logic, such as Field Programmable Gate Arrays (FPGAs). In doing so, a preferred embodiment preferably harnesses the underlying hardware-accelerated technology disclosed in the following patents and patent applications: U.S. Pat. No. 6,711,558 entitled "Associated Database Scanning and Information Retrieval", U.S. Pat. No. 7,139,743 entitled "Associative Database Scanning and Information Retrieval using FPGA Devices", U.S. Patent Application Publication 2006/0294059 entitled "Intelligent Data Storage and Processing Using FPGA Devices", U.S. Patent Application Publication 2007/0067108 entitled "Method and Apparatus for Performing Biosequence Similarity Searching", U.S. Patent Application Publication 2008/0086274 entitled "Method and Apparatus for Protein Sequence Alignment Using FPGA Devices", U.S. Patent Application Publication 2007/0130140 entitled "Method and Device for High Performance Regular Expression Pattern Matching", U.S. Patent Application Publication 2007/0260602 entitled "Method and Apparatus for Approximate Pattern Matching", U.S. Patent Application Publication 2007/0174841 entitled "Firmware Socket Module for FPGA-Based Pipeline Processing", U.S. Patent Application Publication 2007/0237327 entitled "Method and System for High Throughput Blockwise Independent Encryption/Decryption", U.S. Patent Application Publication 2007/0294157 entitled "Method and System for High Speed Options Pricing", and U.S. Patent Application Publication 2008/0243675entitled "High Speed Processing of Financial Information Using FPGA Devices", the entire disclosures of each of which are incorporated herein by reference.

According to another aspect of a preferred embodiment of the present invention, the inventors disclose that the different tasks involved in such basket calculations can be relegated to different modules within a pipeline. For example, one pipeline module can be configured to determine which baskets are impacted by a current data event within the stream. Another pipeline module can be configured to receive information about the impacted baskets and compute data indicative of a new basket value for each of those impacted baskets. By pipelining these modules together, the two modules can work on different messages and/or baskets at the same time in parallel with each other.

In a preferred embodiment, this pipeline comprises a basket association lookup module in communication with a basket value updating module. The basket association lookup module is configured to determine which baskets are impacted by each data message, while the basket value updating module is configured to compute at least one new value for each impacted basket based on the information within the data messages (for example, in an embodiment operating on financial market data, this information can be the financial instrument price information within the financial market data messages).

The basket value updating module preferably employs a delta calculation approach to the computation of the updated basket values, as explained in greater detail below. With such an approach, the number of arithmetic operations needed to compute each basket value will remain the same regardless of how many elements such as financial instruments are members of a given basket. Furthermore, the basket value updating module may optionally be configured to compute a plurality of different types of basket values for the same basket simultaneously using parallel computation logic.

The basket association lookup module preferably accesses a basket set table which stores at least a portion of the data needed by the basket value updating module for the basket value calculations. In a preferred embodiment pertaining to financial information, this data can be indirectly indexed in the table by financial instrument such that, as a new message pertaining to a financial instrument is received, the appropriate data needed for the basket calculations can be retrieved. To provide the indirection, a second table is employed which indexes pointers into the basket set table by financial instrument.

Furthermore, in an embodiment wherein the pipeline comprises a firmware pipeline deployed on a coprocessor such as a reconfigurable logic device, the design of these modules can be tailored to the hardware capabilities of the coprocessor, thereby providing a level of synergy that streamlines the basket calculations so that the data streams can be processed at line speeds while a main processor is still free to perform other tasks.

The inventors also note that the pipeline can employ a price event trigger module downstream from the basket value updating module. The price event trigger module can be configured to determine whether any of the updated basket values meet a client-specified trigger condition. Any updated basket values which meet the client-specified trigger condition can then be forwarded to the attention of the pertinent client (e.g., a particular trader, a particular application, etc.). By doing so, clients can take advantage of the low latency nature of the basket calculation pipeline to learn of trading opportunities which may be available.

Furthermore, the pipeline can employ an event generator module downstream from the price event trigger module, wherein the role of the event generator module is to generate a message event for delivery to the client in response to a trigger being set off by the price event trigger module. This message event preferably contains the updated basket value.

Further still, to limit the volume of financial market data messages processed by the basket association lookup module (and its downstream modules in the pipeline), the pipeline can employ a message qualifier filter module upstream from the basket association lookup module. Preferably, the message qualifier filter module is configured to drop messages from the financial market data message stream which are not pertinent to the basket calculations.

A pipeline such as the one described herein can be used in an embodiment of the invention to identify arbitrage conditions (such as the ETF arbitrage scenario discussed above) as they may arise in connection with financial instrument baskets and the current state of the markets. By detecting these arbitrage conditions quickly via the low latency basket calculation pipeline, a trader is enabled to make trades on one or more exchanges which take advantage of the detected arbitrage condition.

These and other features and advantages of the present invention will be apparent to those having ordinary skill in the art upon review of the following description and drawings.

BRIEF DESCRIPTION OF THE DRAWINGS

FIG. 3 illustrates an example of how a firmware pipeline can be deployed across multiple reconfigurable logic devices;

FIG. 4(a) is a high level block diagram view of how a coprocessor can be used to perform basket calculations;

FIG. 4(b) illustrates an exemplary process flow for computing an updated basket value using a delta calculation approach;

FIG. 18 depicts an exemplary basket calculation engine pipeline in accordance with yet another embodiment of the invention;

FIG. 19 depicts an exemplary message qualifier filter module;

FIG. 20 depicts an exemplary basket calculation engine pipeline in accordance with another embodiment of the invention.

DETAILED DESCRIPTION OF THE PREFERRED EMBODIMENT

Figure 1A:
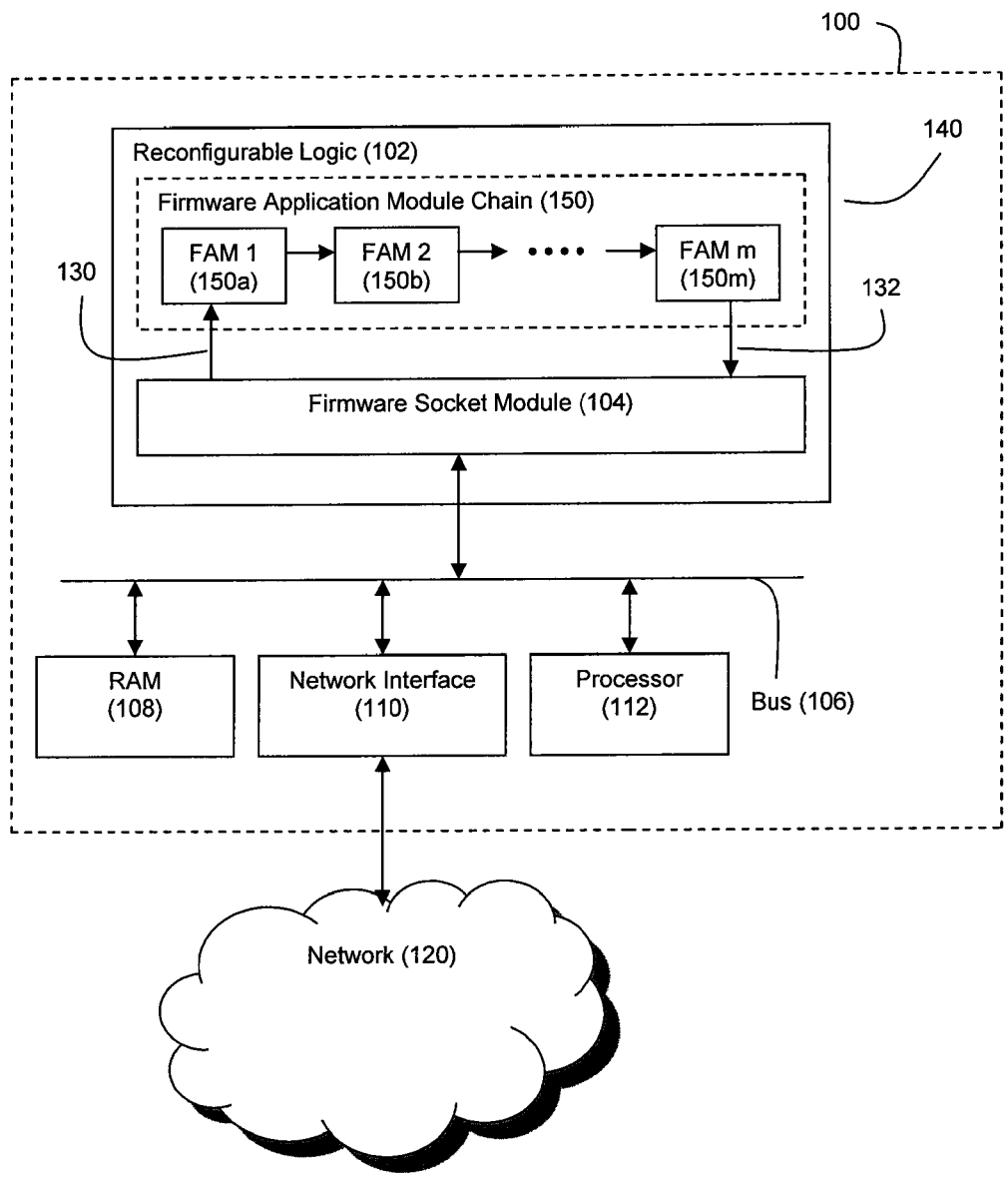
FIGS. 1(a) and (b) depict exemplary embodiments for a system on which hardware-accelerated basket calculations can be performed.

FIG. 1(a) depicts an exemplary embodiment for system 100 configured to perform high speed basket calculations. Preferably, system 100 employs a hardware-accelerated data processing capability through coprocessor 140 to perform basket calculations. Within system 100, a coprocessor 140 is positioned to receive data that streams into the system 100 from a network 120 (via network interface 110). In a preferred embodiment, system 100 is employed to receive financial market data and perform basket calculations for financial instrument baskets. Network 120 thus preferably comprises a network through which system 100 can access a source for financial data such as the exchanges themselves (e.g., NYSE, NASDAQ, etc.) or a third party provider (e.g., extranet providers such as Savvis or BT Radians). Such incoming data preferably comprises a series of financial market data messages, the messages representing events such as trades and quotes relating to financial instruments. These messages can exist in any of a number of formats, as is known in the art.

The computer system defined by processor 112 and RAM 108 can be any commodity computer system as would be understood by those having ordinary skill in the art. For example, the computer system may be an Intel Xeon system or an AMD Opteron system. Thus, processor 112, which serves as the central or main processor for system 100, preferably comprises a GPP.

In a preferred embodiment, the coprocessor 140 comprises a reconfigurable logic device 102. Preferably, data streams into the reconfigurable logic device 102 by way of system bus 106, although other design architectures are possible (see FIG. 2(*b*)). Preferably, the reconfigurable logic device 12 is a field programmable gate array (FPGA), although this need not be the case. System bus 106 can also interconnect the reconfigurable logic device 102 with the processor 112 as well as RAM 108. In a preferred embodiment, system bus 106 may be a PCI-X bus or a PCI-Express bus, although this need not be the case.

The reconfigurable logic device 102 has firmware modules deployed thereon that define its functionality. The firmware socket module 104 handles the data movement requirements (both command data and target data) into and out of the reconfigurable logic device, thereby providing a consistent application interface to the firmware application module (FAM) chain 150 that is also deployed on the reconfigurable logic device. The FAMs 150*i* of the FAM chain 150 are configured to perform specified data processing operations on any data that streams through the chain 150 from the firmware socket module 404. Preferred examples of FAMs that can be deployed on reconfigurable logic in accordance with a preferred embodiment of the present invention are described below.

The specific data processing operation that is performed by a FAM is controlled/parameterized by the command data that FAM receives from the firmware socket module 104. This command data can be FAM-specific, and upon receipt of the command, the FAM will arrange itself to carry out the data processing operation controlled by the received command. For example, within a FAM that is configured to perform an exact match operation between data and a key, the FAM's exact match operation can be parameterized to define the key(s) that the exact match operation will be run against. In this way, a FAM that is configured to perform an exact match operation can be readily re-arranged to perform a different exact match operation by simply loading new parameters for one or more different keys in that FAM. As another example pertaining to baskets, a command can be issued to the one or more FAMs that make up a basket calculation engine to add/delete one or more financial instruments to/from the basket.

Once a FAM has been arranged to perform the data processing operation specified by a received command, that FAM is ready to carry out its specified data processing operation on the data stream that it receives from the firmware socket module. Thus, a FAM can be arranged through an appropriate command to process a specified stream of data in a specified manner. Once the FAM has completed its data processing operation, another command can be sent to that FAM that will cause the FAM to re-arrange itself to alter the nature of the data processing operation performed thereby. Not only will the FAM operate at hardware speeds (thereby providing a high throughput of data through the FAM), but the FAMs can also be flexibly reprogrammed to change the parameters of their data processing operations.

The FAM chain 150 preferably comprises a plurality of firmware application modules (FAMs) 150*a*, 150*b*, . . . that are arranged in a pipelined sequence. However, it should be noted that within the firmware pipeline, one or more parallel paths of FAMs 150*i* can be employed. For example, the firmware chain may comprise three FAMs arranged in a first pipelined path (e.g., FAMs 150*a*, 150*b*, 150*c*) and four FAMs arranged in a second pipelined path (e.g., FAMs 150*d*, 150*e*, 150*f*, and 150*g*), wherein the first and second pipelined paths are parallel with each other. Furthermore, the firmware pipeline can have one or more paths branch off from an existing pipeline path. A practitioner of the present invention can design an appropriate arrangement of FAMs for FAM chain 150 based on the processing needs of a given application.

A communication path 130 connects the firmware socket module 104 with the input of the first one of the pipelined FAMs 150*a*. The input of the first FAM 150*a* serves as the entry point into the FAM chain 150. A communication path 132 connects the output of the final one of the pipelined FAMs 150*m* with the firmware socket module 104. The output of the final FAM 150*m* serves as the exit point from the FAM chain 150. Both communication path 130 and communication path 132 are preferably multi-bit paths.

The nature of the software and hardware/software interfaces used by system 100, particularly in connection with data flow into and out of the firmware socket module are described in greater detail in the above-referenced and incorporated U.S. Patent Application Publication 2007/0174841.

Figure 1B:
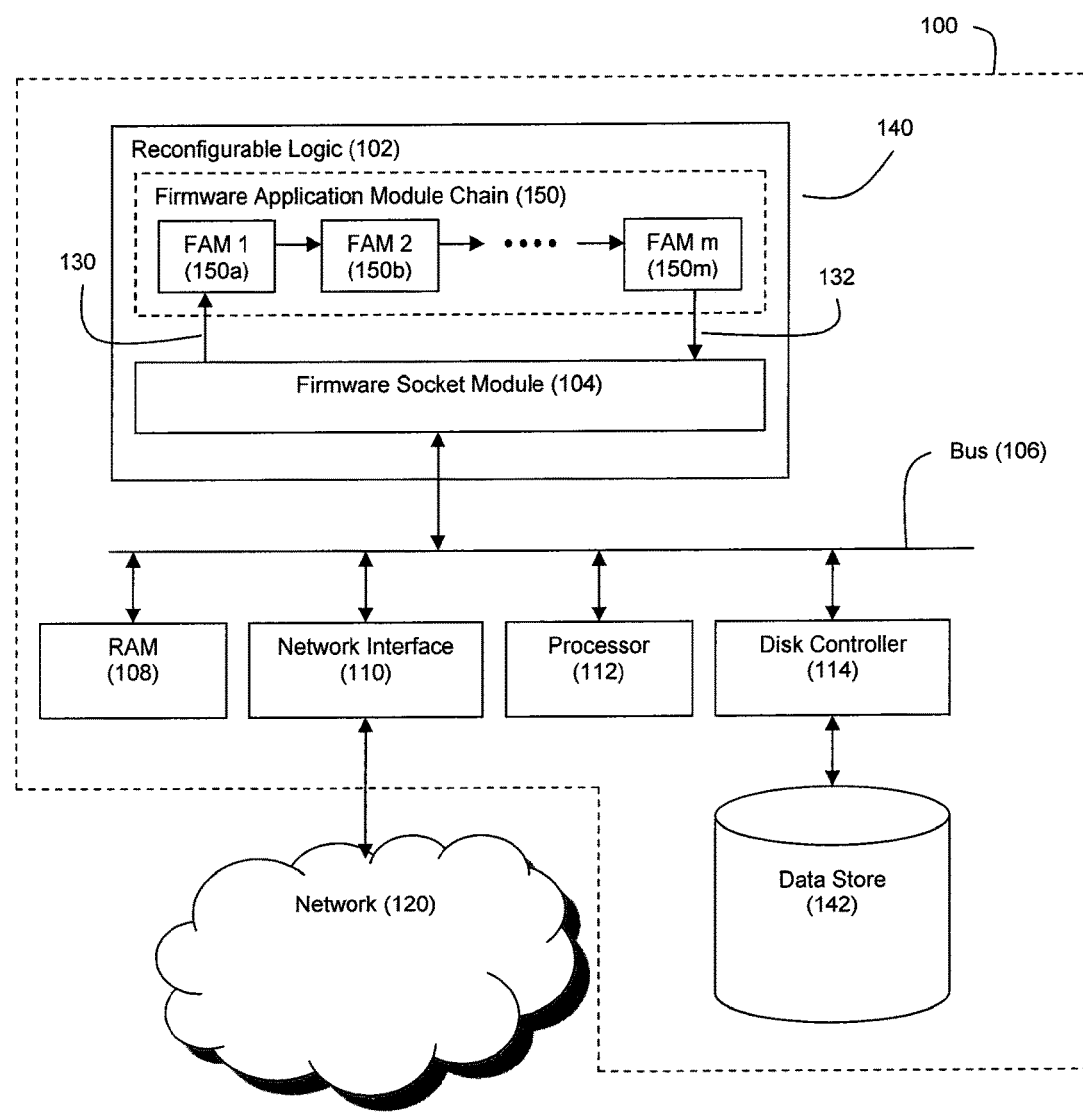

FIG. 1(*b*) depicts another exemplary embodiment for system 100. In the example of FIG. 1(*b*), system 100 includes a data store 142 that is in communication with bus 106 via disk controller 114. Thus, the data that is streamed through the coprocessor 140 may also emanate from data store 142. Data store 142 can be any data storage device/system, but it is preferably some form of mass storage medium. For example, data store 142 can be a magnetic storage device such as an array of Seagate disks.

Figure 2A:
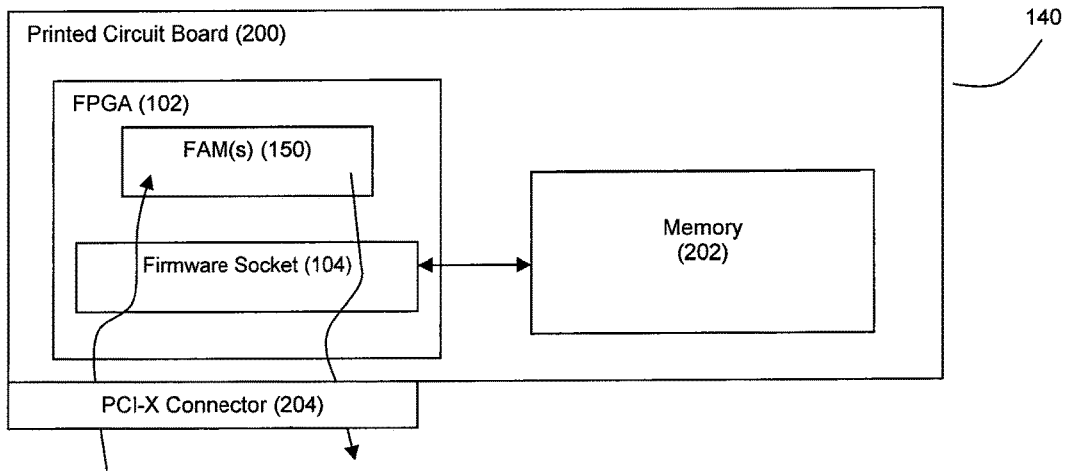
FIGS. 2(a) and (b) illustrate exemplary printed circuit boards for use as coprocessor 140.
Figure 2B:
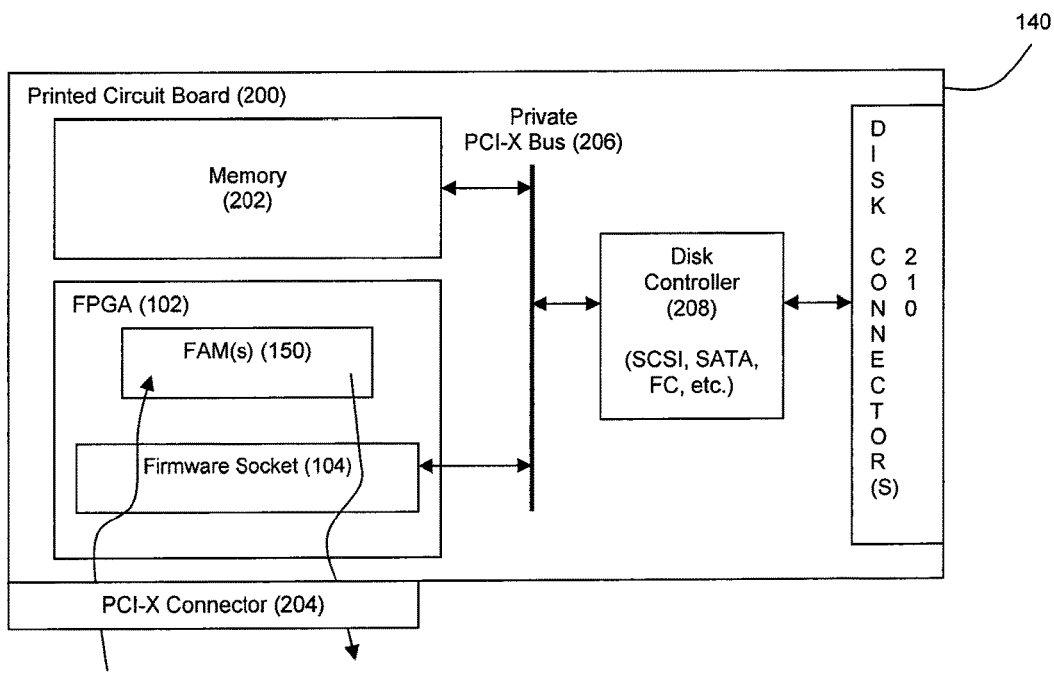

FIG. 2(*a*) depicts a printed circuit board or card 200 that can be connected to the PCI-X or PCI-e bus 106 of a commodity computer system for use as a coprocessor 140 in system 100 for any of the embodiments of FIGS. 1(*a*)-(*b*). In the example of FIG. 2(*a*), the printed circuit board includes an FPGA 102 (such as a Xilinx Virtex II FPGA) that is in communication with a memory device 202 and a PCI-X bus connector 204. A preferred memory device 202 comprises SRAM and DRAM memory. A preferred PCI-X or PCI-e bus connector 204 is a standard card edge connector.

FIG. 2(*b*) depicts an alternate configuration for a printed circuit board/card 200. In the example of FIG. 2(*b*), a bus 206 (such as a PCI-X or PCI-e bus), one or more disk controllers 208, and a disk connector 210 are also installed on the printed circuit board 200. Any commodity disk interface technology can be supported, as is understood in the art. In this configuration, the firmware socket 104 also serves as a PCI-X to PCI-X bridge to provide the processor 112 with normal access to any disk(s) connected via the private PCI-X bus 206. It should be noted that a network interface can be used in addition to or in place of the disk controller and disk connector shown in FIG. 2(*b*).

It is worth noting that in either the configuration of FIG. 2(*a*) or 2(*b*), the firmware socket 104 can make memory 202 accessible to the bus 106, which thereby makes memory 202 available for use by an OS kernel as the buffers for transfers to the FAMs from a data source with access to bus. It is also worth noting that while a single FPGA 102 is shown on the printed circuit boards of FIGS. 2(a) and (b), it should be understood that multiple FPGAs can be supported by either including more than one FPGA on the printed circuit board 200 or by installing more than one printed circuit board 200 in the system 100. FIG. 3 depicts an example where numerous FAMs in a single pipeline are deployed across multiple FPGAs.

FIG. 4(a) depicts at a high level a coprocessor 140 that receives an incoming stream of new financial instrument prices, $T_j^{new}$, and computes new basket values, $NAV^{new}$, in response to the received stream using a basket calculation engine 400. By offloading the basket calculations to coprocessor 140, the system 100 can greatly decrease the latency of calculating new basket values in response to new financial instrument prices.

The basket calculation engine (BCE) 400 preferably derives its computation of $NAV^{new}$ from formula (1). A direct implementation of formula (1) by BCE 400 would comprise M multiplications, M-1 additions, and 1 division. While a practitioner of the invention may choose to implement such a direct use of formula (1) within BCE 400, a preferred embodiment for BCE 400 reduces the number of arithmetic operations that need to be performed to realize the function of formula (1). Given that the basis upon which the NAV for a basket is to be updated is a new price for one of the basket's underlying financial instruments, it suffices to calculate the contribution to the basket's NAV of the difference between the new financial instrument price and the old financial instrument price. This calculated contribution can then be added to the old NAV value for the basket to find the updated NAV value. This process is referred to herein as a "delta calculation" for the NAV. This basis for this delta calculation approach is shown below, starting with formula (1).

$$NAV^{new} = \frac{1}{d}\sum_{i=1}^{M} w_i T_i \qquad (2)$$

$$NAV^{new} = \left(\frac{1}{d}\sum_{\substack{i=1\\i\ne j}}^{M} w_i T_i\right) + \left(\frac{1}{d} w_j T_j^{new}\right)$$

$$NAV^{new} = \left(\frac{1}{d}\sum_{\substack{i=1\\i\ne j}}^{M} w_i T_i\right) + \left(\frac{1}{d} w_j T_j^{new}\right) + \frac{1}{d}(w_j T_j^{old} - w_j T_j^{old})$$

$$NAV^{new} = \frac{1}{d}\left(\left(\sum_{\substack{i=1\\i\ne j}}^{M} w_i T_i\right) + w_j T_j^{old}\right) + \frac{1}{d}(w_j T_j^{new} - w_j T_j^{old})$$

$$NAV^{new} = \frac{1}{d}\left(\left(\sum_{\substack{i=1\\i\ne j}}^{M} w_i T_i\right) + w_j T_j^{old}\right) + \frac{w_j}{d}(T_j^{new} - T_j^{old})$$

$$NAV^{new} = NAV^{old} + \Delta j$$

Thus, it can be seen that $NAV^{new}$ can be computed as the sum of the old NAV price, $NAV^{old}$, and $\Delta j$, wherein $\Delta j$ represents the delta contribution to the NAV of the new financial instrument price, and wherein $\Delta j$ is computed as:

$$\Delta j = \frac{w_j}{d}(T_j^{new} - T_j^{old}) \qquad (3)$$

Accordingly, it can be seen that the delta calculation approach can reduce the number of computations needed to calculate the new basket value from M multiplications, M-1 additions, and 1 division to only 1 subtraction, 1 multiplication, 1 division, and 1 addition. This reduction can lead to powerful improvements in computational efficiency because a single basket may contain an arbitrary number of financial instruments. It should be noted that, for some baskets, the value of M may be quite large. For example, a basket may be used to compute the Wilshire 5000 stock index, which is an index that includes approximately 6,300 securities. However, the presence of such a large number of securities within the Wilshire 5000 stock index would not add to the computational latency of a BCE 400 which employs the delta calculation approach because the NAV computation for such a basket will be based on formula (2) above.

FIG. 4(b) depicts a high level process flow for the computation of the updated basket value by the BCE 400. At step 402, the BCE computes the delta contribution $\Delta j$ of the new financial instrument price $T_j^{new}$ to the basket value (see formula (3)). At step 404, the BCE computes the updated basket value $NAV^{new}$ from the computed delta contribution (see formula (2)).

Figure 5:
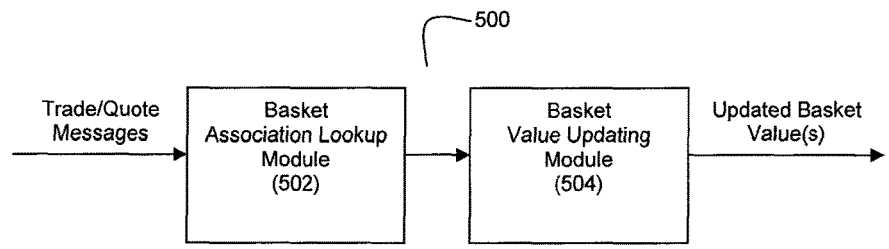
FIG. 5 depicts an exemplary basket calculation engine pipeline in accordance with an embodiment of the invention.

FIG. 5 depicts a preferred pipeline 500 for realizing the BCE 400. Preferably, pipeline 500 is deployed as a firmware pipeline 150 on a reconfigurable logic device 102. The pipeline 500 preferably comprises a basket association lookup module 502 and a downstream basket value updating module 504. The basket association lookup module 502 receives a stream of financial market data messages, wherein each message represents a change in the bid, ask, and/or last price of a single financial instrument. Each message preferably comprises at least a symbol identifier, a global exchange identifier, and one or more of a last price, a bid price, and an ask price for the financial instrument corresponding to the symbol identifier. The symbol identifier (or symbol ID) preferably comprises a binary tag that uniquely identifies a particular financial instrument. The global exchange identifier (GEID) preferably comprises a binary tag that uniquely identifies a particular exchange for which the message is relevant. Data tags within the messages preferably identify whether the price information within the message pertains to a bid/ask/last price for the financial instrument. Also, the message fields are preferably normalized as between the different message sources such prior to the time the messages reach the basket association lookup module 502.

The basket association lookup (BAL) module 502 is configured to determine, for each incoming message, a set of baskets which include the financial instrument that is the subject of that message. This basket set may comprise a plurality Q of baskets (although it should be noted that only one basket may potentially be present within the basket set). Thus, the volume heavy nature of tracking basket values for each financial market data message can be understood as each message causing a need for at least Q basket value calculations (a 1:Q expansion). In an exemplary embodiment, the maximum value for Q can be 1,024 baskets. However, other values could readily be used.

Figure 6:
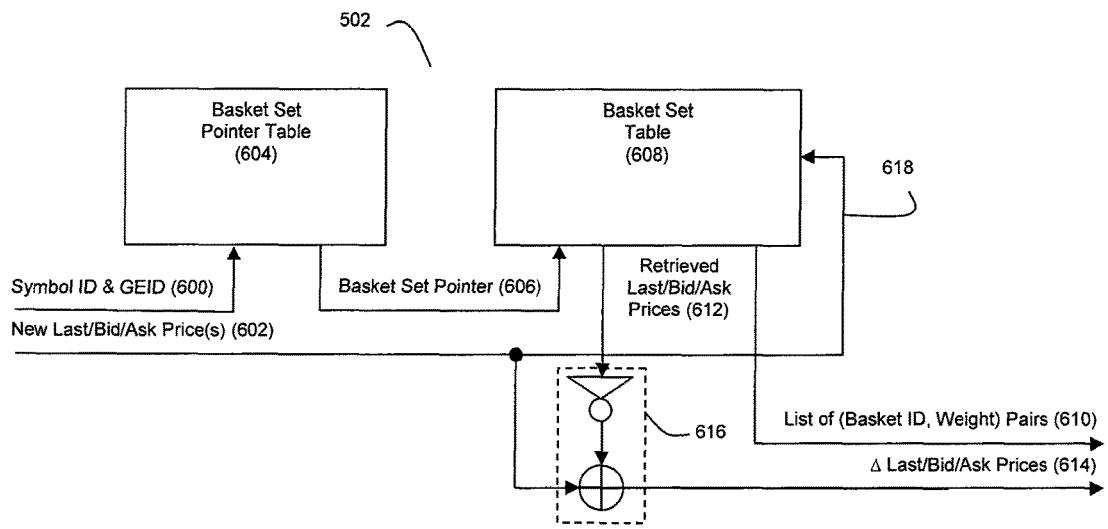
FIG. 6 depicts an exemplary basket association lookup module.

FIG. 6 depicts an exemplary BAL module 502. System 100 preferably maintains a record for every known financial instrument, wherein each record preferably contains the list of baskets which contain that financial instrument, the relative weight of the financial instrument within each basket on the list, and the most recent bid, ask, and last sale price for the financial instrument. These records are preferably stored in a basket set table 608. System 100 also preferably maintains a basket set pointer table 604. Table 604 preferably comprises a set of pointers and other information that point to appropriate records in the basket set table 608. The use of the basket set pointer table 604 in combination with the basket set table 608 allows for more flexibility in managing the content of the basket set table 608. In an embodiment wherein the coprocessor employs a memory 202 such as that shown in FIGS. 2(a) and (b), this memory 202 may comprise an SRAM memory device and an SDRAM memory device. Preferably, the basket set pointer table 604 can be stored in the SRAM memory device while the basket set table 608 can be stored in the SDRAM memory device. However, it should also be noted that, for an embodiment of the coprocessor wherein one or more FPGA chips are used, either or both of tables 604 and 608 can be stored in available on-chip memory should sufficient memory be available. Furthermore, tables 604 and 608 could be stored in other memory devices within or in communication with system 100.

In operation, the BAL module 502 performs a lookup in the basket set pointer table 604 using the symbol ID and GEID 600 for each message. Based on the symbol ID and GEID 600, a basket set pointer 606 is retrieved from table 604, and the BAL module 502 uses this basket set pointer 606 to perform a lookup in the basket set table 608. The lookup in the basket set table 608 preferably operates to identify the basket set 610 for the financial instrument identified by the symbol ID and identify the stored last/bid/ask prices 612 for that financial instrument. Each basket set comprises identifiers for one or more baskets of which that financial instrument is a member.

A subtractor 616 preferably operates to subtract the retrieved last/bid/ask prices 612 from the new last/bid/ask prices 602 contained in the current message to thereby compute the changes in the last/bid/ask prices 614, as shown in FIG. 6. It should be noted that each message may comprise one or more price fields for the subject financial instrument. For any price fields not contained within the message, the resultant price change is preferably treated as zero. Thus, if a message does not contain the last sale price for the financial instrument, then the ΔLast price will be zero.

Figure 7:
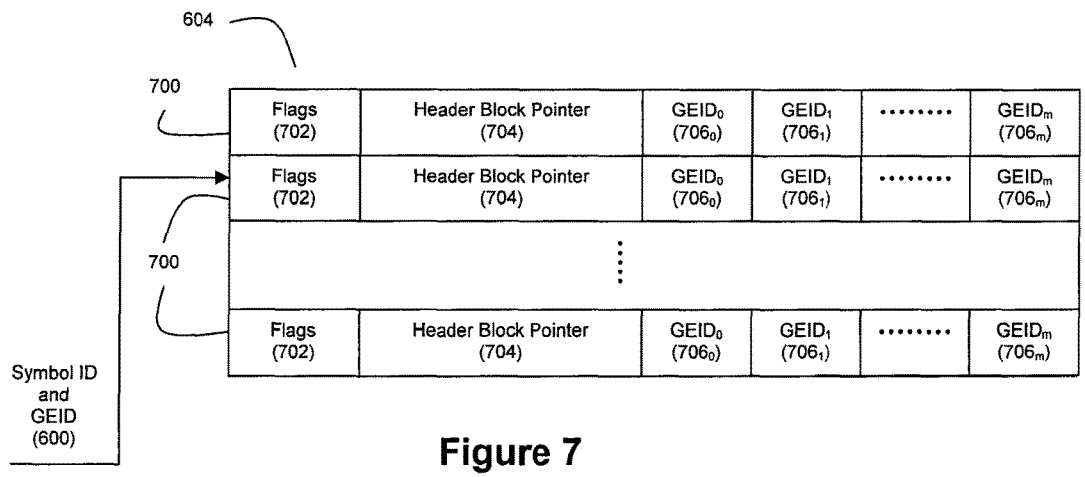
FIG. 7 depicts an exemplary basket set pointer table.

FIG. 7 depicts an exemplary embodiment for the basket set pointer table 604 in greater detail. Table 604 comprises a plurality of records 700, wherein each record comprises a bit string corresponding to a set of flags 702, a bit string corresponding to a header block pointer 704, and a plurality of bit strings corresponding to different GEIDs 706. Each record 700 is keyed by a symbol ID such that the BAL module 502 is able to retrieve the record 700 from table 604 which corresponds to the symbol ID of the current message. The flags 702 denote whether the record 700 is valid (i.e., whether the subject financial instrument is contained within at least one basket). The header block pointer 704 serves as a pointer to a basket association record in table 608 for the financial instrument corresponding to the symbol ID.

Also, a given financial instrument may be fungible on multiple financial exchanges. The state of a financial instrument on a given exchange (e.g., the NYSE) is referred to as the regional view for that financial instrument. The aggregate state of that financial instrument across all exchanges is referred to as the composite view for that financial instrument. The composite value for the last price is preferably the most recent sales price for the financial instrument on any exchange. The composite value for the bid price is preferably the best of the bid prices for the financial instrument across all of exchanges on which that financial instrument is traded. The composite view for the ask price is preferably the best of the ask prices for the financial instrument across all of exchanges on which that financial instrument is traded. Thus, the bid price and ask price in the composite view are commonly referred to as the Best Bid and Offer (BBO) prices. Tables 604 and 608 allow for baskets to be defined with regional and/or composite views of financial instruments. For example, basket A may contain the composite view of the 10 technology stocks with the largest market capitalization. Basket B may contain the NYSE regional view of the 10 technology stocks with the largest market capitalization. Basket C may contain the composite view for 10 technology stocks and the NYSE regional view for 10 industrial stocks.

To accommodate such flexible basket definitions, table 604 preferably employs a plurality of GEID fields 706 within each record 700. Each GEID field 706 serves as a further index into table 608 to retrieve the appropriate composite basket association record and/or regional basket association record for the pertinent financial instrument. Thus, BAL module 502 uses the GEID of the current message to identify a matching GEID field 706 in record 700. Field $706_0$, which corresponds to $GEID_0$, is preferably used to identify any basket association records in table 608 which correspond to the composite view for the financial instrument. The other fields 706 are used to identify any basket association records in table 608 which correspond to the region-specific view for the financial instrument. For example, $GEID_1$ may correspond to the NYSE view for the financial instrument while $GEID_m$ may correspond to the NASDAQ view for the financial instrument. The matching GEID field 706 is then used as an additional index into table 608 to retrieve a set of basket association records for the financial instrument that are applicable to both composite views and regional views of the financial instrument.

Preferably, BAL module 502 will always retrieve the composite $GEID_0$ field applicable to a given financial instrument. Furthermore, for a message with regional price information about a financial instrument, the BAL module 502 also operates to match the GEID field in the message with a GEID field 706 in record 700 for that financial instrument. Thus, the basket set pointer 606 used by the BAL module 502 preferably comprises the header block pointer 704, the composite GEID index $706_0$, and the regional GEID index $706_i$ for the subject message.

Figure 8:
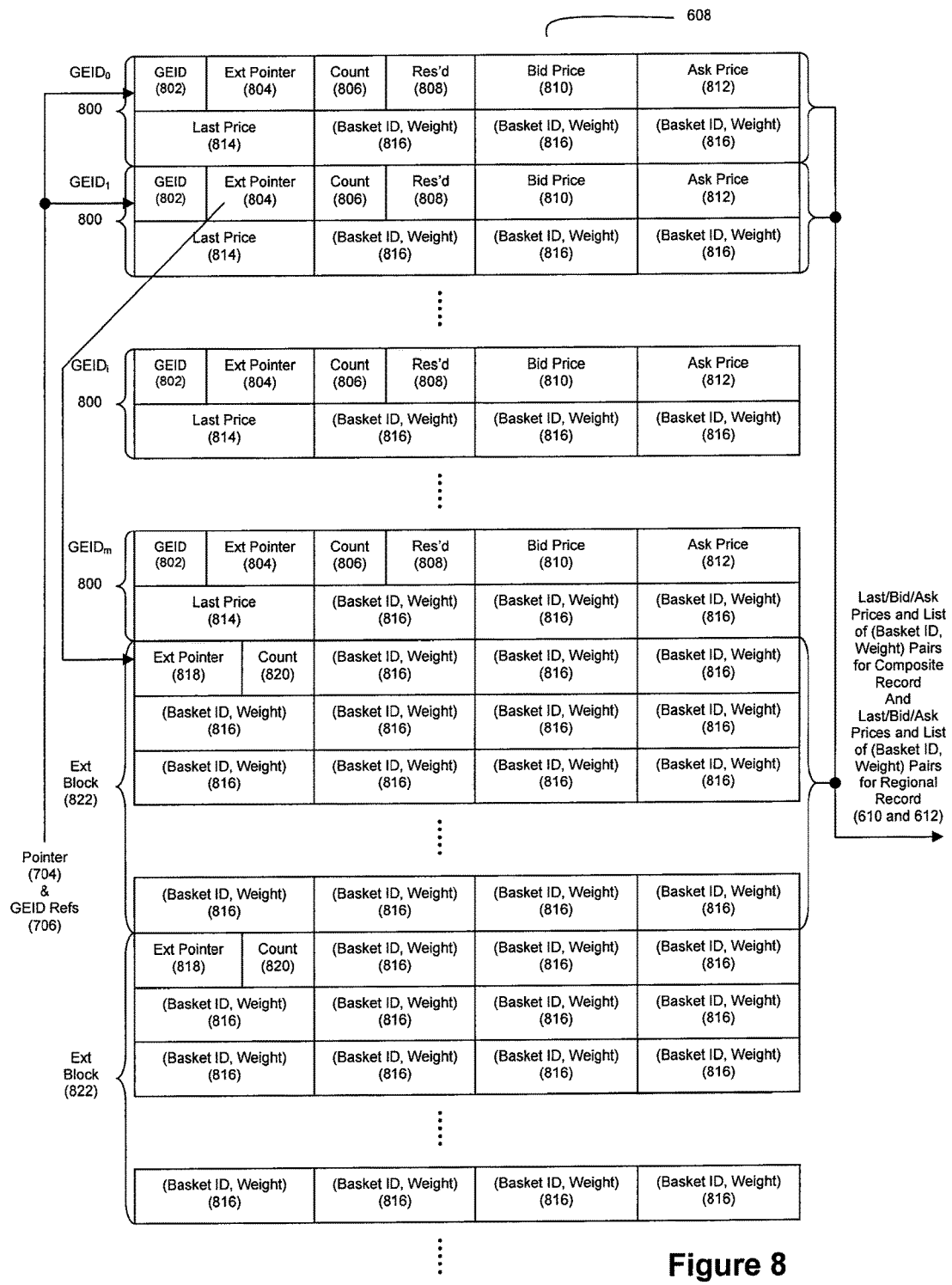
FIG. 8 depicts an exemplary basket set table.

FIG. 8 depicts an exemplary embodiment for the basket set table 608 in greater detail. Table 608 comprises a plurality of basket association records, wherein each record contains basket information for a different financial instrument. Each record preferably comprises a plurality of header blocks 800 and possibly one or more extension blocks 822. Each header block 800, which preferably has a fixed size, corresponds to the subject financial instrument and a particular GEID. Furthermore, each header block 800 preferably comprises a bit string corresponding to the GEID field 802 for that block, a bit string corresponding to an extension pointer 804, a bit string corresponding to a count field 806, a set of reserved bits 808, a bit string that corresponds to the most recently stored bid price 810 for the subject financial instrument, a bit string that corresponds to the most recently stored ask price 812 for the subject financial instrument, a bit string that corresponds to the most recently stored last price for the subject financial instrument 814, and a plurality of bit strings corresponding to a plurality of sets of basket information 816.

Preferably, each block 800 preferably comprises either composite basket association information or regional basket association information for the subject financial instrument. Also, the blocks 800 are preferably located in memory such that the composite and regional blocks for a given financial instrument are stored in contiguous memory addresses. In this way, the header block pointer 704 can be used to locate the financial instrument's composite block 800, while the GEID index 706 can be used to locate the applicable regional block 800 for the financial instrument by serving as an increment to the address found in the header block pointer 704.

Each basket information field 816 in table 608 preferably comprises a basket identifier and weight pair (Basket ID, Weight). The Basket ID serves to identify a particular basket while the weight serves to identify the weight to be used when computing the delta contribution for subject financial instrument to the identified basket.

Given that a single financial instrument may be present in a number of different baskets, it is possible that the number of (Basket ID, Weight) pairs needed for a given financial instrument will not fit within a single block 800. To accommodate such overflow situations, table 608 also preferably comprises a plurality of extension block records 822. Each extension block record 822 preferably has a fixed size and comprises a bit string corresponding to an extension pointer 818, a bit string corresponding to a count field 820, any one or more (Basket ID, Weight) pairs 816 as needed for the financial instrument. If the number of (Basket ID, Weight) pairs 816 for the financial instrument are unable to fit within a single extension block 822, then the extension pointer 818 will serve to identify the address of an additional extension block 822 in which the additional (Basket ID, Weight) pairs 816 are found. It should thus be noted that a plurality of extension blocks 822 may be needed to encompass all of a financial instrument's relevant (Basket ID, Weight) pairs 816. The count field 820 identifies how many (Basket ID, Weight) pairs 816 are present within the subject extension block 822.

The count field 806 within a block 800 serves to identify how many (Basket ID, Weight) pairs 816 are present within that block 800.

Fields 810, 812, and 814 contain the most recently stored bid/ask/last prices for the subject financial instrument on the pertinent exchange. As shown by FIG. 6, this price information is used for computing the price change values 614 (or delta prices) that are relevant to the delta contribution calculation.

Thus, using the pointer 704 and GEID index reference 706 retrieved from table 604, the BAL module 502 is configured to access a block 800 in table 608 corresponding to the composite information relevant to the subject message (e.g., the block 800 shown in FIG. 8 labeled with "GEID$_0$") and a block 800 in table 608 corresponding to the regional information relevant to the subject message (e.g., the record 800 shown in FIG. 8 labeled with "GEID$_1$"). To find the appropriate regional block, the BAL module uses the matching GEID field 706 to count down from the pertinent composite block to the appropriate regional block. Thus, if the pertinent regional block for a particular financial instrument is the NYSE block, wherein the NYSE has a GEID value of that matches the second GEID field 706, GEID$_2$, in record 700, then the BAL module will find the appropiate NYSE block 800 in table 608 two blocks down from the composite block.

In the example of FIG. 8, the regional information has an overflow condition, and the extension pointer 804 points to an extension block 822, as shown. Based on these lookups, the BAL module 502 retrieves the bid/ask/last prices and (Basket ID, Weight) pairs for the composite view of the financial instrument as well as the bid/ask/last prices and (Basket ID, Weight) pairs for the appropriate regional view of the financial instrument. It should be noted that the retrieved bid/ask/last prices 612 for the composite view will need to be associated with the retrieved list of (Basket ID, Weight) pairs 610 for the composite view and the retrieved bid/ask/last prices 612 for the regional view will need to be associated with the retrieved list of (Basket ID, Weight) pairs 610 for the regional view to ensure that downstream computations are based on the appropriate values. To maintain this association, delta events as described below are preferably employed.

BAL module 502 is also preferably configured to update the records in table 608 with the new prices 602 in each message. This is shown by arrow 618 in FIG. 6, which represents a write operation into the appropriate fields of table 608. However, it should be noted that if the message does not include a particular price field such as the last price field, then the BAL module 502 preferably maintains the last price field 814 in the pertinent block 800 in its existing state.

It should be noted that the array of GEID fields 706 for each record 700 in table 604 may be of fixed size for simplicity. Depending upon how much size a practitioner allocates to the GEID fields 706 in each record 700, it may be the case that a financial instrument trades on a sufficiently large number of exchanges that there are not a sufficient number of fields 706 for storing the financial instrument's relevant GEIDs. Thus, if this situation arises and the GEID 600 of the message does not find a match to any GEID fields 706 in the pertinent record 700 of table 604, then the BAL module 502, to retrieve an appropriate regional block from table 608, preferably indexes to the last header block 800 in the record for that financial instrument and conducts a linear search through the header blocks' GEID fields 802 to find a match to the GEID 600 associated with the message.

It should also be noted that if the GEID 600 is not found in any of the GEID fields 802 for the financial instrument record in table 608, this means that the regional view of that financial instrument corresponding to GEID 600 is not included in any baskets.

It should also be noted that baskets may be dynamically changed throughout the day by adding and/or removing (Basket ID, Weight) pairs from the basket association records in table 608 for financial instruments.

To add a financial instrument to a basket, the system adds the appropriate (Basket ID, Weight) pair to that financial instrument's record in table 608. A control process, preferably performed in software executing on a GPP such as processor 112, preferably maintains a copy of tables 604 and 608 and computes where entries need to be added to the table 608 (and possibly table 604 if the GEID for that financial instrument is not present in the GEID fields 706 of record 700 for that financial instrument) to reflect the addition of the financial instrument to the basket. These determinations can be made using the symbol ID and GEID for the financial instrument to be added. The control process then preferably sends memory write commands to the pipeline for consumption by the BAL module 502 that are effective to write update tables 604 and 608 to reflect the addition of the subject financial instrument to a basket. The control process may also be configured to immediately send a synthetic event to the pipeline for consumption by the BAL module 502 wherein this event contains the current prices for the relevant financial instrument. This action will cause delta updates to the NAV values for the subject basket wherein these delta updates are relative to a zero (so the entirety of the price contribution is determined). However, it should also be noted that the control process may be configured to simply wait for subsequent market events to arrive at the pipeline and allow the delta updates to be applied at that time.

Removing a financial instrument from a basket generally involves removing the (basket ID, weight) pair for the subject basket from the record in table 608 for the subject financial instrument. Furthermore, to appropriately update the NAV values to reflect the deletion of the financial instrument from the basket, the control process preferably generates a synthetic event for delivery to the pipeline wherein the price information for the subject financial instrument is zero. This causes the delta price values 614 for the financial instrument to be the negative value of the price information for that financial instrument stored in table 608, thus removing the entirety of the price contribution for that financial instrument to the subject basket.

To add an entire basket to the system, it follows that the control process can issue appropriate memory write commands to the pipeline that adds (Basket ID, Weight) pairs to table 608 for all of the new basket's constituent financial instruments. The control process can also generate synthetic events for delivery to the pipeline which reflects the current price information for these constituent financial instruments, as explained above. Moreover, as can be understood in connection with FIGS. 9 and 13 below, the control process can initiate the addition of appropriate entries to the divisor table, NAV tables, client NAV tables, and client trigger threshold tables to reflect the addition of the new basket to the system.

To delete an entire basket from the system, it also follows that the control process can be configured to initiate a removal of the (Basket ID, Weight) pairs from table 608 for all of the subject basket's constituent financial instruments. Similarly, the records in the tables shown in FIGS. 9 and 13 can also be updated to remove those records associated with the Basket ID of the removed basket.

The output from the BAL module 502 will be a stream of delta events. Each delta event preferably comprises a retrieved (Basket ID, Weight) pair 610 and at least one computed price change 614 for a financial instrument corresponding to that retrieved (Basket ID, Weight) pair 610. In an embodiment of the invention, each delta event includes all of the price deltas, even if one or more of the price deltas (e.g., the ΔBid price) is zero. However, this need not be the case, as noted below.

It should also be understood that, for each message event that is received at the input to the BAL module 502, a plurality of delta events may be produced at the output of the BAL module 502 due to the fact that the financial instrument which is the subject of the received message may be a member of a plurality of baskets. Partly because of this expansion, the low latency nature of pipeline 500 is particularly advantageous in allowing the task of updating basket values to keep up with the inflow of events from the different exchanges.

Figure 9:
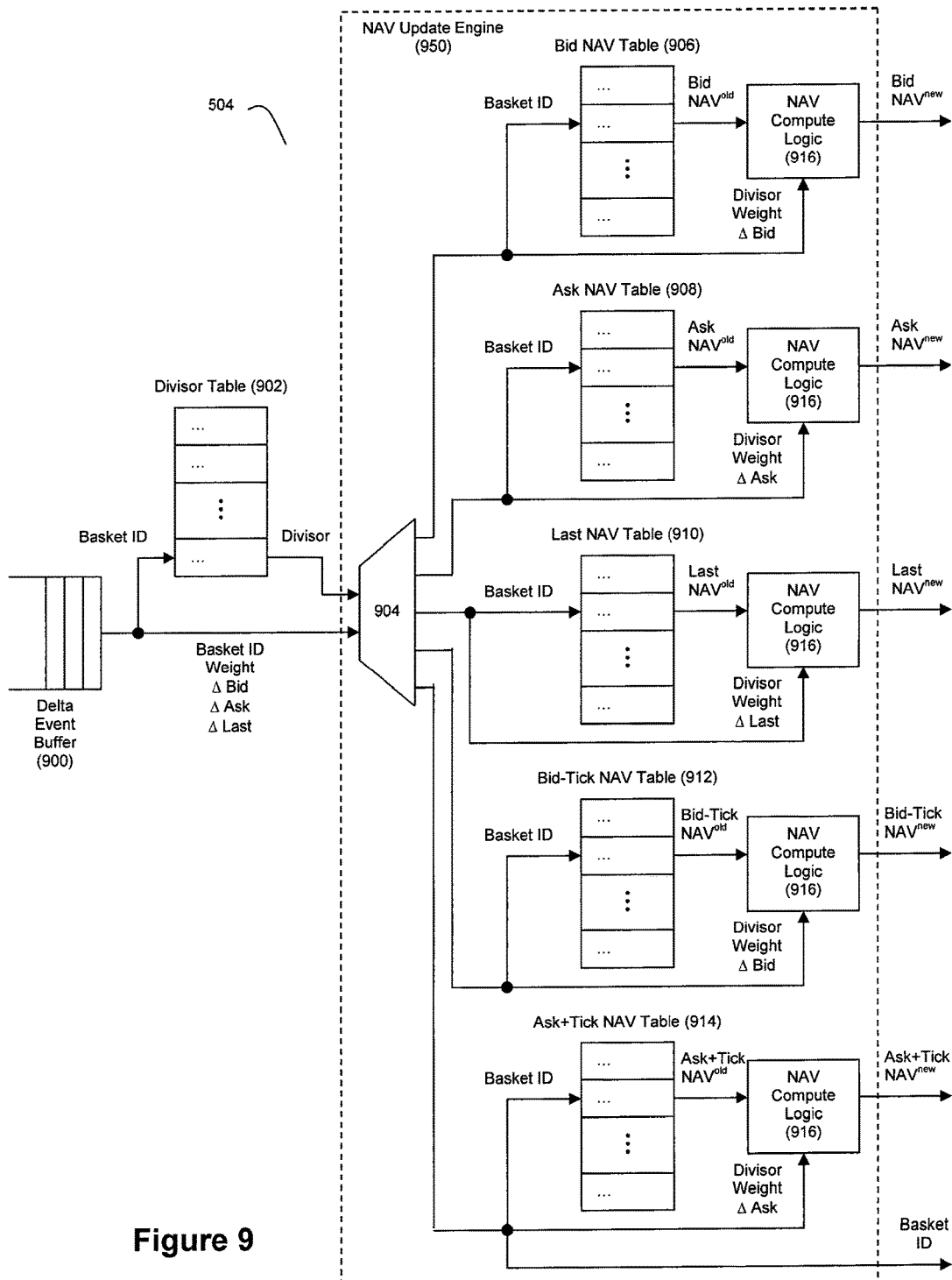
FIG. 9 depicts an exemplary basket value updating module.

Returning to FIG. 5, the basket value updating module 504 is configured to compute the new basket value for each delta event produced by the BAL module 502. FIG. 9 depicts an exemplary basket value updating (BVU) module 504.

A delta event buffer 900 buffers the delta events produced by the BAL module 502. For each delta event read out of buffer 900, the BVU module 504 performs a lookup in a divisor table 902 to determine the appropriate value for the divisor d from formula (3) for the basket corresponding to the Basket ID within the current delta event. Thus, it can be seen that table 902 preferably indexes each divisor value by the Basket ID for the divisor's corresponding basket. The delta event buffer 900 and the divisor table 902 are preferably located within available on-chip memory for the reconfigurable logic device 102. However, it should be noted that buffer 900 and table 902 could alternatively be stored on any memory resource within or accessible to coprocessor 140.

A NAV update engine 950 then receives as an input the delta event information (the (Basket ID, Weight) pair 610 and the delta bid/ask/last prices 614) plus the divisor value d for that delta event to compute at least one updated basket value $NAV^{new}$. Preferably, the NAV update engine 950 is configured to compute a plurality of different types of basket NAV's for each basket. For example, the NAV update engine 950 can be configured to compute, in parallel, new NAVs based on bid prices, ask prices, last prices, bid-tick prices, and ask+tick prices (Bid $NAV^{new}$, Ask $NAV^{new}$, Last $NAV^{new}$, Bid-Tick $NAV^{new}$, and Ask+Tick $NAV^{new}$ respectively), as shown in FIG. 9. In these examples, the tick value is defined as the minimum increment used by the pertinent exchange to measure a change in financial instrument price.

A demultipexer 904 operates to route portions of the delta event information and the divisor value to the appropriate NAV compute logic 916. The NAV update engine preferably employs a plurality of parallel computing paths to compute each type of basket NAV.

The computing path for computing Bid $NAV^{new}$ preferably operates on the Basket ID, Weight, Divisor, and ΔBid price. The BVU module 504 performs a lookup in a Bid NAV table 906 based on the Basket ID to retrieve a stored Bid NAV value (Bid $NAV^{old}$) for the subject basket. This Bid $NAV^{old}$ value serves as the $NAV^{old}$ value in formula (2) during computation of Bid $NAV^{new}$. NAV compute logic 916 then (i) computes the delta contribution Δj for the financial instrument according to formula (3) using the divisor value as the d term in formula (3), the Weight value as the $w_j$ term in formula (3), and the ΔBid value as the $(T_j^{new}-T_j^{old})$ term in formula (3), and (ii) thereafter computes Bid $NAV^{new}$ according to formula (2) based on the computed Δj value and the Bid $NAV^{old}$ value.

The computing path for computing Ask $NAV^{new}$ preferably operates in the same manner as the computing path for Bid $NAV^{new}$ albeit performing a lookup in an Ask NAV table 908 based on the Basket ID and using the ΔAsk price rather than the ΔBid price.

The computing path for computing Last $NAV^{new}$ also preferably operates in the same manner as the computing path for Bid $NAV^{new}$ albeit performing a lookup in an Last NAV table 910 based on the Basket ID and using the ΔLast price rather than the ΔBid price.

Likewise, the computing paths for computing the Bid-Tick $NAV^{new}$ and Ask+Tick $NAV^{new}$ value preferably operate in the same manner as the computing path for Bid $NAV^{new}$ albeit performing lookups in, respectively, a Bid-Tick NAV table 912 and an Ask+Tick NAV table 914 based on the Basket ID and using, respectively, the ΔBid price and the ΔAsk price.

Table 912 can store previously computed NAVs for each basket that are based on a price for the financial instrument that is the previous bid price for the financial instrument minus a tick value. Table 914 can store previously computed NAVs for each basket that are based on a price for the financial instrument that is the previous ask price for the financial instrument plus a tick value.

Preferably, tables 906, 908, 910, 912, and 914 are stored in available on-chip memory for the reconfigurable logic device 102. However, it should be noted that these tables could alternatively be stored on any memory resource within or accessible to coprocessor 140.

Thus, it can be seen that the NAV update engine 950 is preferably configured to output, each clock cycle, an updated basket event, wherein each updated basket event comprises a plurality of different updated NAVs for a particular basket together with a Basket ID for that basket.

The BVU module is also preferably configured to update tables 906, 908, 910, 912, and 914 with the newly computed NAV values. Thus, the newly computed Bid $NAV^{new}$ for a given Basket ID can be fed back into an entry for that Basket ID in table 906 so that the next delta event pertaining to the same Basket ID will retrieve the most current $NAV^{old}$ value. The memory for tables 906, 908, 910, 912, and 914 is preferably dual-ported, thus allowing for two read/write operations to occur on each clock cycle. If updating logic for the BVU module is pipelined, it can be expected that contention for the same Basket ID entry in a given table during a read and write operation on the same clock cycle will be rare and can be identified and avoided using techniques known in the art.

Also, a control process can issue a memory write command to the pipeline for consumption by the BVU module to update an entry in the divisor table 902 in the event of a change in value for a basket's divisor. Such a control process is preferably performed in software executing on a GPP such as processor 112.

Figure 10A:
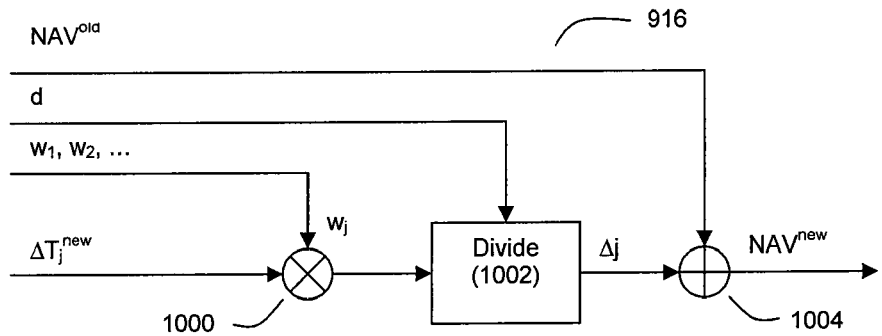
FIGS. 10(a)-(c) depict exemplary embodiments for the NAV compute logic within the basket value updating module.

FIG. 10(a) depicts an exemplary embodiment for the NAV compute logic 916. A multiplier 1000 operates to compute the $w_j(T_j^{new}-T_j^{old})$ portion of formula (3) using the Weight value and delta price information from each delta event. A divider 1002 operates to divide the $w_j(T_j^{new}-T_j^{old})$ value by d to thereby compute $\Delta j$ according to formula (3). Thereafter, an adder 1004 is used to add $\Delta j$ to the $NAV^{old}$ value, thereby computing $NAV^{new}$ according to formula (2).

Figure 10B:
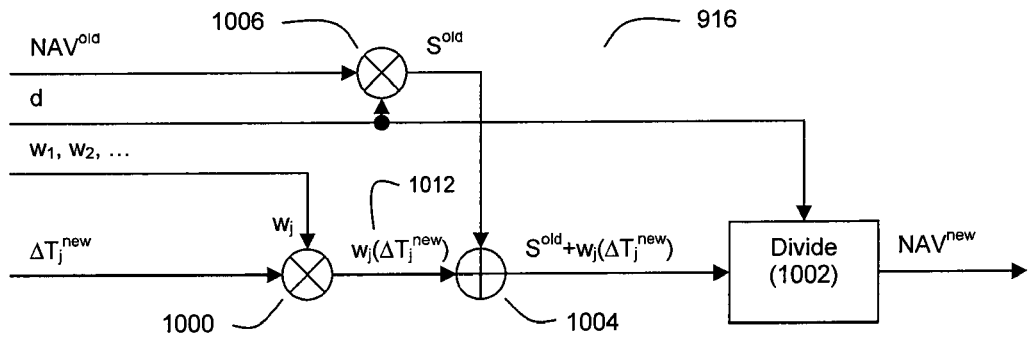

FIG. 10(b) depicts another exemplary embodiment for the NAV compute logic 916. In the embodiment of FIG. 10(b), the division operation is performed last, thereby improving the precision of the NAV computation relative to the embodiment of FIG. 10(a). To re-order the arithmetic operations such that the division operation inherent in formula (2) by way of formula (3) is performed last, the embodiment of FIG. 10(b) preferably adds a multiplication operation using multiplier 1006. This multiplication operation can be performed in parallel with the multiplication operation performed by multiplier 1000. Multiplier 1006 operates to multiply the $NAV^{old}$ value by d, thereby resulting in the value $S^{old}$. In this embodiment, the delta contribution of the financial instrument can be expressed as $w_j(T_j^{new}-T_j^{old})$, as shown at 1012 in FIG. 10(b). Adder 1004 then computes the sum of $S^{old}$ and $w_j(T_j^{new}-T_j^{old})$. Given that $S^{old}$ equals $dNAV^{old}$, it can readily be seen that the act of dividing $S^{old}+w_j(T_j^{new}-T_j^{old})$ by d will result in $NAV^{new}$ in accordance with formulas (2) and (3).

Figure 10C:
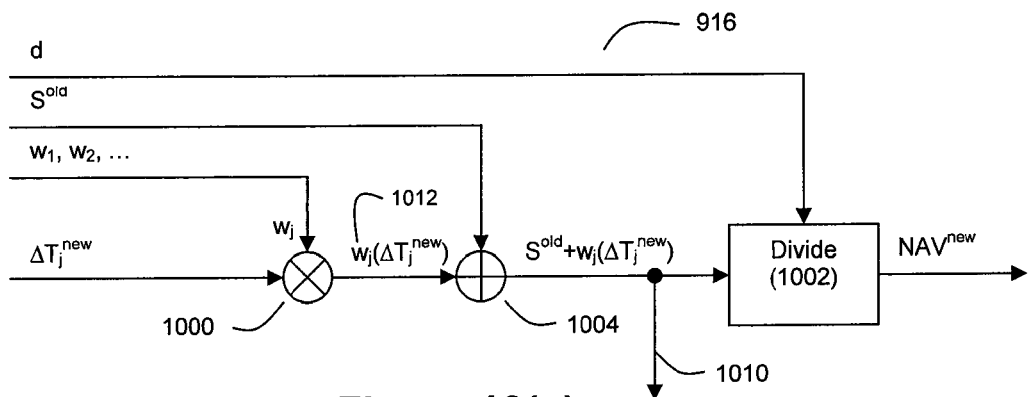

FIG. 10(c) depicts yet another exemplary embodiment for the NAV compute logic 916. In the embodiment of FIG. 10(c), the precision improvement of the FIG. 10(b) embodiment is preserved while also eliminating the need for multiplier 1006. To do so, in a BVU module which employs the NAV compute logic 916 of FIG. 10(c), the NAV tables 906, 908, 910, 912, and 914 preferably store $S^{old}$ values rather than $NAV^{old}$ values, thereby eliminating the need for multiplier 1006. Furthermore, to update tables 906, 908, 910, 912, and 914, the value of $S^{new}$ (which is the same as $S^{old}+w_j(T_j^{new}-T_j^{old})$) is fed back into the relevant tables via communication link 1010 such that $S^{new}$ serves as $S^{old}$ when the next delta event is processed.

Figure 11:
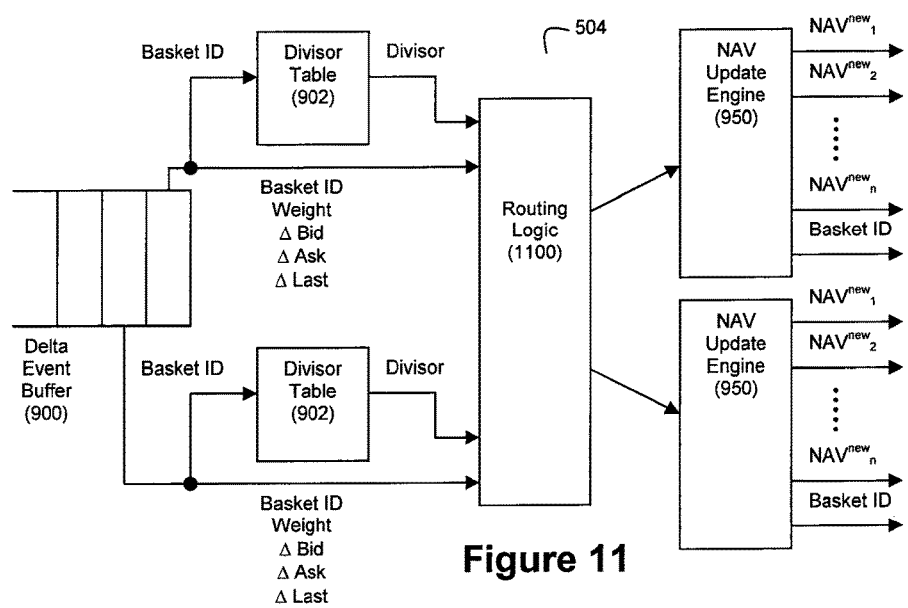
FIG. 11 depicts an exemplary embodiment of the basket value updating module employing a plurality of NAV update engines.

It should be noted that the BVU module 504 can employ a plurality of NAV update engines 950 in parallel to thereby simultaneously compute a plurality of basket NAV types for a plurality of baskets. An example of this is shown in FIG. 11, wherein the BVU module 504 comprises two parallel NAV update engines 950. In such an embodiment, the BVU module 504 reads two delta events out of buffer 900 each clock cycle. After lookups are performed in the divisor table 902 to identify the appropriate divisor value for each delta event, routing logic 1100 routes the delta event information and its associated divisor value to an appropriate NAV update engine 950. Such routing logic 1100 can be configured to assign different segments of the Basket ID range to each set of parallel engines 950.

If desired, it should be noted that a single set of NAV tables 906, 908, 910, 912, and 914 can be shared by a plurality of NAV update engines 950. If the number of NAV update engines exceeds the number of available ports for reading from the NAV tables, then the BVU module 504 can be configured to interleave the accesses to these tables from the different NAV update engines. These tables could also be replicated if desired to avoid such interleaving. The same can be said with respect to divisor table 902 (while FIG. 11 depicts an embodiment wherein two divisor tables are utilized, it should be noted that a single divisor table 902 may be shared by the different paths in FIG. 11).

Figure 12:
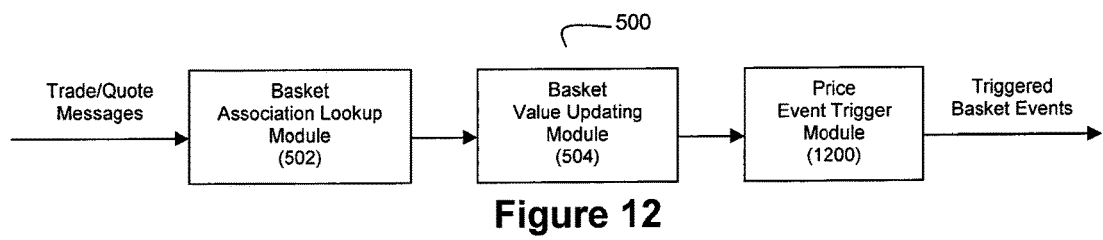
FIG. 12 depicts an exemplary basket calculation engine pipeline in accordance with another embodiment of the invention.

FIG. 12 depicts an embodiment wherein pipeline 500 includes a price event trigger module 1200 in communication with the output from the BVU module 504. The price event trigger (PET) module 1200 is configured to determine which updated basket values produced by the BVU module 504 are to be reported to an interested client. These determinations can be made on the basis of any of a number of criteria. The client may be a particular trader who has requested that he/she be notified when the value of a basket changes by a certain amount, or the client may be another application within a trading system. The client may also be another module deployed on the coprocessor 140 (such as another FAM 150 if pipeline 500 is a FAM pipeline).

Figure 13:
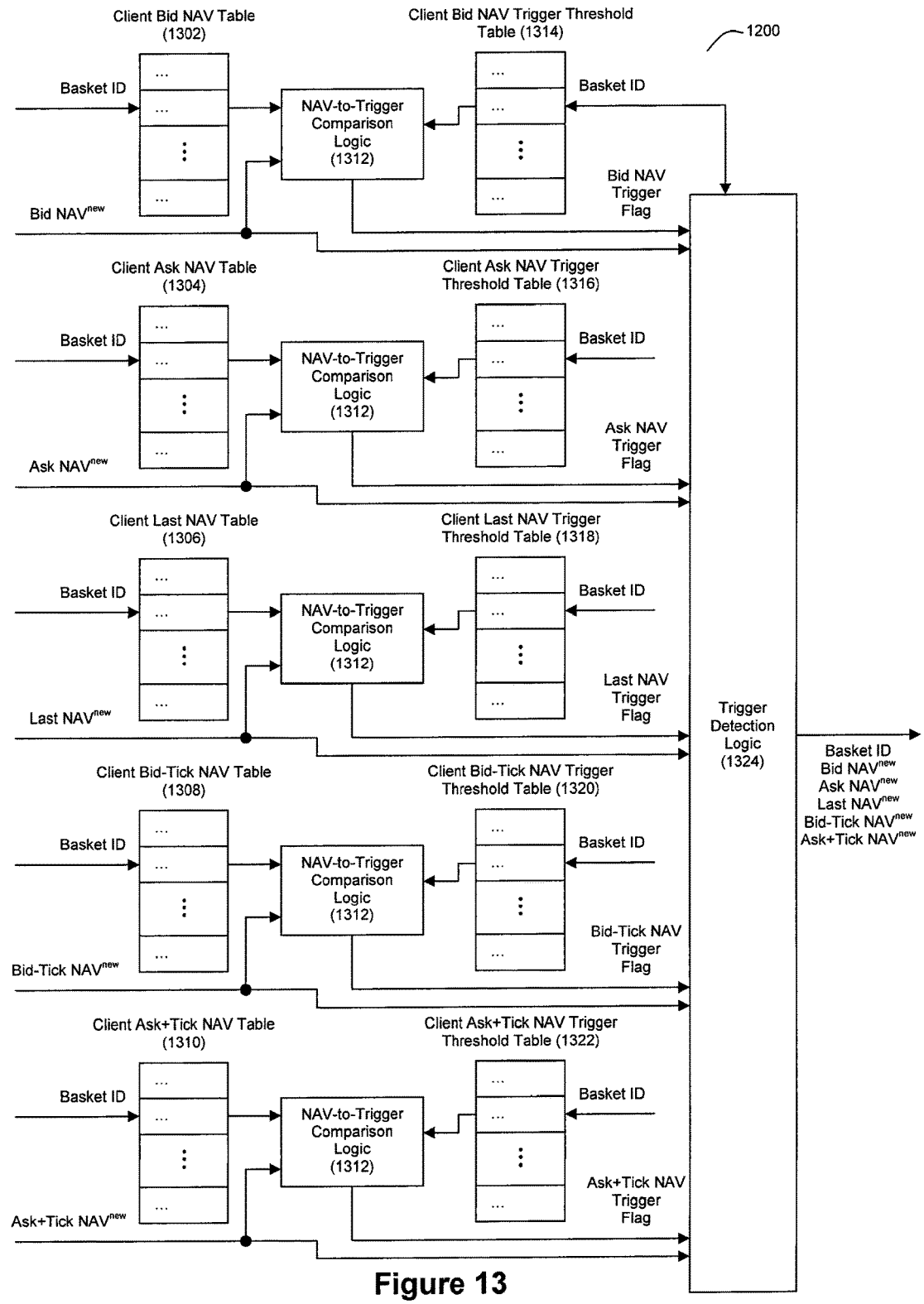
FIG. 13 depicts an exemplary price event trigger module.

FIG. 13 depicts an exemplary embodiment for a PET module 1200. Preferably, PET module 1200 is configured to operate in parallel on each basket value type for a basket generated by the BVU module 504. Also, to determine which of the updated basket values should be reported to interested clients, the PET module 1200 preferably compares each updated basket value with a client-defined trigger threshold.

PET module 1200 preferably accesses a plurality of tables corresponding to different NAV types, wherein these tables store client reference values for each basket. These reference values are used by the PET module 1200 to judge whether new basket values should be reported to interested clients. In an exemplary embodiment, the reference values are NAV values for the subject baskets which were previously reported to the client. Thus, a client NAV table preferably exists for each basket value type generated by the BVU module 504. Thus, reference value table 1302 stores a plurality of client Bid NAVs for the different baskets, wherein each client Bid NAV is indexed by a basket identifier. Reference value table 1304 stores a plurality of client Ask NAVs for the different baskets (each client Ask NAV being indexed by a basket identifier). Reference value table 1306 stores a plurality of client Last NAVs for the different baskets (each client Last NAV being indexed by a basket identifier). Reference value table 1308 stores a plurality of client Bid-Tick NAVs for the different baskets (each client Bid-Tick NAV being indexed by a basket identifier). Reference value table 1310 stores a plurality of client Ask+Tick NAVs for the different baskets (each client Ask+Tick NAV being indexed by a basket identifier). Each of these tables preferably stores the most recent of their respective NAV types to be reported to the client. Thus, in the event of one of the triggers being set off by a new basket value, the PET module is preferably configured to update the NAV values in the client tables with the new basket values. Such updating logic can be configured to update the tables only for those NAV values which set off the trigger or can be configured to update all of the tables when any NAV value sets off a trigger.

Also, a client NAV trigger threshold table preferably exists for each basket value type generated by the BVU module 504. Thus, table 1314 stores a plurality of client Bid NAV trigger threshold values for the different baskets, wherein each client Bid NAV trigger threshold value is indexed by a basket identifier. Table 1316 stores a plurality of client Ask NAV trigger threshold values for the different baskets (each client Ask NAV trigger threshold value being indexed by a basket identifier). Table 1318 stores a plurality of client Last NAV trigger threshold values for the different baskets (each client Last NAV trigger threshold value being indexed by a basket identifier). Table 1320 stores a plurality of client Bid-Tick NAV trigger threshold values for the different baskets (each client Bid-Tick NAV trigger threshold value being indexed by a basket identifier). Table 1322 stores a plurality of client Ask+Tick NAV trigger threshold values for the different baskets (each client Ask+Tick NAV trigger threshold value being indexed by a basket identifier).

Preferably, tables 1302, 1304, 1306, 1308, 1310, 1314, 1316, 1318, 1320, and 1322 are stored in available on-chip memory for the reconfigurable logic device 102. However, it should be noted that these tables could alternatively be stored on any memory resource within or accessible to coprocessor 140.

Also, it should be noted that the client NAV tables and the client NAV trigger threshold tables can be optionally consolidated if desired by a practitioner of this embodiment of the invention. In doing so, the records in the client Bid NAV table 1302 would be merged with the records in the client Bid NAV trigger threshold table 1314 such that each record comprises the client Bid NAV and the client Bid NAV trigger threshold value. Similarly, table 1304 could be merged with table 1316, table 1306 with table 1318, table 1308 with table 1320, and table 1310 with table 1322.

PET module 1200 preferably employs a plurality of parallel computing paths to determine whether any of the NAV types within each basket event set off a client trigger.

A first computing path is configured to perform a lookup in the client Bid NAV table 1302 and a lookup in the client Bid NAV trigger threshold table 1314 based on the current updated basket event's Basket ID to thereby retrieve a client Bid NAV and a client Bid NAV trigger threshold value. The client Bid NAV serves as a trigger against which the Bid NAV within the updated basket event is compared. The client Bid NAV trigger threshold value is then used as the criteria to judge whether the trigger has been set off. NAV-to-trigger comparison logic 1312 then operates perform this comparison and determine whether the trigger has been set off, wherein a Bid NAV trigger flag indicates the result of this determination.

Additional computing paths perform these operations for the updated basket event's Ask NAV, Last NAV, Bid-Tick NAV, and Ask+Tick NAV to produce Ask NAV, Last NAV, Bid-Tick NAV, and Ask+Tick NAV trigger flags, respectively, as shown in FIG. 13.

Trigger detection logic 1324 receives the different NAV trigger flags produced by the computing paths. This logic 1324 is configured to determine whether any of the trigger flags for a given updated basket event are high. Preferably, the trigger detection logic 1324 is configured pass an updated basket event as an output if any of the flags for that updated basket event are high. As such, it can be seen that the PET module 1200 serves as a filter which passes updated basket events that are deemed noteworthy according to client-defined criteria.

Figure 14:
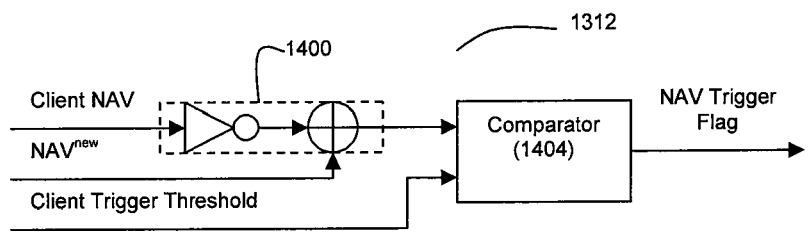
FIG. 14 depicts an exemplary embodiment for the NAV-to-trigger comparison logic within the price event trigger module.

FIG. 14 illustrates an exemplary embodiment for the comparison logic 1312. A subtractor 1400 operates to subtract the retrieved client NAV from the updated basket event's NAV ($NAV^{new}$). A comparator 1404 then compares the difference between $NAV^{new}$ and the client NAV with the retrieved client trigger threshold to determine whether the NAV trigger flag should be set. If the difference exceeds the threshold value, then comparator preferably sets the NAV trigger flag to high.

Thus, a client may want to be notified whenever the Bid NAV of Basket 145 changes by $0.05, whenever the Ask NAV for Basket 145 changes by $0.03, or whenever the Last NAV for Basket 145 changes by $0.02. In such an instance, the client Bid NAV trigger threshold value in table 1314 for Basket 145 can be set equal to $0.05, the client Ask NAV trigger threshold value in table 1316 for Basket 145 can be set equal to $0.03, and the client Last NAV trigger threshold value in table 1318 for Basket 145 can be set equal to $0.02. If the new bid NAV, Ask NAV, and Last NAV values within the updated basket event for Basket 145 are $20.50, $20.40, and $20.20 respectively, while the stored values for the client NAVs of Basket 145 are $20, $20.42, and $20.19 respectively, then the comparison logic will operate to set the Bid NAV trigger flag high, the Ask NAV trigger flag low, and the Last NAV trigger flag high.

However, it should be noted that the comparison logic 1312 could be configured to determine whether a client trigger has been set off in any of a number of ways. For example, the client threshold values can be expressed in terms of percentages if desired (with corresponding adjustments in the comparison logic to compute the percentage difference between the new NAV and the client NAV). Also, the trigger condition could be based on a tracking instrument that is different than the subject NAV. For example, the trigger condition for a given basket can be defined in relation to a stored price for the DJIA. The client NAV tables would then store a DJIA price for that basket, and that basket's NAV prices would be compared against the retrieved DJIA price to determine whether the trigger threshold has been reached.

It should be noted that the PET module 1200 can be configured to detect arbitrage conditions by appropriately populating the client NAV tables and the client trigger threshold tables. For example, with ETFs, a client NAV table can be populated with the current share price of the ETF itself ($T_{ETF}$). Thus, the client bid NAV table could be populated with the current bid price for a share of the ETF, the client ask NAV table could be populated with the current ask price for a share of the ETF, the client last NAV table could be populated with the current last price for a share of the ETF, etc. By populating the client NAV tables in this manner, the PET module can detect when there is a discrepancy between the share price of the ETF and the net asset value of the ETF's constituent financial instruments. Such a discrepancy can be taken advantage of by a trader, as explained above.

Thus, a client application that is informed by the pipeline of a discrepancy between $T_{ETF}$ and the ETF's NAV can place one or more trades on one or more financial markets to realize a profit from the detected arbitrage condition. For example, if the ETF's NAV is less than the ETF's share price, a client application can execute the following steps:
  Assemble a basket by purchasing the shares of the financial instruments in the ETF's portfolio at a total cost approximately equal to the NAV;
  Create an ETF share by exchanging the assembled basket with the fund owner; and
  Sell the ETF on the exchange at a price approximately equal to $T_{ETF}$.

Furthermore, if the ETF's NAV is greater than the ETF's share price, a client application can execute the above steps in reverse. That is, a trader can buy one or more shares of the subject ETF from the market, exchange the ETF for shares of its constituent financial instruments, and then sell those shares of the constituent financial instruments on the market.

It should also be noted that the trigger thresholds in the client trigger threshold tables can be populated with values that take into account any expected transactional costs involved in the process of making such trades to take advantage of the price discrepancy, as explained below. Thus, if the sales price for the assembled ETF exceeds the aggregate prices of the financial instrument shares purchased to assemble the basket and the related transactional costs in doing so (or the sales prices for the constituent financial instruments exceeds the purchase price of the ETF and the related transactional costs), a trader who uses the client application can yield a profit by way of arbitrage. For such actions to work, the inventors note that time is of the essence, and it is believed that the low latency nature of the disclosed pipeline greatly increases a trader's ability to recognize and profit from such arbitrage conditions as they arise in a constantly fluctuating market.

Figure 15:
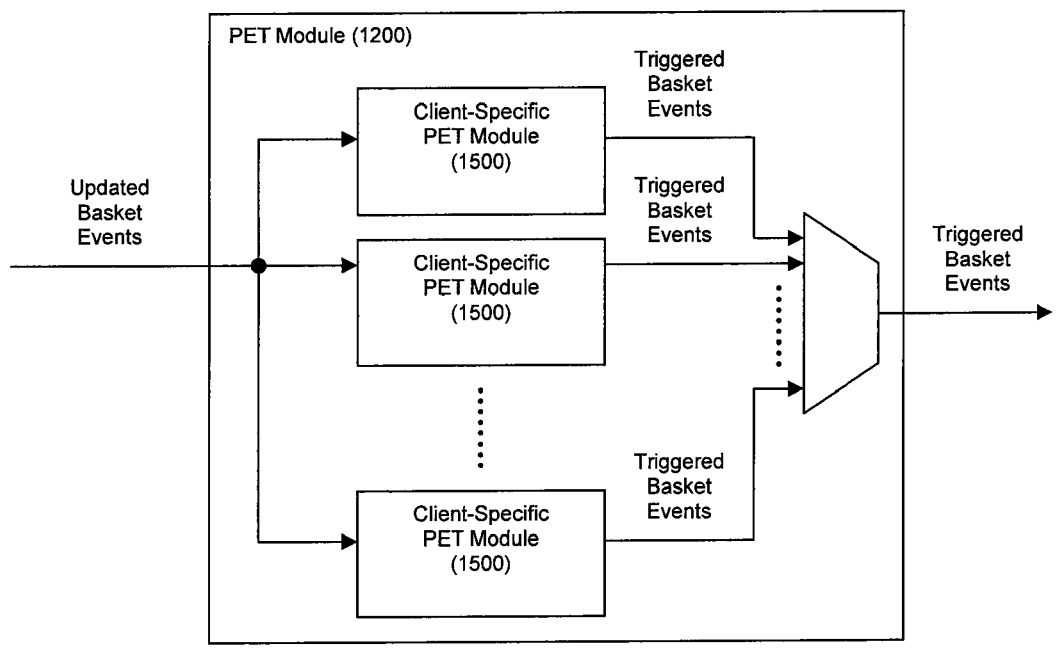
FIG. 15 depicts an exemplary embodiment for the price event trigger module employing a plurality of client-specific price event trigger modules.

Moreover, it should be noted that the PET module 1200 can filter updated basket events for a plurality of different clients. In this manner, each subscribing client can define its own set of reference values and trigger thresholds. To accomplish such a feature, each updated basket event can be compared in parallel with a plurality of criteria for different clients via a plurality of client-specific PET modules 1500, as shown in FIG. 15. It should also be noted that the client-specific PET modules 1500 (each of which would be a client-specific replicant of PET module 1200 of FIG. 13) can be arranged in series (wherein each client-specific PET module would optionally add a client-specific flag to each updated basket event to thereby indicate whether that client's triggering criteria were met). Furthermore, the client-specific PET modules 1500 could also be arranged in a hybrid parallel/series arrangement if desired.

Figure 16:
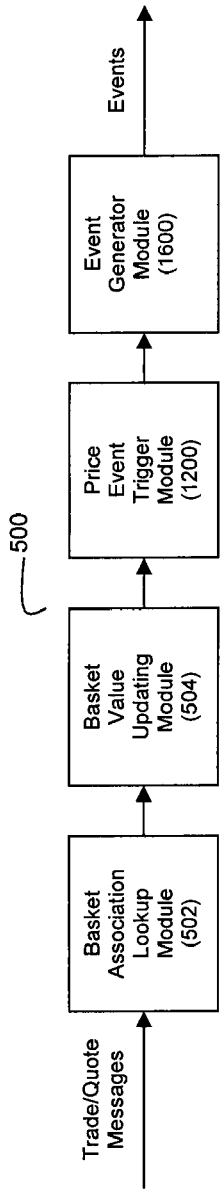
FIG. 16 depicts an exemplary basket calculation engine pipeline in accordance with another embodiment of the invention.

FIG. 16 depicts an embodiment wherein pipeline 500 includes an event generator module 1600 in communication with the output from the PET module 1200. The event generator module 1600 is configured to process each incoming triggered basket event to construct a normalized output message event which contains the computed new NAVs within the triggered basket event.

Figure 17:
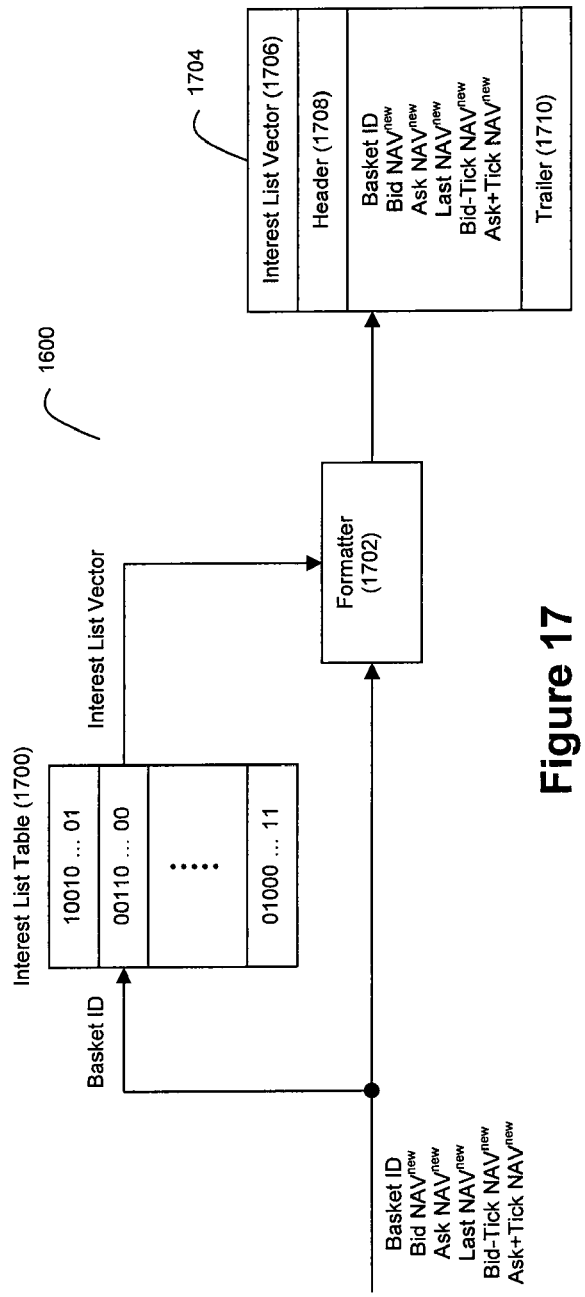
FIG. 17 depicts an exemplary event generator module.

FIG. 17 depicts an exemplary embodiment for the event generator module 1600. Preferably, the event generator module 1600 is configured to insert a bit string into each output event 1704 which defines an interest list for that event, wherein the interest list identifies each client that is to be notified of the event. Preferably, this interest list takes the form of a bit vector, wherein each bit position corresponds to a different client. For any bit positions that are high, this means that the client corresponding to that bit position should be notified.

An interest list table 1700 preferably stores such a bit vector for each basket. As the event generator module 1600 receives a triggered basket event from the PET module 1200, the event generator module 1600 performs a lookup in the interest list table 1700 based on the Basket ID within the triggered basket event. As a result of this lookup, the interest list vector for that Basket ID is retrieved. A formatter 1702 thereafter builds an output message event 1704 from the retrieved interest list vector 1706 and the information within the received triggered basket event, as shown in FIG. 17. Formatter 1702 is preferably configured to add a header 1708 and trailer 1710 to the output event 1704 such that the output event 1704 can be properly interpreted by a client recipient (or recipients) of the output event 1704. The format for such output events can comply with any of a number of messaging protocols, both well-known (e.g., FAST and FIX) and proprietary. As indicated, the value of the bit positions in the interest list vector 1706 of the output event 1704 will define which clients are to be recipients of the event 1704.

The interest list table 1700 is preferably located within available on-chip memory for the reconfigurable logic device 102. However, it should be noted that table 1700 could alternatively be stored on any memory resource within or accessible to coprocessor 140. Also, it should be noted that formatter 1702 may optionally be configured to access one or more data tables (not shown; either on-chip or off-chip) to define the appropriate fields for the output event 1704.

It should also be noted that the event generator module 1600 may be configured to store statistics such as the number of triggered basket events it receives, the number of output events it produces, and the average inter-event time for each triggered basket event.

FIG. 18 depicts an embodiment wherein pipeline 500 includes a message qualifier filter module 1800 in communication with the input to the BAL module 502. The message qualifier filter module 1800 is configured to process incoming message events and filter out any message events that are not of interest to the BCE. Messages of interest will generally include messages which may affect NAV prices. Examples of messages that a practitioner of this embodiment of the invention may want to filter are messages that do not contain a bid, ask, or last price for a financial instrument. For example, a practitioner may desire to filter out messages which merely correct the previous day's closing prices and messages relating to trades that do not contribute to the daily volume.

FIG. 19 depicts an exemplary message qualifier filter module 1800 that can be employed in the pipeline 500 of FIG. 18. A table 1900 stores a plurality of qualifiers. Module 1800 is preferably configured to compare one or more fields of each incoming message (such as the quote and trade qualifier fields of the incoming messages) against the different qualifiers stored by table 1900. Each message qualifier is typically a small binary code which signals a condition. Each qualifier in table 1900 preferably maps to an entry in table 1902 which contains a pass/drop flag in each address. Thus, if a match is found any of the message fields with respect to qualifier [1] from table 1900, then this match would map to the entry in position n−2 of table 1902, and the bit value in position n−2 of table 1902 would be retrieved and provided as an input to AND logic 1904. Message qualifiers from table 1900 can be directly addressed to entries in table 1902. However, if the size of table 1900 were to greatly increase, it should be noted that hashing could be used to map qualifiers to pass/drop flags.

If any of the inputs to AND logic 1904 are high, then this will cause the pass/drop signal 1906 to follow as high. Logic 1908 is configured to be controlled by signal 1906 when deciding whether to pass incoming messages to the output. Thus, if any of the matching qualifiers from table 1900 maps to a high bit in table 1902, this will result in the subject message being passed on to the output of the message qualifier filter module 1800.

In this manner, each qualifier in the qualifier table may define a message criteria which, if found in an incoming message, will result in that incoming message being passed along or blocked from propagating downstream in pipeline 500. Examples of message qualifiers which can be stored by table 1900 to indicate that a message should be blocked would be indicators in messages that identify the message as any of a non-firm quote, penalty bid, withdrawn quote, held trade, and out of sequence trade.

Tables 1900 and 1902 are preferably located within available on-chip memory for the reconfigurable logic device 102. However, it should be noted that these tables could alternatively be stored on any memory resource within or accessible to coprocessor 140.

It should also be noted that the incoming messages to pipeline 500 are preferably normalized messages in that the message fields are formatted in a manner expected by the pipeline 500. Such normalization may optionally have been already been performed prior to the time that the messages reach pipeline 500. However, optionally, pipeline 500 may include a message normalization module 2000 as shown in FIG. 20 to provide the normalization functions. Such normalization preferably includes functions such as symbol ID mapping (wherein each message is assigned with a symbol ID (preferably a fixed-size binary tag) that uniquely identifies the financial instrument which is the subject of the message) and GEID mapping (wherein each message is assigned with a GEID (preferably also a fixed-size binary tag) that uniquely identifies the exchange corresponding to the message). FAM modules to perform such normalization functions are described in the above-referenced and incorporated U.S. Patent Application Publication 2008/0243675.

With respect to administering the BCE 400, it should be noted that baskets and trigger conditions can be created, modified, and/or deleted in any of a number of ways. For example, a system administrator and/or client application can be given the ability to define baskets and/or trigger conditions To create and/or modify a basket, appropriate entries and allocations will be needed for the new/modified basket in the various tables described herein in connection with pipeline 500. A system administrator may use a control interface to add/modify basket configurations. Client applications may submit basket definitions via an application programming interface (API) that runs on their local machine(s).

Figure 21:
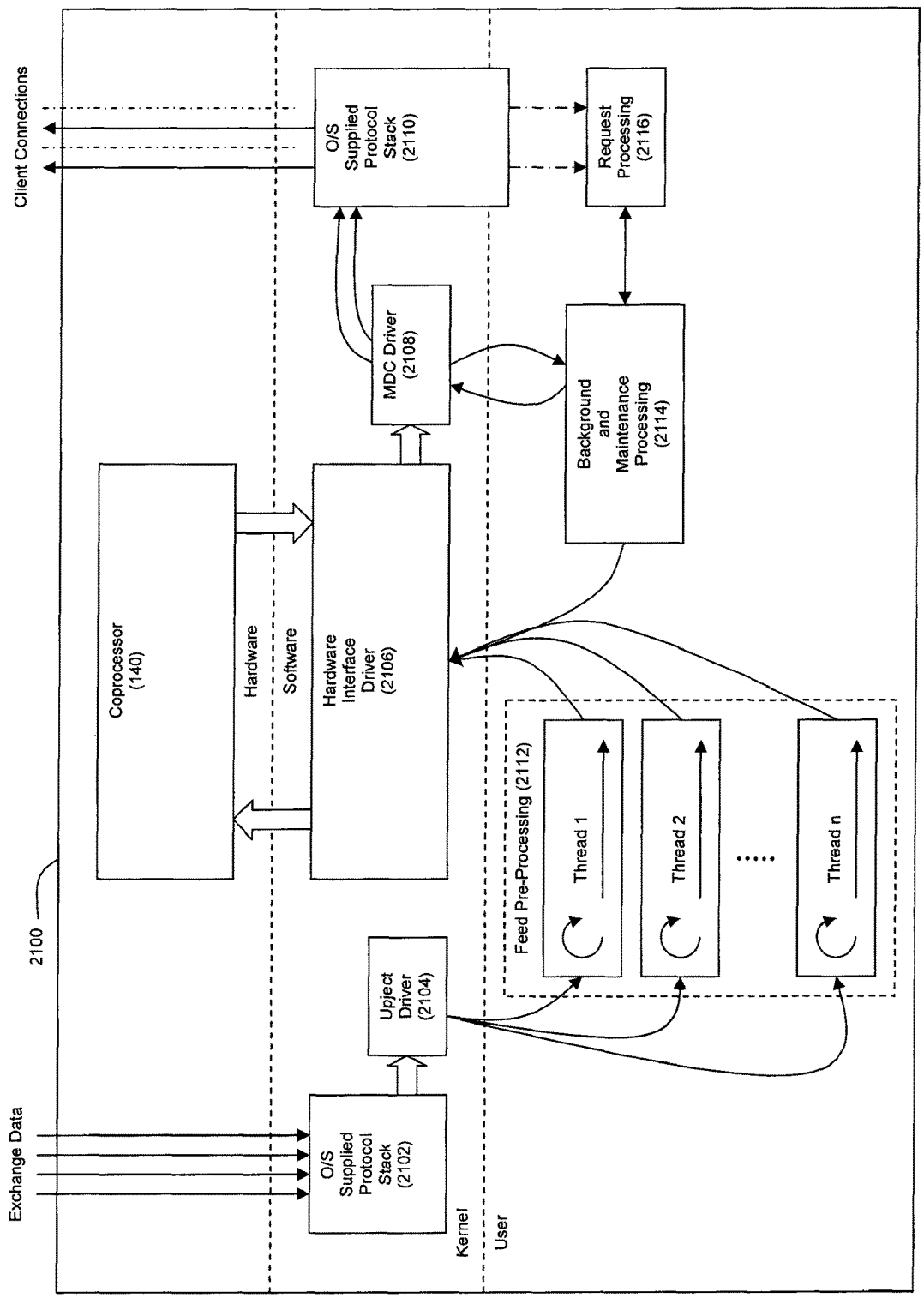
FIG. 21 depicts an exemplary ticker plant architecture in which a basket calculation engine pipeline can be employed.

The BCE pipeline may be deployed on coprocessor 140 of a ticker plant platform 2100 as shown in FIG. 21. Additional details regarding such a ticker plant platform 2100 can be found in the above-referenced and incorporated U.S. Patent Application Publication 2008/0243675. In summary, the financial market data from the exchanges is received at the O/S supplied protocol stack 2102 executing in the kernel space on processor 112 (see FIGS. 1(*a*)-(*b*)). An upject driver 2104 delivers this exchange data to multi-threaded feed pre-processing software 2112 executing in the user-space on processor 112. These threads may then communicate data destined for the coprocessor 140 to the hardware interface driver software 2106 running in the kernel space.

Instructions from client applications may also be communicated to the hardware interface driver 2106 for ultimate delivery to coprocessor 140 to appropriately configure a BCE pipeline that is instantiated on coprocessor 140. Such instructions arrive at an O/S supplied protocol stack 2110 from which they are delivered to a request processing software module 2116. A background and maintenance processing software module 2114 thereafter determines whether the client application has the appropriate entitlement to add/change/modify a basket. If so entitled, the background and maintenance processing block 2114 communicates a command instruction to the hardware interface driver 2106 for delivery to the coprocessor to appropriately update the table entries in the BCE pipeline to reflect the added/changed/modified basket, as previously explained above. Deletions of baskets as well as additions/modifications/deletions of trigger conditions from the BCE pipeline can be performed via a like process, as indicated above.

The hardware interface driver 2106 then can deliver an interleaved stream of financial market data and commands to the coprocessor 140 for consumption thereby. Outgoing data from the coprocessor 140 returns to the hardware interface driver 2106, from which it can be supplied to MDC driver 2108 for delivery to the client connections (via protocol stack 2110) and/or delivery to the background and maintenance processing block 2114.

As discussed above, some financial instrument baskets such as ETFs may have some form of cash component to them. These cash components can be taken into account by the system in any of a number of ways.

For example, to insert a cash component into a basket's NAV, a control process can be configured to generate a synthetic event for delivery to the pipeline. A symbol ID would be assigned to a given cash account, and the price for that synthetic symbol ID would be $1 and the weight value w for that cash account would be set equal to the cash value of the cash account. The tables used by the BAL module would be updated to reflect this synthetic symbol ID and cause the cash account to impact the NAV for the basket. In a more complex scenario, events could be delivered to the pipeline so that the value of the cash account can fluctuate with the value of the pertinent currency on the foreign exchange market.

Another way of injecting a cash component of a basket into the system is to define the trigger threshold values in tables 1314, 1316, 1318, 1320, and 1322 such that the cash component amounts are built into those trigger threshold values.

Also, it should be noted that the BAL module (or the BVU module) can be configured to drop events where all of the delta prices for that event are zero.

Similarly, it should be noted that in the embodiment of FIG. 9, the NAV update engine 950 is configured to compute updated NAVs even for NAV types whose corresponding delta prices are zero. That is, a current delta event being processed by the BVU module may contain a $0.03 value for the ΔBid price but zero values for the ΔAsk and ΔLast prices. With the embodiment of FIG. 9, some of the different NAV compute logic engines 916 of the parallel paths would thus be used to compute a new NAV where there will not be a change relative to the old NAV (e.g., for the example given, the Ask $NAV^{new}$, Last $NAV^{new}$, and Ask+Tick $NAV^{new}$ values would be unchanged relative to their old values). It is believed that this configuration will still yield effective efficiency given that most of the events processed by the pipeline are expected to comprise quote activity. However, a practitioner is free to choose to increase the efficiency of the BVU module by not including any zero delta prices in the delta events and including a dynamic scheduler and memory controller which directs delta events to the appropriate computing path(s) within the NAV update engine 950 to more fully utilize all available computing paths within the NAV update engine 950.

It should also be noted that logic could be added to the BVU modules such that the NAV computations are also based on derived statistics such as the Volume Weighted Average Price (VWAP) and use other fields which may be available in a message, such as the difference in traded volume.

It should also be noted that the coprocessor 140 can be configured to perform computations in addition to those of the BCE if desired by a practitioner of an embodiment of the invention. For example, the coprocessor 140 can also employ a last value caching (LVC) module, as described in the above-referenced and incorporated U.S. Patent Application Publication 2008/0243675.

It should be noted that a practitioner of an embodiment of the invention may choose to compute the value for $\Delta j$ but not the value for $NAV^{new}$, in which case the BVU module need not produce any $NAV^{new}$ values. In such instances, the trigger conditions used by the PET module 1200 can be built around variation in $\Delta j$ rather than $NAV^{new}$. In such a situation, the client could optionally determine the NAV values itself from the $\Delta j$ value, although a practitioner may find value in the $\Delta j$ values themselves apart from their actual combination with an old NAV value to find a new NAV value.

Also, while the preferred embodiment for the BAL module 502 is configured to compute the delta values for the last/bid/ask prices in the incoming messages, it should be noted that the computation of such delta values can optionally be performed by one or more modules upstream from the BAL module 502 or the BCE pipeline 500 altogether. As such, the input messages to the BCE pipeline 500 may already contain the $\Delta$Bid, $\Delta$Ask, and/or $\Delta$Last prices for the subject financial instruments. In such instances, table 608 would not need to store the previous bid/ask/last prices for each financial instrument, and BAL module 502 need not employ the logic necessary to compute those delta prices.

Furthermore, while in the preferred embodiment disclosed herein the coprocessor 140 comprises a reconfigurable logic device 102 such as an FPGA, it should be noted that the coprocessor 140 can be realized using other processing devices. For example, the coprocessor 140 may comprise graphics processor units (GPUs), general purpose graphics processors, chip multi-processors (CMPs), dedicated memory devices, complex programmable logic devices, application specific integrated circuits (ASICs), and other I/O processing components. Moreover, it should be noted that system 100 may employ a plurality of coprocessors 140 in either or both of a sequential and a parallel multi-coprocessor architecture.

Further still, while the inventors believe that special advantages exist in connection with using the pipeline disclosed herein to process financial information and compute updated values for financial instrument baskets, the inventors further note that the disclosed pipeline also provides latency advantages when processing non-financial data which pertains to baskets. For example, the basket calculation engine may be configured to compute the net asset value of the inventory held by a multi-national retail organization. Incoming events to the pipeline that correspond to product sales and/or product deliveries could thus be used to update stored values for each product, wherein these stored values correspond to inventory count values. A weight assigned to each product would correspond to a price value assigned to the product. Thus, a pipeline such as the one disclosed herein could be used to closely track the net inventory values of the organization's products. Triggers may then be used to notify management when inventory values swell or shrink by a given threshold.

Another example would be for a basket which is a collection of data points from some type of scientific experiment. Each data point may have associated values such as size, mass, etc., and these data points may arrive over time as streaming data from one or more monitoring stations. The pipeline can readily be configured to derive a size NV by computing a weighted sum of the sizes from the incoming data stream and/or a mass NV by computing a weighted sum of the masses from the incoming data stream.

While the present invention has been described above in relation to its preferred embodiments, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. A method of processing data, the method comprising:
   streaming financial market data through a field programmable gate array (FPGA), the financial market data comprising a plurality of messages that are associated with a plurality of financial instruments, wherein the messages comprise price information about the financial instruments, the FPGA having a pipeline deployed thereon, the pipeline including a first hardware module and a second hardware module, wherein the second hardware module is downstream from the first hardware module;
   the first hardware module determining a plurality of financial instrument baskets which pertain to the financial instruments based on the messages;
   the first hardware module writing a plurality of delta events to a delta event buffer in response to a plurality of the streaming financial market data messages, wherein each delta event comprises (1) data indicative of a basket determined by the first module, (2) data indicative of a price delta for the financial instrument pertaining to that determined basket, and (3) data indicative of a weight for that financial instrument within that determined basket;
   the second hardware module reading the delta events from the delta event buffer;
   the second hardware module computing a plurality of net asset values (NAVs) for the determined baskets with respect to the read delta events using a delta calculation approach that is based on a contribution of the price information for the financial instruments to the NAVs, the second hardware module comprising:
   a plurality of parallel computing paths, each computing path comprising NAV compute logic such that the computing paths are configured to simultaneously compute a plurality of different new NAVs for the determined baskets according to the delta calculation approach; and wherein the second hardware module computing step comprises:
the second hardware module (1) accessing a plurality of memory tables that store a plurality of divisors and data values pertaining to old NAVs in association with a plurality of the baskets, and (2) retrieving divisors and data values pertaining to old NAVs from the memory tables for the determined baskets; and
the parallel computing paths simultaneously computing, via their respective NAV compute logic, a plurality of different new NAVs for the determined baskets according to the delta calculation approach using, for each determined basket, (1) the weight and price delta for the financial instrument pertaining to that determined basket, (2) the retrieved divisor for that determined basket, and (3) the retrieved data value pertaining to the old NAV for that determined basket; and the first hardware module and the second hardware module operating together in a pipelined manner as the financial market data streams through the FPGA to perform the determining and computing steps simultaneously such that the determining step determines at least one financial instrument basket pertaining to a financial instrument represented by a message of the streaming financial market data while the computing step computes the new NAVs for a determined basket pertaining to a financial instrument represented by a previous message of the streaming financial market data.

2. The method of claim 1 wherein the data values pertaining to old NAVs comprise a plurality of old NAVs for the baskets.

3. The method of claim 1 wherein the data values pertaining to old NAVs comprise a plurality of S values for the baskets, wherein each S value represents a value corresponding to an old NAV for its associated basket multiplied by the divisor for that associated basket.

4. The method of claim 1 wherein the simultaneously computing step comprises the parallel NAV compute logic simultaneously computing a new bid NAV, a new ask NAV, and a new last NAV for the same basket using the delta calculation approach.

5. The method of claim 4 wherein the simultaneously computing step comprises the parallel NAV compute logic simultaneously computing the new bid NAV, the new ask NAV, the new last NAV, a new bid-tick NAV and a new ask+tick NAV for the same basket using the delta calculation approach.

6. The method of claim 1 further comprising:
a processor processing at least one of the computed new NAVs against a triggering condition to determine whether the at least one computed new NAV is to be reported to a client; and
generating a message for delivery to the client in response to a determination by the processing step that at least one of the computed new NAVs is to be reported to the client, the generated message comprising the at least one computed new NAV that is to be reported to the client.

7. The method of claim 6 wherein a third hardware module in the pipeline performs the processing step, further comprising the FPGA performing the first hardware module determining step, the second hardware module computing step, and the third hardware module processing step in a pipelined manner.

8. The method of claim 7 wherein a fourth hardware module in the pipeline performs the generating step, wherein the first module determining step, the second module computing step, the third hardware module processing step, and the fourth hardware module generating step are performed in a pipelined manner by the FPGA as the financial market data streams through the FPGA.

9. The method of claim 6 wherein the third hardware module processing step comprises:
the third hardware module retrieving a reference value for a basket from a first table based on a basket identifier associated with a computed new NAV;
the third hardware module determining a dissimilarity between the retrieved reference value and the computed new NAV;
the third hardware module retrieving a trigger threshold value for the basket from a second table based on the basket identifier; and
the third hardware module comparing the dissimilarity with the retrieved trigger threshold value to thereby determine whether the computed new NAV is to be reported to the client.

10. The method of claim 9 wherein the dissimilarity determining step comprises the third hardware module computing a difference between the retrieved reference value and the computed new NAV.

11. The method of claim 6 further comprising the third hardware module defining a plurality of triggering conditions for a plurality of baskets in response to input from the client.

12. The method of claim 1 further comprising a processor delivering the financial market data stream to the FPGA.

13. The method of claim 12 further comprising:
the processor filtering the messages prior to the first hardware module determining step based on at least one filtering criterion such that the first hardware module determining step is performed on the messages which pass the filtering step.

14. The method of claim 13 wherein the filtering step, the first hardware module determining step, and the second hardware module computing step are performed by the FPGA as the financial market data streams through the FPGA.

15. The method of claim 14 further comprising the FPGA performing the filtering step, the first hardware module determining step, and the second hardware module computing step in a pipelined manner.

16. The method of claim 12 further comprising:
a processor detecting an arbitrage condition in connection with a basket based on a computed new NAV for that basket; and
a processor placing at least one trade order with at least one financial market in response to the detecting step to thereby take advantage of the detected arbitrage condition.

17. The method of claim 16 wherein the pipeline comprises a third hardware module downstream from the second hardware module, the third hardware module performing the detecting step.

18. The method of claim 12 wherein each of at least a plurality of the messages comprises a symbol identifier and a global exchange identifier (GEID) corresponding to that message's associated financial instrument, wherein the determining step comprises:

the first hardware module retrieving basket set data from a memory based on a message within the streaming financial market data using the symbol identifier and GEID within that message, the retrieved basket set data comprising at least one basket identifier for identifying a financial instrument basket having the financial instrument associated with that message as a member.

19. The method of claim 18 wherein the retrieved basket set data for at least one of the messages comprises a plurality of different basket identifiers, and wherein the computing step comprises the second hardware module performing the second hardware module computing step for each of the baskets identified by the basket identifiers.

20. The method of claim 19 wherein the delta calculation approach computes a new NAV for a basket as a function of the price delta pertaining to that basket, the retrieved divisor for that basket, a retrieved old NAV data value for that basket, and the weight assigned to the financial instrument for that basket, and wherein the basket set data retrieving step further comprises the first hardware module retrieving the weights for the baskets.

21. The method of claim 20 wherein each retrieved basket identifier is associated with a different one of the retrieved weights.

22. The method of claim 21 further comprising:
the first hardware module calculating a plurality of the price deltas for the financial instruments; and
first hardware module generating the delta events.

23. The method of claim 22 further comprising:
storing the basket identifiers and their associated weights in a table as plurality of pairs.

24. The method of claim 23 wherein the storing step further comprises storing previous price information for the financial instrument in the table.

25. The method of claim 24 further comprising updating the previous price information in the table based on the message.

26. The method of claim 23 wherein the table comprises a first table, wherein the storing step further comprises storing a plurality of pointers in a second table, the pointers being indexed by data corresponding to the symbol identifiers, and wherein the pairs in the first table are indexed by the pointers, and wherein the basket set data retrieving step further comprises the first hardware module (i) retrieving a pointer from the second table based on the message's symbol identifier, and (ii) retrieving the pairs from the first table based on the retrieved pointer.

27. The method of claim 26 further comprising a processor adding and deleting basket definitions within the tables in response to input from a client.

28. The method of claim 26 further comprising the processor performing at least one of the group consisting of (i) adding a financial instrument to, (ii) modifying a weight for a financial instrument with respect to, and (iii) deleting a financial instrument from a basket by modifying the tables in response to input from a client.

29. The method of claim 19 wherein the basket set data retrieving step comprises the first hardware module retrieving data corresponding to a composite financial instrument and data corresponding to at least one regional financial instrument based each GEID.

30. The method of claim 12 wherein the processor comprises a general purpose processor (GPP).

31. The method of claim 30 wherein the processor comprises a plurality of the GPPs.

32. The method of claim 12 wherein the reconfigurable logic device FPGA performs the first module determining step and the second module computing step at hardware speeds.

33. The method of claim 1 further comprising the second hardware module performing the retrieving step and the simultaneously computing step in a pipelined manner such that the second hardware module performs the retrieving step for a delta event while the parallel computing paths are simultaneously performing the simultaneously computing steps for a previous delta event.

34. The method of claim 33 wherein the memory tables comprise (1) a first memory table that stores the divisors in association with a plurality of the basket identifiers, and (2) a plurality of second memory tables, each second memory table corresponding to a parallel computing path and configured to store a plurality of the data values pertaining to old NAVs in association with a plurality of a plurality of the basket identifiers; and
wherein the retrieving step comprises (1) the second hardware module retrieving divisors for the determined baskets from the first memory table based on the basket identifiers in the read delta events, and (2) each parallel computing path retrieving the data values pertaining to old NAVs from its corresponding second memory table based on the basket identifiers in the read delta events.

35. The method of claim 1 wherein the stored data values pertaining to old NAVs comprise a plurality of old NAVs for the baskets.

36. The method of claim 35 wherein each respective NAV compute logic within the parallel computing paths comprises a multiplier, a divider downstream from the multiplier, and an adder downstream from the divider, and wherein the simultaneously computing step comprises, for each respective NAV compute logic with respect to each read delta event:
the multiplier multiplying the price delta for that delta event by the weight for that delta event to thereby compute a price delta-weight value product;
the divider dividing the price delta-weight value product by the retrieved divisor for that delta event to thereby compute a delta contribution for that delta event; and
the adder adding the delta contribution for that delta event to the retrieved old NAV for that delta event to thereby compute a new NAV for that delta event; and
wherein the multiplier, divider, and adder operate together simultaneously in a pipelined manner.

37. The method of claim 36 wherein each respective NAV compute logic within the parallel computing paths consists of the multiplier, the divider, and the adder.

38. The method of claim 35 wherein each respective NAV compute logic within the parallel computing paths comprises a first multiplier, a second multiplier, an adder downstream from the first and second multipliers, and a divider downstream from the adder, and wherein the simultaneously computing step comprises, for each respective NAV compute logic with respect to each read delta event:
the first multiplier multiplying the price delta for that delta event by the weight for that delta event to thereby compute a price delta-weight value product;
the second multiplier multiplying the retrieved old NAV for that delta event by the retrieved divisor for that delta event to thereby compute an S value for that delta event;
the adder adding the S value for that delta event to the price delta-weight value product for that delta event to thereby compute a sum value for that delta event; and the divider dividing the sum value for that delta event by the retrieved divisor for that delta event to thereby compute a new NAV for that delta event; and wherein the first multiplier and the second multiplier operate together simultaneously in a parallel manner; and wherein the first and second multipliers, the adder, and the divider operate together simultaneously in a pipelined manner.

39. The method of claim 38 wherein each respective NAV compute logic within the parallel computing paths consists of the first multiplier, the second multiplier, the adder, and the divider.

40. The method of claim 1 wherein the stored data values pertaining to old NAVs comprise a plurality of S values for the baskets, each S value being representative of an old NAV for a basket multiplied by the divisor for that basket.

41. The method of claim 40 wherein each respective NAV compute logic within the parallel computing paths comprises a multiplier, an adder downstream from the multiplier, and a divider downstream from the adder, and wherein the simultaneously computing step comprises, for each respective NAV compute logic with respect to each read delta event:
the multiplier multiplying the price delta for that delta event by the weight for that delta event to thereby compute a price delta-weight value product;
the adder adding the price delta-weight value product for that delta event and the retrieved S value for that delta event to thereby compute a sum value for that delta event; and
the divider dividing the sum value for that delta event by the retrieved divisor for that delta event to thereby compute a new NAV for that delta event; and
wherein the multiplier, adder, and divider operate together simultaneously in a pipelined manner.

42. The method of claim 41 wherein each respective NAV compute logic within the parallel computing paths consists of the multiplier, the adder, and the divider.

43. The method of claim 1 wherein the price delta for each delta event comprises a bid price delta, an ask price delta, and a last price delta, and wherein the simultaneously computing step comprises:
the parallel computing paths simultaneously computing, via their respective NAV compute logic, a new bid NAV, a new ask NAV, and a new last NAV, for each read delta event according to the delta calculation approach.

44. The method of claim 43 further comprising the second hardware module generating an output stream comprising the new bid NAV, the new ask NAV, the new last NAV, and a basket identifier for the each of the delta events.

45. The method of claim 1 wherein the parallel NAV compute logic is part of a NAV update engine within the second hardware module, and wherein the second hardware module further comprises a plurality of the NAV update engines in parallel, the method further comprising:
the plurality of NAV update engines operating in parallel on a plurality of the delta events to thereby simultaneously compute a plurality of the new NAVs from the plurality of delta events.

46. The method of claim 45 wherein the second hardware module further comprises routing logic upstream from the parallel NAV update engines, the method further comprising:
the second hardware module reading a plurality of the delta events out of the delta event buffer each clock cycle;
the routing logic (1) selecting, for each read delta event, one of the parallel NAV update engines, and (2) selectively routing the read delta events and the retrieved divisor values for the read delta events to the NAV update engines in accordance with the selecting step.

47. The method of claim 1 further comprising the second hardware module storing the new NAVs in the memory tables for use as old NAVs with respect to subsequent messages.

48. The method of claim 1 wherein the memory tables are resident on the FPGA.

49. The method of claim 1 wherein the memory tables are resident on a memory device in communication with the FPGA.

50. The method of claim 1 further comprising:
the first hardware module generating the delta events for the determined baskets.

51. The method of claim 50 wherein the first hardware module determining step comprises:
the first hardware module receiving a plurality of symbol identifiers and a plurality of global exchange identifiers (GEIDs) in association with the price information for a plurality of financial instruments, the symbol identifiers and GEIDs for identifying the financial instruments associated with the price information;
the first hardware module determining the plurality of baskets by retrieving a plurality of the basket identifiers from a basket memory based at least in part on the received symbol identifiers and GEIDs.

52. The method of claim 51 further comprising:
the first hardware module retrieving a plurality of the weights from the basket memory based at least in part on the received symbol identifiers and GEIDs, each weight being associated in the basket memory with a retrieved basket identifier.

53. The method of claim 52 further comprising:
the first hardware module retrieving price data from the basket memory based at least in part on the received symbol identifiers and GEIDs, the retrieved price data identifying a plurality of previous prices for the financial instruments identified by the symbol identifiers and the GEIDs; and
the first hardware module computing a plurality of the price deltas for the financial instruments identified by the symbol identifiers and the GEIDs by computing a plurality of differences between the retrieved price data and the received price information for those financial instruments.

54. The method of claim 51 wherein the basket memory comprises a basket set pointer table and a basket set table;
wherein the basket set table comprises the basket identifiers, the weights, and the price data; and
wherein the basket set pointer table comprises a plurality of pointers to portions of the basket set table, the pointers being associated with the received symbol identifiers and GEIDs.

55. The method of claim 51 wherein the basket memory is resident on the FPGA.

56. The method of claim 51 wherein the basket memory is resident on a memory device in communication with the FPGA.

57. The system of claim 1 wherein the basket association lookup hardware module and the basket value updating hardware module are configured to operate at hardware speeds.

58. The method of claim 1 wherein the price delta data comprises at least two members of the group consisting of (1) data indicative of a bid price delta for the financial instrument pertaining to that determined basket, (2) data indicative of an ask price delta for the financial instrument pertaining to that determined basket, and (3) data indicative of a last price delta for the financial instrument pertaining to that determined basket;

wherein the second hardware module further comprises a demultiplexer positioned between the delta event buffer and the parallel NAV compute logic; and wherein the method further comprises the demultiplexer selectively routing the price delta data members to the parallel NAV compute logic for the parallel NAV compute logic to simultaneously compute the new NAVs corresponding to the price delta data members.

59. The method of claim 58 wherein the memory tables comprise (1) a first memory table that stores the divisors in association with a plurality of the basket identifiers, and (2) a plurality of second memory tables, each second memory table corresponding to a parallel computing path and configured to store a plurality of the data values pertaining to old NAVs in association with a plurality of a plurality of the basket identifiers; and wherein the retrieving step comprises (1) the second hardware module retrieving divisors for the determined baskets from the first memory table based on the basket identifiers in the read delta events, and (2) each parallel computing path retrieving the data values pertaining to old NAVs from its corresponding second memory table based on the basket identifiers in the read delta events.

60. A system for processing data, the system comprising:

a field programmable gate array (FPGA) for processing streaming financial market data, the streaming financial market data comprising a plurality of messages that are associated with a plurality of financial instruments, wherein the messages comprise price information about the financial instruments, the FPGA having a pipeline deployed thereon, the pipeline comprising a basket association lookup hardware module and a downstream basket value updating hardware module, the FPGA further comprising a delta event buffer; and a memory accessible to the FPGA, wherein the memory comprises a plurality of memory tables that store a plurality of divisors and data values pertaining to a plurality of old net asset values (NAVs) in association with a plurality of financial instrument baskets;

the basket association lookup hardware module configured to (1) determine a plurality of financial instrument baskets which pertain to the financial instruments based on the messages, and (2) write a plurality of delta events to the delta event buffer in response to a plurality of the streaming financial market data messages, wherein each delta event comprises (1) data indicative of a basket determined by the basket association lookup module, (2) data indicative of a price delta for the financial instrument pertaining to that determined basket, and (3) data indicative of a weight for that financial instrument within that determined basket;

the basket value updating hardware module configured to (1) read the delta events from the delta event buffer, and (2) compute a plurality of NAVs for the determined baskets with respect to the read delta events using a delta calculation approach that is based on a contribution of the price information for the financial instruments to the NAVs, the basket value updating module hardware comprising:

a plurality of parallel computing paths, each computing path comprising NAV compute logic such that the computing paths are configured to simultaneously compute a plurality of different new NAVs for the determined baskets according to the delta calculation approach;

wherein the basket value updating hardware module is further configured to retrieve divisors and data values pertaining to old NAVs from the memory tables for the determined baskets; and wherein the parallel computing paths are configured to simultaneously compute, via their respective NAV compute logic, a plurality of different new NAVs for the determined baskets according to the delta calculation approach using, for each determined basket, (1) the price delta for the financial instrument pertaining to that determined basket, (2) the retrieved divisor for that determined basket, and (3) the retrieved data value pertaining to old NAV for that determined basket; and wherein the basket association lookup hardware module and the basket value updating hardware module are arranged in a pipelined manner such that the basket association lookup hardware module and the basket value updating hardware module are configured to operate simultaneously, wherein the basket association lookup hardware module is configured to determine a financial instrument basket pertaining to a financial instrument represented by a message of the streaming financial market data while the basket value updating hardware module is configured to compute the new NAVs for a determined basket pertaining to a financial instrument represented by a previous message of the streaming financial market data.

61. The system of claim 60 further comprising:

a processor configured to deliver the streaming financial market data stream to the FPGA.

62. The system of claim 61 wherein the parallel NAV compute logic are configured to simultaneously compute a new bid NAV, a new ask NAV, and a new last NAV for the same basket according to the delta calculation approach.

63. The system of claim 61 wherein the financial instrument associated with at least one of the messages is a member of a plurality of baskets, and wherein the basket value updating hardware module is further configured to compute the new NAVs for each of the baskets pertaining to that financial instrument.

64. The system of claim 63 wherein the basket value updating hardware module each respective NAV compute logic is further configured to compute its new NAV according to the delta calculation approach further using, for each determined basket, the weight for the financial instrument for each determined basket, and wherein the basket association lookup hardware module is further configured to retrieve the weights for the baskets.

65. The system of claim 64 wherein the basket association lookup hardware module is further configured to retrieve a basket identifier for each of the determined baskets, each basket identifier corresponding to a different one of the determined baskets and being associated with a different one of the weights.

66. The system of claim 65 wherein the message comprises a global exchange identifier, and wherein the basket association lookup hardware module is further configured to retrieve data corresponding to a composite financial instrument and data corresponding to at least one regional financial instrument based on the global exchange identifier.

67. The system of claim 61 wherein the FPGA further comprises a price event trigger hardware module in communication with the basket value updating hardware module, the price event trigger hardware module being configured to process a computed new NAV against a triggering condition to determine whether that computed new NAV is to be reported to a client.

68. The system of claim 67 wherein the basket association lookup hardware module, the basket value updating hardware module, and the price event trigger hardware module are arranged to operate in a pipelined manner on the FPGA.

69. The system of claim 68 wherein the FPGA further comprises an event generator hardware module in communication with the price event trigger hardware module, wherein the event generator hardware module is configured to generate a message for delivery to the client in response to a determination by the price event trigger hardware module that a computed new NAV is to be reported to the client, the generated message comprising that computed new NAV.

70. The system of claim 69 wherein the basket association lookup hardware module, the basket value updating hardware module, the price event trigger hardware module, and the event generator hardware module are arranged to operate in a pipelined manner on the FPGA.

71. The system of claim 67 wherein the price event trigger hardware module is further configured to:
retrieve a reference value for a basket from a first table based on a basket identifier associated with a computed new NAV;
determine a dissimilarity between the retrieved reference value and the computed new NAV;
retrieve a trigger threshold value for the basket from a second table based on the basket identifier; and
compare the dissimilarity with the retrieved trigger threshold value to thereby determine whether the computed new NAV is to be reported to the client.

72. The system of claim 61 wherein the financial market data comprises a plurality of messages, and wherein the FPGA further comprises a message qualifier filter in communication with the basket association lookup hardware module, the message qualifier filter being configured to filter the messages based on at least one filtering criterion such that the basket association lookup hardware module receives the messages which pass the message qualifier filter.

73. The system of claim 72 wherein the message qualifier filter, the basket association lookup hardware module, and the basket value updating hardware module are arranged to operate in a pipelined manner on the FPGA.

74. The system of claim 61 further comprising another processor in communication with the processor, wherein the another processor is configured to execute a client application, and wherein the processor is further configured to deliver data corresponding to the computed new NAVs to the client application.

75. The system of claim 61 wherein the processor comprises a general purpose processor (GPP).

76. The system of claim 75 wherein the processor comprises a plurality of the GPPs.

77. The system of claim 61 wherein the basket value updating hardware module is further configured to (1) read a plurality of the delta events from the delta event buffer, and (2) perform the retrieval operation and the simultaneous computation operations based on each of the read delta events.

78. The system of claim 77 wherein the basket value updating hardware module is further configured to perform the retrieval operation and the simultaneous computation operations in a pipelined manner such that the basket value updating hardware module is configured to perform the retrieval operation for a delta event while the parallel computing paths simultaneously perform the new NAV computations for a previous delta event.

79. The system of claim 78 the memory tables comprise (1) a first memory table that stores the divisors in association with a plurality of the basket identifiers, and (2) a plurality of second memory tables, each second memory table corresponding to a parallel computing path and configured to store a plurality of the data values pertaining to old NAVs in association with a plurality of a plurality of the basket identifiers; and
wherein basket value updating hardware module is further configured to retrieve divisors for the determined baskets from the first memory table based on the basket identifiers in the read delta events; and
wherein each parallel computing path is further configured to retrieve the data values pertaining to old NAVs from its corresponding second memory table based on the basket identifiers in the read delta events.

80. The system of claim 79 wherein the stored data values pertaining to old NAVs comprise a plurality of S values for the baskets, each S value being representative of an old NAV for a basket multiplied by the divisor for that basket.

81. The system of claim 80 wherein each respective NAV compute logic within the parallel computing paths comprises a multiplier, an adder downstream from the multiplier, and a divider downstream from the adder;
the multiplier being configured to, for each delta event, multiply the price delta for that delta event by the weight for that delta event to thereby compute a price delta-weight value product;
the adder being configured to, for each delta event, add the price delta-weight value product for that delta event and the retrieved S value for that delta event to thereby compute a sum value for that delta event; and
the divider being configured to, for each delta event, divide the sum value for that delta event by the retrieved divisor for that delta event to thereby compute a new NAV for that delta event; and
wherein the multiplier, adder, and divider are configured to operate together simultaneously in a pipelined manner.

82. The system of claim 81 wherein each respective NAV compute logic within the parallel computing paths consists of the multiplier, the adder, and the divider.

83. The system of claim 77 wherein the stored data values pertaining to old NAVs comprise a plurality of old NAVs for the baskets.

84. The system of claim 83 wherein each respective NAV compute logic within the parallel computing paths comprises a multiplier, a divider downstream from the multiplier, and an adder downstream from the divider;
the multiplier being configured to, for each delta event, multiply the price delta for that delta event by the weight for that delta event to thereby compute a price delta-weight value product;
the divider being configured to, for each delta event, divide the price delta-weight value product by the retrieved divisor for that delta event to thereby compute a delta contribution for that delta event; and
the adder being configured to, for each delta event, add the delta contribution for that delta event to the retrieved old NAV for that delta event to thereby compute a new NAV for that delta event; and
wherein the multiplier, divider, and adder are configured to operate together simultaneously in a pipelined manner.

85. The system of claim 84 wherein each respective NAV compute logic within the parallel computing paths consists of the multiplier, the divider, and the adder.

86. The system of claim 83 wherein each respective NAV compute logic within the parallel computing paths comprises a first multiplier, a second multiplier, an adder downstream from the first and second multipliers, and a divider downstream from the adder;
the first multiplier being configured to, for each delta event, multiply the price delta for that delta event by the weight for that delta event to thereby compute a price delta-weight value product;
the second multiplier being configured to, for each delta event, multiply the retrieved old NAV for that delta event by the retrieved divisor for that delta event to thereby compute an S value for that delta event;
the adder being configured to, for each delta event, add the S value for that delta event to the price delta-weight value product for that delta event to thereby compute a sum value for that delta event; and
the divider being configured to, for each delta event, divide the sum value for that delta event by the retrieved divisor for that delta event to thereby compute a new NAV for that delta event; and
wherein the first multiplier and the second multiplier are configured to operate together simultaneously in a parallel manner; and
wherein the first and second multipliers, the adder, and the divider are configured to operate together simultaneously in a pipelined manner.

87. The system of claim 86 wherein each respective NAV compute logic within the parallel computing paths consists of the first multiplier, the second multiplier, the adder, and the divider.

88. The system of claim 77 wherein the price delta for each delta event comprises a bid price delta, an ask price delta, and a last price delta, and wherein the parallel computing paths are further configured to simultaneously compute, via their respective NAV compute logic components, a new bid NAV, a new ask NAV, and a new last NAV, for each read delta event according to the delta calculation approach.

89. The system of claim 88 wherein the basket value updating hardware module is further configured to generate an output stream comprising the new bid NAV, the new ask NAV, the new last NAV, and a basket identifier for the each of the delta events.

90. The system of claim 77 wherein the parallel NAV compute logic is part of a NAV update engine within the basket value updating hardware module, and wherein the basket value updating hardware module further comprises a plurality of the NAV update engines in parallel, the plurality of NAV update engines being configured to operate in parallel on a plurality of the delta events to thereby simultaneously compute a plurality of the new NAVs from the plurality of delta events.

91. The system of claim 90 wherein the basket value updating hardware module further comprises routing logic upstream from the parallel NAV update engines;
wherein the basket value updating hardware module is further configured to read a plurality of the delta events out of the delta event buffer each clock cycle; and
wherein the routing logic is configured to (1) select, for each read delta event, one of the parallel NAV update engines, and (2) selectively route the read delta events and the retrieved divisor values for the read delta events to the NAV update engines in accordance with the selection.

92. The system of claim 77 wherein the basket value updating hardware module is further configured to store the new NAVs in the memory tables for use as old NAVs with respect to subsequent messages.

93. The system of claim 77 wherein the memory is resident on the FPGA.

94. The system of claim 77 wherein the memory is resident on a memory device in communication with the FPGA.

95. The system of claim 77 wherein the basket association lookup hardware module is further configured to generate the delta events for the determined baskets.

96. The system of claim 95 wherein the basket association lookup hardware module is further configured to (1) receive a plurality of symbol identifiers and a plurality of global exchange identifiers (GEIDs) in association with the price information for a plurality of financial instruments, the symbol identifiers and GEIDs for identifying the financial instruments associated with the price information, and (2) determine the plurality of baskets by retrieving a plurality of the basket identifiers from a basket memory based at least in part on the received symbol identifiers and GEIDs.

97. The system of claim 96 wherein the basket association lookup hardware module is further configured to retrieve a plurality of the weights from the basket memory based at least in part on the received symbol identifiers and GEIDs, each weight being associated with a retrieved basket identifier.

98. The system of claim 97 wherein the basket association lookup hardware module is further configured to (1) retrieve price data from the basket memory based at least in part on the received symbol identifiers and GEIDs, the retrieved price data identifying a plurality of previous prices for the financial instruments identified by the symbol identifiers and the GEIDs, and (2) compute a plurality of the price deltas for the financial instruments identified by the symbol identifiers and the GEIDs by computing a plurality of differences between the retrieved price data and the received price information for those financial instruments.

99. The system of claim 96 wherein the basket memory comprises a basket set pointer table and a basket set table;
wherein the basket set table comprises the basket identifiers, the weights, and the price data; and
wherein the basket set pointer table comprises a plurality of pointers to portions of the basket set table, the pointers being associated with the received symbol identifiers and GEIDs.

100. The system of claim 96 wherein the basket memory is part of the memory, and wherein the memory is resident on the FPGA.

101. The system of claim 96 wherein the basket memory is part of the memory, and wherein the memory is resident on a memory device in communication with the FPGA.

102. The system of claim 60 wherein the price delta data comprises at least two members of the group consisting of (1) data indicative of a bid price delta for the financial instrument pertaining to that determined basket, (2) data indicative of an ask price delta for the financial instrument pertaining to that determined basket, and (3) data indicative of a last price delta for the financial instrument pertaining to that determined basket;
wherein the basket value updating hardware module further comprises a demultiplexer positioned between the delta event buffer and the parallel NAV compute logic, wherein the demultiplexer is configured to selectively route the price delta data members to the parallel NAV compute logic for the parallel NAV compute logic to simultaneously compute the new NAVs corresponding to the price delta data members.

103. The system of claim 102 wherein the memory tables comprise (1) a first memory table that stores the divisors in association with a plurality of the basket identifiers, and (2) a plurality of second memory tables, each second memory table corresponding to a parallel computing path and configured to store a plurality of the data values pertaining to old NAVs in association with a plurality of a plurality of the basket identifiers;
   wherein the basket value updating hardware module is further configured to retrieve the divisors for the determined baskets from the first memory table based on the basket identifiers in the read delta events; and
   wherein each parallel computing path is configured to retrieve the data values pertaining to old NAVs from its corresponding second memory table based on the basket identifiers in the read delta events.

* * * * *